US011644806B1

(12) United States Patent
Kohn et al.

(10) Patent No.: US 11,644,806 B1
(45) Date of Patent: *May 9, 2023

(54) USING ACTIVE NON-DESTRUCTIVE STATE EXCITATION OF A PHYSICAL SYSTEM TO MODEL AND CONTROL OPERATIONS OF THE PHYSICAL SYSTEM

(71) Applicant: Veritone Alpha, Inc., Costa Mesa, CA (US)

(72) Inventors: Wolf Kohn, Seattle, WA (US); Xiaofeng Zhang, Bellevue, WA (US); Girish Thirukkurungudi Sekar, Mountain View, CA (US)

(73) Assignee: Veritone Alpha, Inc., Costa Mesa, CA (US)

( * ) Notice: Subject to any disclaimer, the term of this patent is extended or adjusted under 35 U.S.C. 154(b) by 76 days.

This patent is subject to a terminal disclaimer.

(21) Appl. No.: 17/356,965

(22) Filed: Jun. 24, 2021

Related U.S. Application Data

(63) Continuation-in-part of application No. 16/289,602, filed on Feb. 28, 2019, now Pat. No. 11,097,633.

(Continued)

(51) Int. Cl.
  G05B 19/042 (2006.01)
(52) U.S. Cl.
  CPC .... G05B 19/042 (2013.01); *G05B 2219/2668* (2013.01)
(58) Field of Classification Search
  CPC .............. G05B 19/042; G05B 2219/2668
  (Continued)

(56) References Cited

U.S. PATENT DOCUMENTS

| | | |
|---|---|---|
| 5,724,239 A | 3/1998 | Kaneko |
| 5,727,128 A | 3/1998 | Morrison |

(Continued)

FOREIGN PATENT DOCUMENTS

| | | | |
|---|---|---|---|
| EP | 1029385 B1 * | 10/2005 | ............ G01R 31/36 |
| JP | 2008-546370 A | 12/2008 | |

(Continued)

OTHER PUBLICATIONS

Hyndman, "Forecasting: Principles & Practice", Workshop at University of Western Australia (robjhyndman.com/uwa), Sep. 23-25, 2014, 138 pages.

(Continued)

*Primary Examiner* — M Baye Diao
(74) *Attorney, Agent, or Firm* — VLP Law Group LLP; James A. D. White

(57) ABSTRACT

Techniques are described for implementing automated control systems to control operations of target physical systems and/or their components (e.g., a fuel cell, wind turbine, HVAC unit, etc.), such as based at least in part on models of their dynamic non-linear behaviors that are generated by gathering and analyzing information about their operations under varying conditions. The techniques may include, for each of multiple levels of inputs to the system/component and/or other factors, injecting a corresponding signal input into the system/component, and using active sensors to collect time changes of the responses to these pulses. Information about the inputs and the responses is used to generate an incremental parametric model representing the internal state and behavioral dynamics of the system/component, which is further used to control additional ongoing operations of the system/component (e.g., to control whether and how much output is produced in a current or future time period).

20 Claims, 26 Drawing Sheets

Related U.S. Application Data

(60) Provisional application No. 62/796,581, filed on Jan. 24, 2019.

(58) Field of Classification Search
USPC .......................................................... 320/129
See application file for complete search history.

(56) References Cited

U.S. PATENT DOCUMENTS

| | | | |
|---|---|---|---|
| 5,755,378 A | 5/1998 | Dage | |
| 5,963,447 A | 10/1999 | Kohn | |
| 6,088,689 A | 7/2000 | Kohn | |
| 6,506,512 B1 * | 1/2003 | Mori | F01C 1/0223 |
| | | | 429/444 |
| 6,694,044 B1 | 2/2004 | Pavlovic et al. | |
| 7,052,105 B2 | 5/2006 | Ushigome | |
| 7,072,723 B2 | 7/2006 | Kohn et al. | |
| 7,216,004 B2 | 5/2007 | Kohn et al. | |
| 7,574,383 B1 | 8/2009 | Parasnis et al. | |
| RE42,284 E * | 4/2011 | Severson | H02J 13/0001 |
| | | | 246/187 A |
| 8,261,283 B2 | 9/2012 | Tsafrir et al. | |
| 8,606,788 B2 | 4/2013 | Downs et al. | |
| 8,949,772 B1 | 2/2015 | Talby et al. | |
| 8,977,874 B2 | 3/2015 | Rabii | |
| 9,806,363 B2 * | 10/2017 | Kim | H01M 8/04992 |
| 9,946,517 B2 | 4/2018 | Talby et al. | |
| 10,033,210 B2 * | 7/2018 | Peterson | G05B 13/021 |
| 10,223,656 B2 * | 3/2019 | Kopp | G05B 23/0243 |
| 10,386,422 B2 | 8/2019 | Christensen | |
| 10,424,961 B1 | 9/2019 | Maluf | |
| 10,452,045 B1 | 10/2019 | Kohn | |
| 10,520,905 B2 | 12/2019 | Cross | |
| 10,601,316 B2 | 3/2020 | Kohn | |
| 11,097,633 B1 * | 8/2021 | Kohn | H02J 7/00 |
| 2002/0049899 A1 | 4/2002 | Kenworthy | |
| 2003/0069868 A1 | 4/2003 | Vos | |
| 2003/0234812 A1 | 12/2003 | Drucker et al. | |
| 2004/0260666 A1 | 12/2004 | Pestotnik et al. | |
| 2005/0102044 A1 | 5/2005 | Kohn et al. | |
| 2005/0273413 A1 | 12/2005 | Vaudrie | |
| 2006/0218074 A1 | 9/2006 | Kohn | |
| 2006/0229769 A1 | 10/2006 | Grichnik et al. | |
| 2006/0246329 A1 * | 11/2006 | Gopal | H01M 8/04559 |
| | | | 429/430 |
| 2008/0167756 A1 | 7/2008 | Golden et al. | |
| 2009/0113049 A1 | 4/2009 | Nasle | |
| 2011/0035071 A1 | 2/2011 | Sun | |
| 2011/0178622 A1 | 7/2011 | Tuszynski | |
| 2011/0298626 A1 | 12/2011 | Fechalos et al. | |
| 2012/0072181 A1 | 3/2012 | Imani | |
| 2012/0143356 A1 | 6/2012 | Berg-Sonne | |
| 2012/0274281 A1 | 11/2012 | Kim | |
| 2012/0283887 A1 | 11/2012 | Goldsmith et al. | |
| 2013/0080530 A1 | 3/2013 | Frees et al. | |
| 2013/0099576 A1 | 4/2013 | Chuah et al. | |
| 2013/0119916 A1 | 5/2013 | Wang et al. | |
| 2013/0253942 A1 | 9/2013 | Liu et al. | |
| 2013/0274936 A1 | 10/2013 | Donahue et al. | |
| 2014/0114517 A1 | 4/2014 | Tani et al. | |
| 2014/0217976 A1 | 8/2014 | McGrath | |
| 2014/0250377 A1 | 9/2014 | Bisca et al. | |
| 2014/0277600 A1 | 9/2014 | Kolinsky et al. | |
| 2015/0032394 A1 | 1/2015 | Kimura et al. | |
| 2015/0058078 A1 | 2/2015 | Ehrenberg et al. | |
| 2015/0184550 A1 | 7/2015 | Wichmann | |
| 2015/0253749 A1 | 9/2015 | Kniazev et al. | |
| 2015/0279182 A1 | 10/2015 | Kanaujia et al. | |
| 2015/0370228 A1 | 12/2015 | Kohn et al. | |
| 2015/0370232 A1 | 12/2015 | Kohn et al. | |
| 2016/0004228 A1 | 1/2016 | Kohn | |
| 2016/0018806 A1 | 1/2016 | Kohn et al. | |
| 2016/0125435 A1 | 5/2016 | Kohn et al. | |
| 2016/0216708 A1 | 7/2016 | Krivoshein et al. | |
| 2016/0239759 A1 | 8/2016 | Sung | |
| 2017/0219660 A1 | 8/2017 | Christensen | |
| 2017/0271984 A1 | 9/2017 | Kohn et al. | |
| 2017/0315517 A1 | 11/2017 | da Silva et al. | |
| 2017/0315523 A1 | 11/2017 | Cross et al. | |

FOREIGN PATENT DOCUMENTS

| | | | | |
|---|---|---|---|---|
| JP | 2015-025685 A | 2/2015 | | |
| JP | 2016-105672 A | 6/2016 | | |
| JP | 6584040 B2 | 10/2019 | | |
| WO | WO-2010123770 A2 * | 10/2010 | ............... | A61B 5/16 |
| WO | 2014030349 A1 | 2/2014 | | |
| WO | 2014089959 A1 | 6/2014 | | |
| WO | WO-2015023761 A1 * | 2/2015 | ........... | A01K 67/033 |
| WO | WO-2015023761 A1 * | 2/2015 | ........... | A01K 67/033 |
| WO | 2016025080 A1 | 2/2016 | | |

OTHER PUBLICATIONS

Leng et al., "Effect of Temperature on the Aging Rate of Li Ion Battery Operating Above Room Temperature," Scientific Reports 5:12967, Aug. 2015, 12 pages.

Shim et al., "Past, present, and future of decision support technology", Decision Support Systems 33 (2002), 16 pages (pp. 111-126).

Liserre et al., "Future Energy Systems", IEEE Industrial Electronics Magazine, Mar. 2010, 20 pages (pp. 18-37).

Sarkis, "A strategic decision framework for green supply chain management", Journal of Cleaner Production 11 (2003) 13 pages (pp. 397-409).

Chong et al., "Sensor Networks: Evolution, Opportunities, and Challenges", Proceedings of the IEEE, vol. 91, No. 8, Aug. 2003, 10 pages (pp. 1247-1256).

Ge et al., "Hybrid Systems: Chattering Approximation to Relaxed Controls," Lecture Notes in Computer Science vol. 1066: Hybrid Systems 111, 1996, 25 pages.

Kohn et al., "Multiple Agent Hybrid Control: Carrier Manifolds and Chattering Approximations to Optimal Control," 33rd Conference on Decision and Control Lake Buena Vista, FL, Dec. 1994, 7 pages.

Kohn et al., "A Hybrid Systems Approach to Computer-Aided Control Engineering," IEEE Control Systems 15(2), 1995, 30 pages.

Kohn et al., "Hybrid Systems as Finsler Manifolds: Finite State Control as Approximation to Connections," Lecture Notes in Comvuter Science vol. 999: Hybrid Systems II, 1995, 28 pages.

Kohn et al., "Viability in Hybrid Systems," Theoretical Computer Science 138, 1995, 28 pages.

Kohn et al., "Digital to Hybrid Program Transformations," IEEE International Symposium on Intelligent Control, Dearborn, MI, Sep. 15-18, 1996, 6 pages.

Kohn et al., "Hybrid Dynamic Programming," Lecture Notes in Computer Science vol. 1201: Hybrid and Real-Time Systems, 1997, 7 pages.

Kohn et al., "Implementing Sensor Fusion Using a Cost-Based Approach," American Control Conference, Albuquerque, NM, Jun. 1997, 5 pages.

Kohn et al., "Control Synthesis in Hybrid Systems with Finsler Dynamics," Houston Journal of Mathematics 28(2), 2002, 23 pages.

Kohn et al., "A Micro-Grid Distributed Intelligent Control and Management System," IEEE Transactions on Smart Grid 6(6), Nov. 2015, 11 pages.

Uddin, K., "The effects of high frequency current ripple on electric vehicle battery performance," Applied Energy 178 (2016), 13 pages.

Schutter, B. De "Minimal state-space realization in linear system theory: an overview", Journal of Computational and Applied Mathematics, 121 (2000) 331-354, 24 pages.

\* cited by examiner

USING ACTIVE NON-DESTRUCTIVE STATE EXCITATION OF A PHYSICAL SYSTEM TO MODEL AND CONTROL OPERATIONS OF THE PHYSICAL SYSTEM

CROSS-REFERENCE TO RELATED APPLICATIONS

This application is a continuation-in-part of co-pending U.S. patent application Ser. No. 16/289,602, filed Feb. 28, 2019 and entitled "Using Battery State Excitation To Model And Control Battery Operations," which is hereby incorporated by reference in its entirety. U.S. patent application Ser. No. 16/289,602 claims the benefit of U.S. Provisional Patent Application No. 62/796,581, filed Jan. 24, 2019 and entitled "Using Battery State Excitation To Model And Control Battery Operations," which is hereby incorporated by reference in its entirety.

TECHNICAL FIELD

The following disclosure relates generally to techniques for controlling operations of one or more batteries and/or other physical systems whose behavioral responses are modeled using information gathered from active excitation of the batteries and/or other physical systems, such as to maximize battery life while controlling other battery power use activities or to satisfy one or more other defined criteria while controlling usage activities of a physical system.

BACKGROUND

Attempts have been made to implement automated control systems for various types of physical systems having inputs or other control elements that the control system can manipulate in an attempt to provide desired output or other behavior of the physical systems. One example of such automated control is to manage operations of a battery that is discharging electrical power to support a load and/or is charging using electrical power from a source, while uncertainty exists about an internal temperature and/or chemical state of the battery, and potentially with ongoing changes in load, source and/or internal state of the battery. Other examples of such automated control is to manage operations of other types of physical systems that do not include managing a battery while uncertainty exists about an internal state of the other physical systems that is not directly observed, such as the following: to manage operations of a fuel cell that is discharging electrical power to support electrical demand or load while uncertainty exists about conditions in and/or around the fuel cell, such as an internal state of the fuel cell (e.g., internal resistance or impedance, internal cell reaction rate, internal chemical state, etc.), and potentially with ongoing changes to demand, internal state of the fuel cell, and/or external state around the fuel cell; an HVAC (Heating, Ventilation and Air Conditioning) system with one or more HVAC units that provides functionality related to heat flow and/or air flow for some or all of one or more buildings while uncertainty exists about physical conditions in and/or around at least some of the building(s), such as internal and/or external temperature, internal and/or external humidity, rate of heat flow, internal-external air exchange rate, etc., and potentially with ongoing changes to demand, internal state of the HVAC unit(s), internal state of the building(s), and/or external state around the building(s); a wind turbine system that generates electrical and/or mechanical power while uncertainty exists about physical conditions in and/or around the wind turbine, such as wind speed, humidity and/or air density, internal and/or external temperature, etc., and potentially with ongoing changes to power demand or load, internal state of the wind turbine, and/or air conditions around the wind turbine (e.g., wind speed, wind direction, air temperature, air humidity/density, etc.) and other external state around the wind turbine; etc. Such automated control systems have used various types of architectures and underlying computing technologies to attempt to implement such functionality.

However, various difficulties exist with existing automated control systems and their underlying architectures and computing technologies for battery systems, including with respect to determining how the systems will respond in different situations and to managing uncertainty in a current state of a system being controlled and in how different types of inputs will affect operation of the automated control systems.

DETAILED DESCRIPTION

Figure 1A:
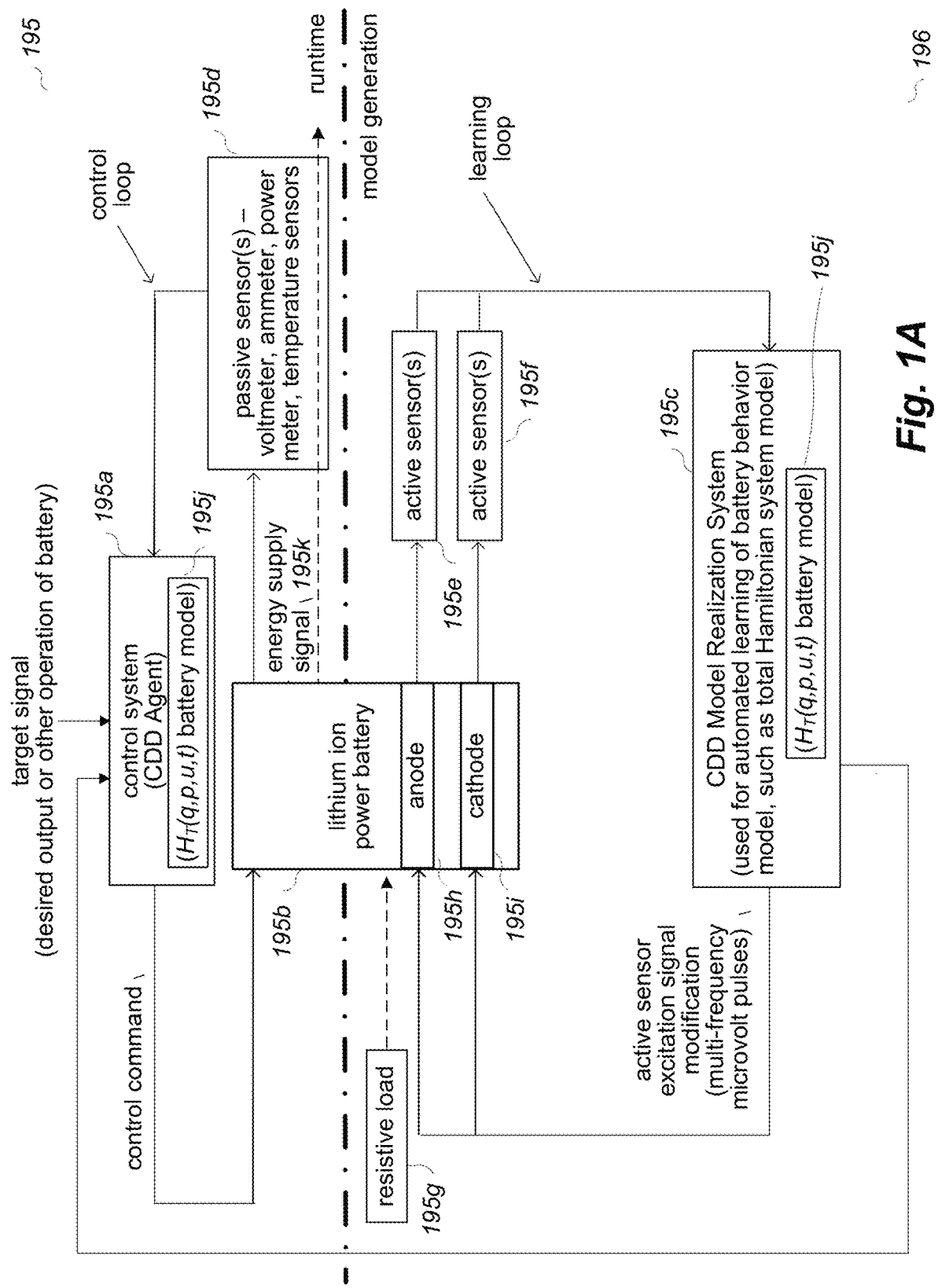
FIGS. 1A and 1C include diagrams illustrating use of a model realization system to perform non-destructive active excitation of a battery in a target system and/or of another physical system (e.g., an HVAC system, a wind turbine, a fuel cell and/or a system that includes a fuel cell, etc.) to generate a parametric model that reflects behavior of the battery and/or other physical system under varying conditions.

Techniques are described for implementing automated control systems to control or otherwise manipulate at least some operations of target physical systems that use batteries or of other types of target physical systems (e.g., physical systems that produce non-linear dynamic behaviors in response to linear changes in inputs), such as based at least in part on models of the dynamic behaviors of the batteries or of the other physical systems and/or their components (referred to generally herein as "physical systems/components") that are generated by gathering and analyzing information about the operations of the batteries or of the other physical systems/components under varying conditions.

In some embodiments, the described techniques include performing excitation of a target battery system having one or more separate battery units (e.g., one or more lithium ion battery cells) by, for each of multiple charge levels of the battery system and for each of multiple resistive loads, injecting multi-frequency microvolt pulses into the battery system (e.g., separate pulses for each anode and cathode of one or more of the battery units), and using intelligent sensors (also referred to generally as "active sensors" herein) to collect time changes of the responses to those pulses. Information about the inputs and the responses is then analyzed and used to generate a model of the battery system's behavior, such as an incremental parametric non-linear state model representing the internal dynamics of the battery system (e.g., with parameters such as voltage, current, power, etc.), which is further used to control additional ongoing battery system operations (e.g., to determine further control actions to perform for the battery system), including in some cases to update a previously existing model of the battery system (e.g., an existing model that is based at least in part on other types of information about the battery system) and to use the updated battery system model to control whether and how much power is supplied to and/or extracted from the battery system (e.g., in a current or future time period). In some embodiments, the target battery system may include a single battery unit that is represented with a single generated model, while in other embodiments the battery system may include multiple battery units (of the same type or different types) that are represented with a single generated model (e.g., for the overall performance of the battery system) or with multiple generated models (e.g., one model for each battery unit, one model for each type of battery unit, etc.). The one or more battery units may be of one or more types that include, for example, lithium ion (e.g., lithium cobalt oxide, lithium manganese oxide, lithium iron phosphate, lithium nickel manganese cobalt oxide, lithium nickel cobalt aluminum oxide, lithium titanate, etc.), lead-acid, zinc-air, nickel-cadmium, nickel-metal hydride, lithium iron phosphate, lithium-ion polymer, etc.

In some embodiments, the described techniques include performing excitation of a target physical system that includes or is a fuel cell system having one or more fuel cell units by, for each of multiple levels of one or more factors (e.g., for some or all combinations of different levels for multiple different factors) that affect the behavior of the fuel cell system, injecting electrical pulse inputs into the fuel cell system (e.g., separate multi-frequency microvolt or millivolt pulses for the anode and cathode of each of one or more fuel cell units), and using intelligent active sensors to collect time changes of the responses to those injected inputs. In at least some embodiments, the multiple factors may include electrical load or other power demand (e.g., to use each of multiple electrical loads or other levels of electrical power demand) and/or charge level of one or more fuel cell units (e.g., to use each of multiple electrical charge levels of the one or more fuel cell units) and optionally one or more other factors (e.g., voltage and/or current provided by the one or more fuel cell units, level of fuel in the one or more fuel cell units, etc.). As one non-exclusive example, the input injections may include injecting one or more first electrical pulse inputs for a first combination that includes a first electrical load/demand level and a first fuel cell charge level, injecting one or more second electrical pulse inputs for a second combination that includes the first electrical load/demand level and a second fuel cell charge level, injecting one or more third electrical pulse inputs for a third combination that includes a second electrical load/demand level and the first fuel cell charge level, etc. Information about the inputs and the responses is then analyzed and used to generate a model of the fuel cell system's behavior, such as an incremental parametric non-linear state model representing the internal dynamics of the fuel cell system (e.g., with respect to characteristics about behavior of the fuel cell system, such as voltage and/or current and/or power that is provided, etc.), which is further used to control additional ongoing fuel cell system operations (e.g., to determine further control actions to perform for the fuel cell system), including in some cases to update a previously existing model of the fuel cell system (e.g., an existing model that is based at least in part on other types of information about the fuel cell system) and to use the updated fuel cell system model to control whether and how much power is extracted from the fuel cell system (e.g., in a current or future time period). In some embodiments, the target fuel cell system may include a single fuel cell unit that is represented with a single generated model, while in other embodiments the fuel cell system may include multiple fuel cell units (of the same type or different types) that are represented with a single generated mod& (e.g., for the overall performance of the fuel cell system) or with multiple generated models (e.g., one mod& for each fuel cell unit, one mod& for each type of fuel cell unit, etc.). The one or more fuel cell units may be of one or more types that include, for example, polymer electrolyte membrane fuel cells, direct methanol fuel cells, alkaline fuel cells, phosphoric acid fuel cells, molten carbonate fuel cells, solid oxide fuel cells, reversible fuel cells, etc.

In some embodiments, the described techniques include performing excitation of a target physical system that includes or is an HVAC system having one or more HVAC units (e.g., that provide functionality for one or more buildings) by, for each of multiple levels of one or more factors (e.g., for some or all combinations of different levels for multiple different factors) that affect the behavior of the HVAC system, injecting input changes into the HVAC system air intake(s), such as high-frequency air temperature change pulses (e.g., multiple fractional-degree changes from the external air temperature via injected air, such as deci-degree changes, centi-degree changes, milli-degree changes, micro-degree changes, etc.; multiple single-degree changes from the external air temperature via injected air; multiple fractional-degree changes or single-degree changes relative to some other specified temperature that is different from the external air temperature; etc.) and optionally other changes to air characteristics (e.g., humidity, wind speed, etc.), and using intelligent active sensors to collect time changes of the responses to those injected inputs—in other embodiments, input changes may be injected into other locations (e.g., into an area surrounding one or more HVAC system building temperature sensors, into the HVAC system air output entering the building, etc.) and/or in other manners, whether in addition to or instead of injecting input changes into the air intake(s). In at least some embodiments, the multiple factors may include external air temperatures (e.g., to use each of multiple levels of external air temperatures, such as 4 levels representing high heat, average heat, heat that is lower than average by a first specified amount or percentage, and heat that is much lower than average by a second specified amount larger than the first specified amount) and humidity flow values (e.g., produced by the HVAC system and represented as a percentage of a saturation level of a building, such as measured in gallons per second, and to use each of multiple levels of humidity flow values, such as 4 levels representing a high humidity flow value, an average humidity flow value, a humidity flow value that is lower than average by a first specified amount or percentage, and a humidity flow value that is much lower than average by a second specified amount or percentage larger than the first specified amount or percentage) and heat flow values (e.g., produced by the HVAC system, and to use each of multiple levels of heat flow, such as 4 levels representing a high heat flow value, an average heat flow value, a heat flow value that is lower than average by a first specified amount or percentage, and a heat flow value that is much lower than average by a second specified amount or percentage larger than the first specified amount or percentage) and optionally one or more other factors (e.g., level of demand for a specified type of air supply and/or heating or cooling response, level of coolant in the HVAC system, level of air filtering in use, etc.). As one non-exclusive example, the input injections may include injecting one or more first input changes for a first combination that includes a first external air temperature level and a first external air humidity level, injecting one or more second input changes for a second combination that includes a second external air temperature level and the first external air humidity level, injecting one or more third input changes for a third combination that includes the first external air temperate level and a second external air humidity level, etc. As another non-exclusive example, the input injections may include injecting one or more first input changes for a first external air temperature level, injecting one or more second input changes for a second external air temperate level, etc. Information about the inputs and the responses is then analyzed and used to generate a model of the HVAC system's behavior, such as an incremental parametric non-linear state model representing the internal dynamics of the HVAC system (e.g., with respect to characteristics about behavior of the HVAC system, such as internal air temperature that is provided and/or internal air humidity that is provided, etc.), which is further used to control additional ongoing HVAC system operations (e.g., to determine further control actions to perform for the HVAC system), including in some cases to update a previously existing model of the HVAC system (e.g., an existing model that is based at least in part on other types of information about the HVAC system) and to use the updated HVAC system model to control whether and how much air of a specified type is provided from the HVAC system (e.g., in a current or future time period). In some embodiments, the target HVAC system may include a single HVAC unit that is represented with a single generated model, while in other embodiments the HVAC system may include multiple HVAC units (of the same type or different types) that are represented with a single generated model (e.g., for the overall performance of the HVAC system) or with multiple generated models (e.g., one model for each HVAC unit, one model for each type of HVAC unit, etc.). The one or more HVAC units may be of one or more types that include, for example, split heating/cooling systems; hybrid split systems able to use multiple types of power sources, such as natural gas and electrical; duct free, or mini-split, with individual units in different rooms; packaged heating and air with units within a building; etc.

In some embodiments, the described techniques include performing excitation of a target physical system that includes or is a wind turbine system having one or more wind turbine units by, for each of multiple levels of one or more factors (e.g., for some or all combinations of different levels for multiple different factors) that affect the behavior of the wind turbine system, injecting input changes into the wind turbine system, such as high-frequency change pulses introduced to an electro-magnetic field of a generator (e.g., a DC, or direct current, generator; an AC, or alternating current, generator; etc.) for the wind turbine system (e.g., to a rotor of the generator, such as micro- or milla- or centi- or deci-volt-per-meter (V/m) changes to the electric field and/or micro- or milla- or centi- or deci-ampere current changes, such as at three levels representing high, medium and low; micro- or nano- or pico-tesla (T) changes to the magnetic field, such as at three levels representing high, medium and low; etc.) and optionally other input changes (e.g., to characteristics of air that is used to power a wind turbine unit, such as wind speed, wind direction, air temperature, and/or humidity; to braking, such as aerodynamic braking or other internal turbine mechanical braking or resistance levels; etc.), and using intelligent active sensors to collect time changes of the responses to those injected inputs. In at least some embodiments, the multiple factors may include electrical load or other power demand (e.g., to use each of multiple electrical loads or other levels of power demand) and optionally one or more other factors (e.g., wind speeds, wind gusts, aerodynamic braking or other internal turbine mechanical braking or resistance, etc.). As one non-exclusive example, the input injections may include injecting one or more first input changes for a first combination that includes a first electro-mechanical field level and a first external air speed level, injecting one or more second input changes for a second combination that includes a second electro-mechanical field level and the first air speed level, injecting one or more third input changes for a third combination that includes the first electro-mechanical field level and a second air speed level, etc. As another non-exclusive example, the input injections may include injecting one or more first input changes for a first electro-mechanical field level, injecting one or more second input changes for a second electro-mechanical field level, etc. Information about the inputs and the responses is then analyzed and used to generate a model of the wind turbine system's behavior, such as an incremental parametric non-linear state model representing the internal dynamics of the wind turbine system (e.g., with respect to characteristics about behavior of the wind turbine system, such as power generation, internal mechanical resistance, etc.), which is further used to control additional ongoing wind turbine system operations (e.g., to determine further control actions to perform for the wind turbine system), including in some cases to update a previously existing model of the wind turbine system (e.g., an existing model that is based at least in part on other types of information about the wind turbine system) and to use the updated wind turbine system model to control whether and how much power is provided from the wind turbine system (e.g., in a current or future time period). In some embodiments, the target wind turbine system may include a single wind turbine unit that is represented with a single generated model, while in other embodiments the wind turbine system may include multiple wind turbine units (of the same type or different types) that are represented with a single generated model (e.g., for the overall performance of the wind turbine system) or with multiple generated models (e.g., one model for each wind turbine unit, one model for each type of wind turbine unit, etc.). The one or more wind turbine units may be of one or more types that include, for example, horizontal-axis turbines (such as with multiple blades or rotors), vertical-axis turbines (such as in an egg-beater shape), etc.

Additional details are described below related to performing such improved modeling of a target system's state and operational characteristics via non-destructive active excitation activities, and to using a resulting model of the target system in particular manners, and some or all of the described techniques are performed in at least some embodiments by automated operations of one or more Model Realization System (MRS) components, optionally as part of or in conjunction with one or more CDD (Collaborative Distributed Decision) systems controlling specific target physical systems (e.g., target systems that include one or more batteries).

In at least some embodiments, the target system includes a battery and the described techniques include learning and generating a dynamic model (e.g., a parametric linear model) of the battery (e.g., a lithium ion battery cell) that characterizes flow of its internal state and the corresponding effect of control operations performed on the battery, such as during or before operations to control the battery operations. By injecting electrical pulses into the battery to generate responses, internal dynamics of the battery may be measured (e.g., to reflect the internal battery chemistry, such as number of free ions at the anode and cathode; internal battery temperature; etc.) and used for generating the dynamic battery model with values for one or more parameters (e.g., voltage, current, power, etc.). Furthermore, by measuring battery responses at different charge levels and using different resistive loads, the generated parametric model better represents operations of the battery across a range of operating conditions.

In at least some embodiments, the described techniques are further used to provide a feedback control system for a target physical system (e.g., a target system having one or more batteries) that dynamically change during operation, including to generate and use a model of the target system that is improved in real-time by generating and using updated models based on information generated by active sensors. The described techniques include injecting signals into the target system in such a manner that they do not substantially alter the behavior of the target system (referred to herein as a "non-demolition" or "non-destructive" strategy), but with the injected signals eliciting a response that reflects the internal characteristics of the target system. In at least some such embodiments, the described techniques encode the dynamics of the target system under control in a function of the state of the target system referred to as a data Hamiltonian model, and further generate updates in real-time to the model of the dynamics of the target system. Some characteristics of the target system under control may not be completely known (e.g., an internal state of a battery or other physical system/component), with a data Hamiltonian model encoding the known information based at least in part on modeling performed by a model realization system. The described techniques for modeling a current state and operational characteristics of a physical target system, and using a resulting model of the target system as part of determining current and/or future automated control actions to take for the target system may be performed for various types of target systems in various embodiments. As one non-exclusive example, the physical target system may include one or more batteries used to store and provide electrical power (e.g., for a local load, for an electrical grid that supports various loads in various locations, etc.), and the automated operations to control the target system may include using characteristics of each battery's state to perform automated control of DC (direct current) power that is provided from and/or stored by the battery—such embodiments may include receiving information about inputs to, outputs from, control signal instructions provided to and other state of the one or more batteries (e.g., internal temperature readings, electrical current and/or voltage being output for use, electrical current and/or voltage being input for storage, temperature readings external to the one or more batteries as part of their surrounding environment, etc.), and using such information as part of modeling a current state and operational characteristics of the one or more batteries, and given such improved modeled information, a CDD system that controls the one or more batteries may then use such information to make decisions on current and/or future control actions that better reflect an actual current state and behavior of the target system. As another non-exclusive example, the physical target system may include a multi-room building that includes heating and/or cooling capabilities (e.g., one or more HVAC, or heating, ventilation and air conditioning, units), and the automated operations to control the target system may include using characteristics of a subset of the rooms (e.g., temperatures measured in a subset of the rooms that have temperature sensors) to perform automated control of heating and/or cooling that is provided from the heating and/or cooling capabilities to all of the rooms—such embodiments may include receiving information about inputs to, outputs from, control signal instructions provided to and other state of the heating and/or cooling capabilities and of at least some rooms of the building (e.g., internal temperature readings, amount of time and/or energy usage of the heating and/or cooling capabilities, temperature readings external to the building as part of its surrounding environment, etc.), and using such information as part of modeling a current state of the temperatures of the rooms of the building. Given such improved modeled information, a CDD system that controls the heating and/or cooling capabilities may then use such information to make decisions on current and/or future control actions that better reflect an actual current state and behavior of the target system. Similar operations may be provided for other types of physical target systems, including non-exclusive examples of fuel cells and wind turbines, as discussed elsewhere herein.

The described techniques may provide a variety of benefits and advantages in various situations. For example, many traditional control system approaches involving batteries have been ineffective for controlling complex systems in which internal state information cannot be determined and/or in which models of the batteries' behavior are difficult or impossible to obtain (e.g., via conventional techniques for attempting to describe dynamics via encoding physical principles and empirical relationships in complex mathematical representations), while the use of the described techniques overcome such problems based at least in part by actively gathering and analyzing information about operations of batteries under varying conditions such as battery charge levels and/or loads (e.g., by probing the internal state of the batteries being controlled in a non-demolition manner). Such traditional control system approaches typically involve the system designers beginning with requirements for battery system behavior, using the requirements to develop a static model of the system with constraints and other criteria, and attempting to optimize the run-time battery system operations in light of the constraints and other criteria. Conversely, in at least some embodiments, the described techniques do not need to use such constraints and other criteria, nor to develop such a resulting static model, nor to do such optimization—instead, actual behavior of a battery system is measured and used to generate a corresponding behavioral model. Similar problems exist for traditional control systems for other types of physical systems, including non-exclusive examples of fuel cells and HVAC systems and wind turbines, and the described techniques similarly address these problems by measuring actual behavior of the physical system and using it to generate a corresponding behavioral model, without the need to use such constraints and other criteria, nor to develop such a resulting static model, nor to do such optimization. Additional non-exclusive examples of such benefits and advantages include the following (with further details provided herein): improving how a current state of a target system is modeled, such as to generate a function and/or or structure that models internal operations of the target system based on actual data that is collected from active excitation of the target system rather than merely attempting to estimate target system state; increasing capabilities for handling uncertainty management and/or optimal dispatch and commitment and/or anomaly detection and response; etc.

For illustrative purposes, some embodiments are described below in which specific types of data is gathered and used in particular manners to perform specific types of control actions for specific types of target systems, including via active excitation and corresponding measurement of particular types of components, and in some embodiments for physical target systems that include batteries. However, it will be understood that such described techniques may be used in other manners in other embodiments, including with other types of target systems and active excitation techniques (e.g., including non-exclusive examples of fuel cells and HVAC systems and wind turbines), and that the invention is thus not limited to the exemplary details provided.

FIG. 1A includes an example diagram illustrating information 196 regarding how a model realization system may be used to generate a model for a battery of a target system, and information 195 regarding how the generated model may be used for runtime control of the battery in the target system—in some embodiments, the model generation may be completed before the runtime control is performed, while in other embodiments the model generation may occur concurrently with at least some runtime control activities. In other situations, the target system may include another type of electrical device or other physical system that may have other forms (e.g., a solar panel, wind turbine, inverter, fuel cell, solid waste generator, other active loads, etc.), as discussed further with respect to FIG. 1C and elsewhere herein. In addition, a system that includes one or more batteries to be controlled may further include additional components in some embodiments and situations, such as one or more electrical sources and/or one or more electrical loads, with one non-exclusive example of such a type of system being one or more home or business electrical power systems that may optionally include electrical generation sources (e.g., solar panels, wind turbines, etc.) as well as electrical load from the house or business.

In this example, FIG. 1A illustrates a model realization system 195c that participates in a learning loop to generate a current response behavioral model of the battery 195b (e.g., a lithium ion battery cell), such as for use in generating a battery model 195j that is later used by the control system 195a to control the battery—the generated model 195j in this example is in the form of an overall total system model encoded as a data Hamiltonian function $H_T$ (which in this example is a function of the state q, the momentum p and the control u at current time t). The learning loop further includes active sensors 195e and 195f that measure responses of the battery to excitation signals sent to battery anode 195h and cathode 195i, respectively, in order to provide information about responses of the battery that depend on the current internal state of the battery 195b and on an amount of resistive load applied to the battery by load element 195g (which in this example is a variable load that is controlled by the system 195c), and in at least some cases on the external temperature. While not separately illustrated in FIG. 1A, the active sensors may further include one or more temperature sensors (e.g., an external thermocouple) to measure the external temperature for the battery, such as to enable the generated model to further model battery behavior as a function of temperature. The excitation signals supplied to the battery anode and cathode are generated by the model realization system 195c, and in this example are multi-frequency microvolt pulses that are sent for some or all combinations of multiple battery charge levels or charge level ranges (e.g., approximately 20% charged, approximately 35% charged, approximately 50% charged, approximately 75% charged, approximately 90% charged, etc.) and for multiple resistive loads or load ranges, such as at multiple specified levels of microamps and/or milliamps and/or amps (e.g., at approximately 10% of the maximum load, or maximum permissible current output from the battery; approximately 30% of the maximum load; approximately 50% of the maximum load; approximately 75% of the maximum load; approximately 100% of the maximum load; etc.), with the pulses interacting with internal dynamics of the battery 195b in a non-demolition form (so as to provide internal information about dynamics of the battery without causing changes on the output 195k or control loop for the target system that exceed a defined threshold). Thus, if 5 example charge levels and 6 example load levels are used, the pulses may be used for 30 (5*6) combinations of charge and load levels. In addition, in some embodiments, the model may further be conditioned on one or more other factors (e.g., for multiple different external temperatures or temperature ranges), and if so the number of combinations will increase accordingly (e.g., for 10 example temperature levels, 5 example charge levels and 6 example load levels, the pulses will be used for 300 (10*5*6) combinations of temperature and charge and load levels. Additional details are included below regarding generating a battery model and other operations of the model realization system.

With respect to such an overall total system model $H_T$ of a target system that includes an battery, the target system may, for example, include one or more batteries used to store and provide electrical power (e.g., for a local load, for an electrical grid that supports various loads in various locations, etc.), and the automated operations to control the target system may include using characteristics of at least one such battery in the target system to perform automated control of DC (direct current) power that is provided from and/or stored by that battery. In such embodiments, the automated operations of one or more CDD agents may include generating an overall total system model of battery performance by receiving information about inputs to, outputs from, and other attributes related to the one or more batteries (e.g., electrical current and/or voltage being output for use, electrical current and/or voltage being input for storage, temperature readings external to the one or more batteries as part of their surrounding environment, etc.), and using such information as part of modeling current response behavior characteristics of the one or more batteries—given such modeled information, the CDD agent(s) that control the one or more batteries may then use such information to make decisions on current and/or future control actions in a manner that reflects actual behavior of the target system. In at least some embodiments, the response behavior of the battery is modeled as follows:

$$\dot{x}=A_{q_iL_i}x+B_{q_iL_i}u \quad y=C_{q_iL_i}x$$

where x is the state of the battery, u is a vector of input (control), y is a vector of responses, $q_i$ represents one of multiple battery charge levels, $L_i$ represents one of multiple resistive load levels, and A, B and C represent learned modeled factors (e.g., constants).

In this example, the control system 195a further performs a control loop to control operation of the battery 195b of the target system, such as to drive the target system to a desired dynamic behavior. In particular, the control system may include a CDD agent (as discussed in greater detail below with respect to FIG. 1B, as well as elsewhere herein), and an overall total model 195j of the target system that was previously generated by the Model Realization System 195c based in part on data obtained from actual operation of the target system. As part of the operation of the control system 195a, it receives a target signal that indicates a desired output or other desired operation of the battery 195b of the target system, and uses information from its overall total system model $H_T$ to determine an energy supply control command to send to the battery (e.g., to an actuator, not shown, that controls output of the battery) that satisfies defined constraints and other goals of the control system in light of its current state, while attempting to satisfy the desired output or other desired operation of the target signal if possible. The battery receives the energy supply control signal, and optionally performs a corresponding output 195k, with that output and/or other characteristics of the battery being measured at least in part by the one or more passive sensors 195d (e.g., a suite of multiple passive sensors, such as to measure operational characteristics (e.g., volts, amps, power, temperature, etc.). As one example, the automated operations to control the target system may include using characteristics of each battery's state to perform automated control of DC (direct current) power that is provided from the battery—in some such embodiments, such control may include using a DC-to-DC amplifier (e.g., a field-effect transistor, or FET, amplifier) connected to the battery to control an amount of electrical current and/or voltage being output from the battery (e.g., in a real-time manner and to optimize long-term operation of the battery), although such an amplifier is not illustrated in FIG. 1A. Such a DC-to-DC amplifier may, for example, be part of a buck converter (or step-down converter) that steps down voltage while stepping up current from its input (supply) to its output (load) and/or be part of a boost converter (or step-up converter) that steps up voltage while stepping down current from its input (supply) to its output (load), referred to generally at times herein as a "boost/buck controller" or "buck/boost controller". In addition, the control system may use an actuator for actively controlling the impedance that the battery system "sees". The battery output (charging or discharging) is optimized for factors such as load satisfaction and/or longevity, with economic factors also optionally used. The impedance actuator may be directly controlled by the control system and in series with the battery, such that the impedance is decreased when more power is desired from the battery, and is increased when less power is desired. In at least some embodiments, the impedance is implemented electronically with switches that do not increase the dissipation. A system that includes one or more batteries to be controlled may further include additional components in some embodiments and situations, such as one or more electrical sources and/or one or more electrical loads, with one non-exclusive example of such a type of system being one or more home or business electrical power systems that may optionally include electrical generation sources (e.g., solar panels, wind turbines, etc.) as well as electrical load from the house or business. The passive sensors 195d may further supply their measured readings to the control system 195a, such as to update corresponding state information in the overall system model $H_T$, with the control system 195a continuing to control operation of the battery 195b for a next target signal (e.g., in a continuous or substantially continuous manner, and such as based on an overall system model that is updated in a continuous or substantially continuous manner based at least in part on readings from the passive sensors 195d).

As part of controlling use of a lithium ion battery system in FIG. 1A, various illustrated components interact to control operations of the battery according to one or more defined goals in light of defined constraints, rules and other criteria, as discussed elsewhere herein. In some embodiments, the automated activities to control the battery may be performed in a real-time manner and/or to optimize long-term operation of the battery (e.g., the life of the battery), while satisfying as many external requests for power (e.g., from a utility or other load to which the battery can supply power) as is possible (e.g., at least a defined percentage or quantity of such requests)—for example, the control system may attempt to fully or partially satisfy a request from the utility for power in a real-time manner if the request can be satisfied in a way that also satisfies other constraints on the battery performance given the current state of the battery and the defined goal(s), such as to enable the battery to operate in a desired non-saturation range or level (e.g., with respect to an internal temperature of the battery and/or internal chemistry of the battery). In addition, the control commands sent from the control system to the battery may have various forms in various embodiments, such as to specify an amount of power to be generated as DC output of the battery, and/or for the battery to receive electrical power from one or more sources (not shown) to be stored for later use (e.g., at different time periods, or otherwise at different times). The specified power amount to be generated may include information indicating, for example, to increase or decrease the power being output by a specified amount, or to not change the power output. The output of the battery may serve to provide power to one or more loads (e.g., an electrical grid associated with the utility), and in at least some embodiments may be connected to an inverter/rectifier component (not shown) to convert the power output of the battery to AC power to support corresponding loads—such an inverter may, for example, control power being provided from the battery by regulating voltage and/or frequency of the AC power. Similarly, input of the battery may serve to receive power from one or more sources (not shown), and in at least some embodiments may be connected to an inverter/rectifier component (not shown) to convert AC power input from the sources to DC power for the battery—such a rectifier may, for example, control power being provided to the battery by regulating voltage and/or frequency of the AC power.

In addition, while in some embodiments the model realization system and control agent may be implemented as separate components (e.g., with the model realization system implemented in whole or in part at the location of the battery, and/or in whole or in part at a remote location), in other embodiments the control agent and model realization system may be implemented as a single component (whether at the location of the battery or remote from it). Further details regarding operation of the control agent to determine operations to take for the battery are discussed in greater detail below.

Figure 1B:
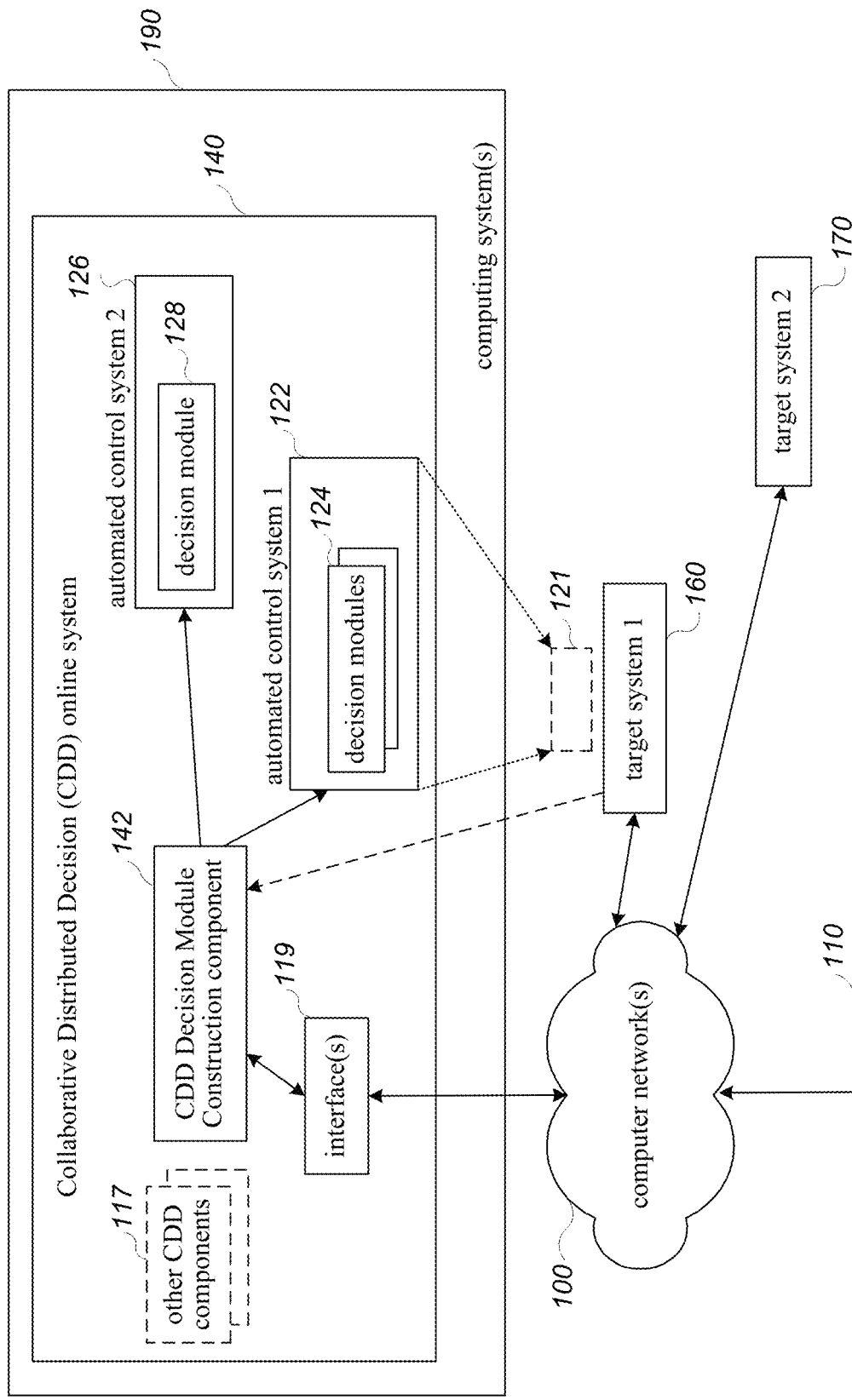
FIG. 1B is a network diagram illustrating an example environment in which a system for performing cooperative distributed control of target systems may be configured and initiated.
Figure 1C:
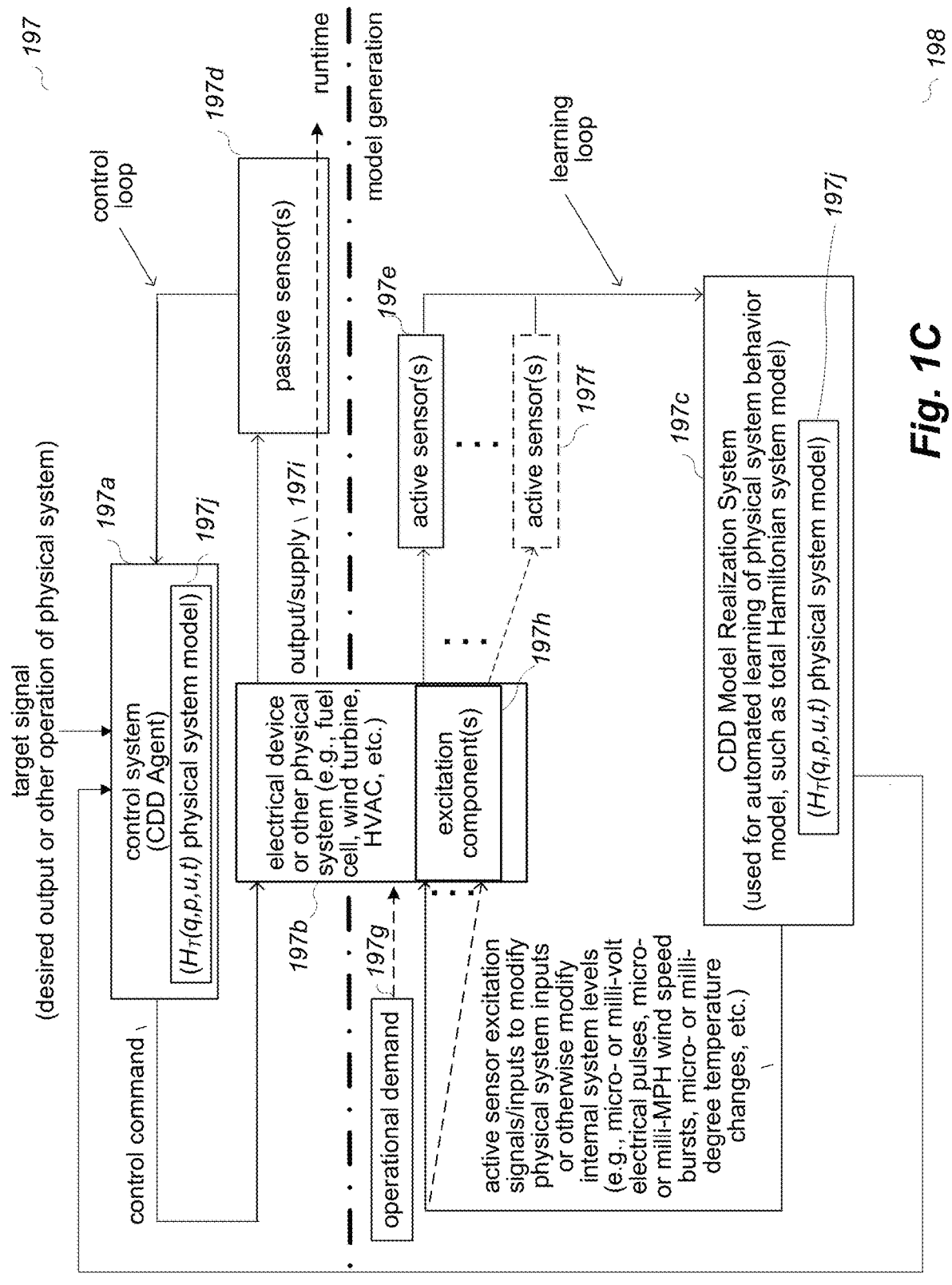

FIG. 1C includes an example diagram illustrating information 198 regarding how a model realization system may be used to generate a model for a physical target system (including non-exclusive examples of fuel cells and HVAC systems and wind turbines), and information 197 regarding how the generated model may be used for runtime control of the physical target system—in some embodiments, the model generation may be completed before the runtime control is performed, while in other embodiments the model generation may occur concurrently with at least some runtime control activities. Similar components in FIG. 1C to those of FIG. 1A include similar labels (e.g., with the numeric portion 195 of the labels in FIG. 1A changed to a numeric portion 197 of the labels in FIG. 1C).

In this example, FIG. 1C illustrates a model realization system 197c that participates in a learning loop to generate a current response behavioral model of the physical system 197b (e.g., a fuel cell, an HVAC system, a wind turbine, etc.), such as for use in generating a physical system model 197j that is later used by the control system 197a to control the physical system—the generated model 197j in this example is in the form of an overall total system model encoded as a data Hamiltonian function $H_T$ (which in this example is a function of the state q, the momentum p and the control u at current time t). The learning loop further includes one or more active sensors 197e and optionally 197f that measure responses of the physical system to excitation signals or other inputs sent to one or more components 197h of the physical system 197b in order to provide information about responses of the physical system/components that depend on the current internal state of the physical system/components 197b and on an amount of operational demand applied to the physical system by element 197g (which in some embodiments is a variable demand that is controlled by the system 197c), and in at least some cases on one or more external elements (e.g., external temperature, external wind speed, etc.). While not separately illustrated in FIG. 1C, the active sensors may further include one or more external sensors to measure an environment around the physical system 197b (e.g., an external thermocouple to measure the external temperature for the physical system, an external wind speed measurement sensor, etc.), such as to enable the generated model to further model physical system behavior as a function of one or more such measured external factors. The excitation signals or other inputs that are supplied to the excitation component(s) 197h are generated or otherwise initiated by the model realization system 197c (in some cases by sending instructions to other physical components, not shown, that actually produce the supply of the excitation signals or other inputs), and may be of various types depending on the type of physical system (as discussed in greater detail elsewhere herein), with the excitation signals or other inputs interacting with internal dynamics of the physical system 197b in a non-demolition or non-destructive form (so as to provide internal information about dynamics of the physical system without causing changes on the output 197i or control loop for the target system that exceed a defined threshold). Thus, if 5 example excitation levels of a first type are used and 6 example excitation levels of a second type are used, the excitation signals or other supply may be used for 30 (5*6) combinations of excitation levels. In addition, in some embodiments, the model may further be conditioned on one or more other factors (e.g., for multiple different external temperatures or temperature ranges, for multiple different external wind speeds, etc.), and if so the number of combinations will increase accordingly (e.g., for 10 example external temperature levels, 5 example excitation levels of a first type and 6 example excitation levels of a second type, the excitation signals or other supply will be used for 300 (10*5*6) combinations of temperature and excitation levels. Additional details are included below regarding generating a physical system model and other operations of the model realization system.

With respect to such an overall total system model $H_T$ of a target physical system, the automated operations of one or more CDD agents may include generating an overall total system model of physical system performance by receiving information about inputs to, outputs from, and other attributes related to the physical system's operations, and using such information as part of modeling current response behavior characteristics of the physical system—given such modeled information, the CDD agent(s) that control the physical system may then use such information to make decisions on current and/or future control actions in a manner that reflects actual behavior of the physical system. In at least some embodiments, the response behavior of the physical system is modeled as follows:

$$\dot{x} = A_{q_i L_i} x + B_{q_i L_i} u \quad y = C_{q_i L_i} x$$

where x is the state of the physical system, u is a vector of input (control), y is a vector of responses, $q_i$ represents one of multiple levels of an attribute of the physical system (e.g., an attribute that has a non-linear effect on operation of the physical system as the levels of the attribute change, such as power demand or load for a wind turbine, external air temperature for an HVAC system, electrical charge for a fuel cell, etc.), $L_i$ represents one of multiple operational demand levels, and A, B and C represent learned modeled factors (e.g., constants).

In this example, the control system 197a further performs a control loop to control operation of the physical system 197b of the target system, such as to drive the target system to a desired dynamic behavior. In particular, the control system may include a CDD agent (as discussed in greater detail below with respect to FIG. 1B, as well as elsewhere herein), and an overall total model 197j of the target system that was previously generated by the Model Realization System 197c based in part on data obtained from actual operation of the target system. As part of the operation of the control system 197a, it receives a target signal that indicates a desired output or other desired operation of the physical system 197b of the target system, and uses information from its overall total system model $H_T$ to determine an output/supply control command to send to the physical system (e.g., to an actuator, not shown, that controls output of the physical system) that satisfies defined constraints and other goals of the control system in light of its current state, while attempting to satisfy the desired output or other desired operation of the target signal if possible. The physical system receives the output/supply control signal, and optionally provides a corresponding output/supply 197i, with that output/supply and/or other characteristics of the physical system being measured at least in part by the one or more passive sensors 197d (e.g., a suite of multiple passive sensors, such as to measure operational characteristics of the physical system 197b and/or its output/supply 197i). The physical system output/supply may in at least some embodiments be optimized for factors such as demand satisfaction and/or longevity, with economic factors also optionally used. As noted elsewhere herein in greater detail, the physical system to be controlled may optionally include one or more electrical sources and/or one or more electrical loads, with one non-exclusive example of such a type of system being one or more home or business electrical power systems that may optionally include electrical generation sources (e.g., solar panels, wind turbines, etc.) as well as electrical load from the house or business. The passive sensors 197d may further supply their measured readings to the control system 197a, such as to update corresponding state information in the overall system model $H_T$, with the control system 197a continuing to control operation of the physical system 197b for a next target signal (e.g., in a continuous or substantially continuous manner, and such as based on an overall system model that is updated in a continuous or substantially continuous manner based at least in part on readings from the passive sensors 197d).

As part of controlling use of a physical system in FIG. 1C, various illustrated components may interact to control operations of the physical system according to one or more defined goals in light of defined constraints, rules and other criteria, as discussed elsewhere herein. In some embodiments, the automated activities to control the physical system may be performed in a real-time manner and/or to optimize long-term operation of the physical system (e.g., the life of the physical system), while satisfying as many external requests for power or other output/supply (e.g., from a utility or other load to which the physical system can supply power, from one or more rooms of one or more buildings for indicated heating and/or cooling, etc.) as is possible (e.g., at least a defined percentage or quantity of such requests)—for example, the control system may attempt to fully or partially satisfy a request for power or other output/supply in a real-time manner if the request can be satisfied in a way that also satisfies other constraints on the physical system performance given the current state of the physical system and the defined goal(s), such as to enable the physical system to operate in a desired range or level that does not damage the physical system or otherwise reduce its effectiveness (e.g., with respect to internal state of the physical system). In addition, the control commands sent from the control system to the physical system may have various forms in various embodiments. The specified output/supply amount to be provided may include information indicating, for example, to increase or decrease the output/supply by a specified amount, or to not change a prior output/supply (e.g., to maintain a current level of output/supply or resulting external state being produced, such as a room temperature for an HVAC system).

In addition, while in some embodiments the model realization system and control agent may be implemented as separate components (e.g., with the model realization system implemented in whole or in part at the location of the physical system, and/or in whole or in part at a remote location), in other embodiments the control agent and model realization system may be implemented as a single component (whether at the location of the physical system or remote from it). Further details regarding operation of the control agent to determine operations to take for the physical system are discussed in greater detail below.

However, before further discussion of the model realization system and its functionality, a more general description of the control of target systems using such representations and other models is provided.

In particular, FIG. 1B is a network diagram illustrating an example environment in which a system for performing cooperative distributed control of one or more target systems may be configured and initiated. In particular, an embodiment of a CDD system 140 is executing on one or more computing systems 190, including in the illustrated embodiment to operate in an online manner and provide a graphical user interface (GUI) (not shown) and/or other interfaces 119 to enable one or more remote users of client computing devices 110 to interact over one or more intervening computer networks 100 with the CDD system 140 to configure and create one or more decision modules to include as part of an automated control system to use with each of one or more target systems to be controlled. While not illustrated in FIG. 1B, the CDD system 140 may include and use one or more model realization systems as discussed herein, such as to include one or more such model realization systems in one or both of the automated control systems 1 and 2. As discussed further below, each decision module may have a model of a target system being controlled that includes various information about target system state, control actions, goals, etc.—such target system models of decision modules may be separate from the generated models of the model realization system(s) in at least some embodiments, while in other embodiments a physical target system may include, in the target system's decision module's model, some or all of the generated models of the model realization system (e.g., for one or more included batteries or other physical system/components).

In particular, target system 1 160 and target system 2 170 are example target systems illustrated in this example, although it will be appreciated that only one target system or numerous target systems may be available in particular embodiments and situations, and that each such target system may include a variety of mechanical, electronic, chemical, biological, and/or other types of components to implement operations of the target system in a manner specific to the target system. In this example, the one or more users (not shown) may interact with the CDD system 140 to generate an example automated control system 122 for target system 1, with the automated control system including multiple decision modules (or "agents") 124 in this example that will cooperatively interact to control portions of the target system 1 160 when later deployed and implemented. The interactions of the users with the CDD system 140 to create the automated control system 122 may involve a variety of interactions over time, including in some cases independent actions of different groups of users. In addition, as part of the process of creating and/or training or testing automated control system 122, it may perform one or more interactions with the target system 1 as illustrated, such as to obtain partial initial state information, although some or all training activities may in at least some embodiments include simulating effects of control actions in the target system 1 without actually implementing those control actions at that time. In some embodiments and situations, such initial user interactions may be used to generate an initial rule-based overall system model of a target system that is based at least in part on binary rules.

After the automated control system 122 is created, the automated control system may be deployed and implemented to begin performing operations involving controlling the target system 1 160, such as by optionally executing the automated control system 122 on the one or more computing systems 190 of the CDD system 140, so as to interact over the computer networks 100 with the target system 1. In other embodiments and situations, the automated control system 122 may instead be deployed by executing local copies of some or all of the automated control system 122 (e.g., one or more of the multiple decision modules 124) in a manner local to the target system 1, as illustrated with respect to a deployed copy 121 of some or all of automated control system 1, such as on one or more computing systems (not shown) that are part of or otherwise associated with the target system 1. In addition, in embodiments and situations in which initial user interactions are used to generate an initial rule-based system model of a target system using binary rules, the initially deployed automated control system 122 may be based on such an initial rule-based system model, and data from the operation of the target system under control of that initially deployed automated control system 122 may be gathered and used to include information about current characteristics of the target system in a revised model of the target system. Furthermore, in at least some embodiments, a model realization system may further generate a model of a battery within a target system or of another type of physical system/component in the manner discussed herein, whether before or during other operations of an automated control system for a target system that includes the battery or other physical system/component, and whether for use instead of or in addition to any user-specified model of the battery or other physical system/component (e.g., to replace or supplement/update any such user-specified model, to update an existing model with additional details, etc.).

In a similar manner to that discussed with respect to automated control system 122, one or more users (whether the same users, overlapping users, or completely unrelated users to those that were involved in creating the automated control system 122) may similarly interact over the computer network 100 with the CDD system 140 to create a separate automated control system 126 for use in controlling some or all of the target system 2 170. In this example, the automated control system 126 for target system 2 includes only a single decision module (or "agent") 128 that will perform all of the control actions for the automated control system 126. The automated control system 126 may similarly be deployed and implemented for target system 2 in a manner similar to that discussed with respect to automated control system 122, such as to execute locally on the one or more computing systems 190 and/or on one or more computing systems (not shown) that are part of or otherwise associated with the target system 2, although a deployed copy of automated control system 2 is not illustrated in this example. It will be further appreciated that the automated control systems 122 and/or 126 may further include other components and/or functionality that are separate from the particular decision modules 124 and 128, respectively, although such other components and/or functionality are not illustrated in FIG. 1B.

The network 100 may, for example, be a publicly accessible network of linked networks, possibly operated by various distinct parties, such as the Internet, with the CDD system 140 available to any users or only certain users over the network 100. In other embodiments, the network 100 may be a private network, such as, for example, a corporate or university network that is wholly or partially inaccessible to non-privileged users. In still other embodiments, the network 100 may include one or more private networks with access to and/or from the Internet. Thus, while the CDD system 140 in the illustrated embodiment is implemented in an online manner to support various users over the one or more computer networks 100, in other embodiments a copy of the CDD system 140 may instead be implemented in other manners, such as to support a single user or a group of related users (e.g., a company or other organization), such as if the one or more computer networks 100 are instead an internal computer network of the company or other organization, and with such a copy of the CDD system optionally not being available to other users external to the company or other organizations. In addition, the CDD system 140, each of its components (including component 142 and optional other components 117, such as one or more CDD Control Action Determination components and/or one or more CDD Coordinated Control Management components and/or one or more CDD Model Realization Systems), each of the decision modules, and/or each of the automated control systems may include software instructions that execute on one or more computing systems (not shown) by one or more processors (not shown), such as to configure those processors and computing systems to operate as specialized machines with respect to performing their programmed functionality.

As noted above, various types of data may be obtained and used as part of modeling operational characteristics of a target system in a general overall model, including information about prior input data to the target system and resulting behavior of the target system. In some embodiments and situations, such data may be gathered in an automated manner from one or more types of passive hardware sensors that do not use the types of excitation information discussed elsewhere herein, and in some embodiments and situations, may include information about actions of human users or otherwise information about such humans. The term "sensor" and "sensor data" as used herein generally refers to such data regardless of source or type, including data from hardware sensors and/or data from or about human users, unless otherwise indicated with respect to a particular situation. In addition, the modeling of the current overall characteristics of a target system and/or of current internal state of the target system's batteries or other physical system/component via excitation activities may in at least some embodiments be performed to complete or repair or otherwise address conflicts in state information for one or more parts of the target system, such as from lack of sufficient internal state structure information or other information, and to enable learning of or other improvements to a function or other model of the target system's internal state and operational characteristics. Additional details are included below related to obtaining and using such sensor data.

While not illustrated in FIG. 1B, the distributed nature of operations of automated control systems such as those of 122 allow partially decoupled operations of the various decision modules, include to allow modifications to the group of decision modules 124 to be modified over time while the automated control system 122 is in use, such as to add new decision modules 124 and/or to remove existing decision modules 124. In a similar manner, changes may be made to particular decision modules 124 and/or 128, such as to change rules or other restrictions specific to a particular decision module and/or to change goals specific to a particular decision module over time, with a new corresponding model being generated and deployed within such a decision module, including in some embodiments and situations while the corresponding automated control system continues to control operations of a corresponding target system. As one example, at least some such modifications may reflect operations of one or more model realization systems to create or improve a model of a battery of a target system at one or more times, such as to automatically learn and provide updates about an internal state model determined for the target system battery from generated excitation signals (whether automatically or in response to additional user instructions or interactions) that is used to update and produce the improved target system model for further use. As other examples, at least some such modifications may reflect operations of one or more model realization systems to create or improve a model of another type of physical target system/component at one or more times, such as to automatically learn and provide updates about an internal state model determined for the physical target system/component from generated excitation signals (whether automatically or in response to additional user instructions or interactions) that is used to update and produce the improved target system model for further use. In addition, while each automated control system is described as controlling a single target system in the example of FIG. 1B, in other embodiments and situations, other configurations may be used, such as for a single automated control system to control multiple target systems (e.g., multiple inter-related target systems, multiple target systems of the same type, etc.), and/or for multiple automated control systems to operate together to control a single target system, such as by each operating independently to control different portions of that target control system. It will be appreciated that other configurations may similarly be used in other embodiments and situations.

As noted above, in at least some embodiments, the model of a target system to be controlled is encoded as a data Hamiltonian model that is a function of three types of variables (state variables, momentum variables and control variables), and is composed of three additive elements (the physical model, the constrained model and the learned model). The physical and constrained models are determined respectively by the physical principles characterizing the system and operational requirements. The learned model is generated by a model realization system from the active sensor signals. In particular, the three types of variables used in the function for the data Hamiltonian model include a vector defining the state of the battery or other physical system/component, a vector defining the momentum of the battery or other physical system/component, and a vector of action variables that control the battery or other physical system/component. The three additive elements that compose the data Hamiltonian model include three Hamiltonians ($H_0$, $H_C$ and $\Delta H_B$), where $H_0$ is the physical Hamiltonian of the battery or other physical system/component, $H_C$ is the constrained Hamiltonian representing the known operational and requirement constraints, and $\Delta H_B$ is the learned Hamiltonian as a function of collecting data from the active sensors, with the total Hamiltonian model in the following form:

$$H_T = H_0 + H_C + \Delta H_B.$$

$H_0$ and $H_C$ are determined from stored operational rules and historical data of the battery or other physical system/component. The total Hamiltonian model $H_T$ has the same properties of the Hamiltonian of classic mechanics, but adapted to electrical devices or other physical system/component. In addition to the total Hamiltonian model $H_T$ that characterizes the dynamic target system, a control system implemented by the described techniques may in some embodiments use a specified desired behavior Hamiltonian $H_D$, which reflects the desired behavior of the system under control, and affects the dynamics of the control signal produced by the control system.

The total Hamiltonian model $H_T$ encodes the evolution of the battery system or other physical system/component under control, with the evolution represented in the form of the extended Hamilton Jacobi equations, as follows:

$$\frac{dq(t)}{dt} = \frac{\partial H_T}{\partial p(t)}$$

$$\frac{dp(t)}{dt} = -\frac{\partial H_T}{\partial q(t)}$$

$$\frac{du(t)}{dt} = -\Gamma * \frac{\partial}{\partial u}\left(\frac{d(H_T - H_D)^2}{dt}\right)$$

where q(t) is the state vector of the battery or other physical system/component being learned, p(t) is their momentum, and u(t) is the control action vector. The first two equations are classic evolution equations of the dynamics of the dynamic target system, and the last equation describes control of the battery on the DC side or other physical system/component to satisfy constraints and approximate the desired behavior represented by $H_D$. The parameter T is an empirical parameter to ensure stability of the control system.

Turning now to FIGS. 2A-2H, these figures illustrate examples of performing described techniques of the model realization system to model a current internal state of a battery via corresponding excitation and analysis activities (e.g., to improve a total system model of the battery and use it to perform further automated control of DC power from the battery).

Figure 2A:
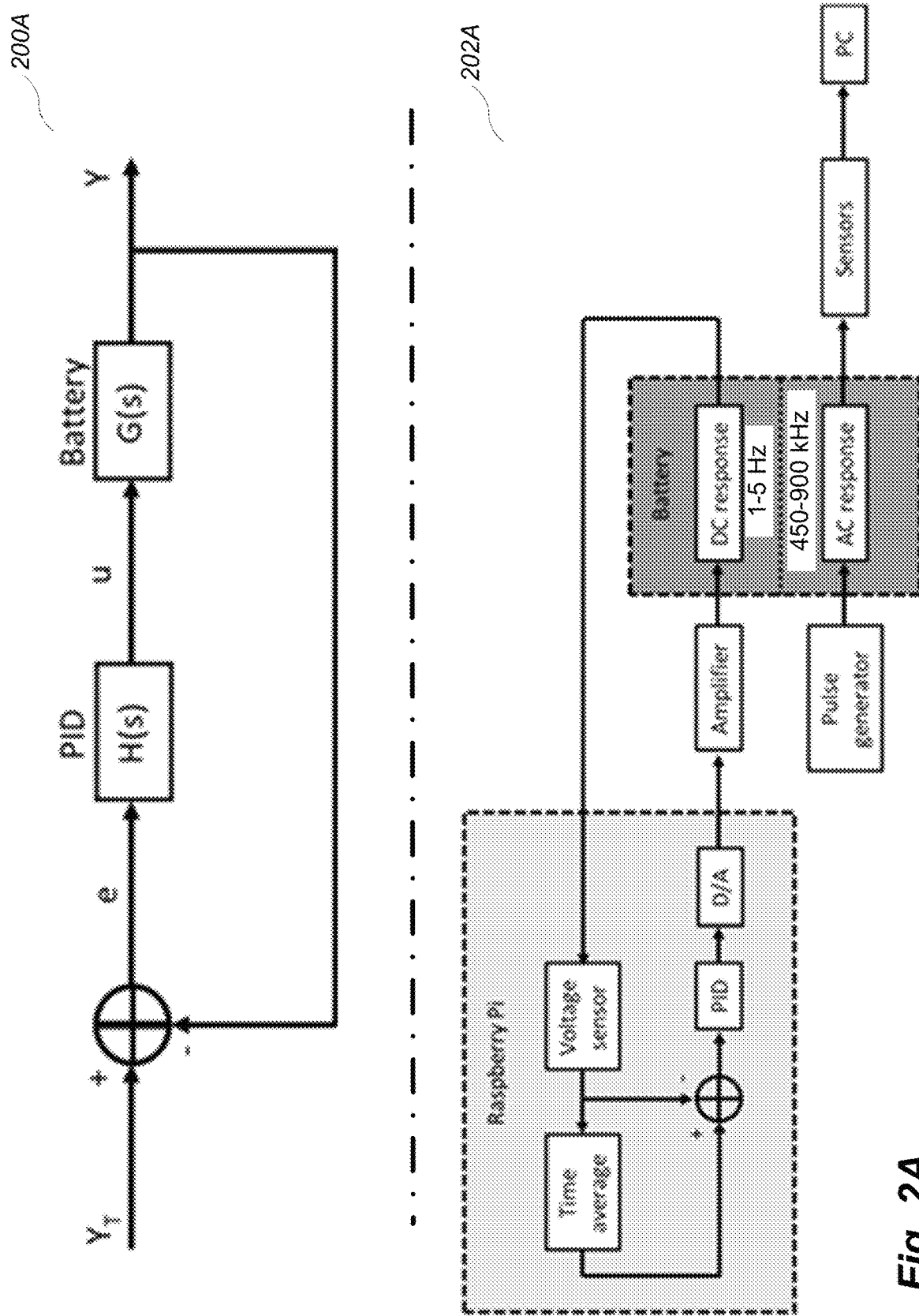
FIGS. 2A-2K illustrate examples of performing described techniques to determine a current internal state of a battery and/or other physical system via corresponding non-destructive active excitation and analysis activities, in order to generate an incremental parametric non-linear model of the battery and/or of another physical system for use in further automated control of the battery (e.g., to control DC power provided from the battery) and/or other physical system.

With respect to FIG. 2A, it illustrates information 200A providing a high-level system diagram example, as well as information 202A with additional details regarding an example logical diagram of impulse response measurement—it will be appreciated that, while various specific details are provided for the sake of the examples, the invention is not limited to such details unless otherwise indicated.

As previously noted, in at least some embodiments, a model of a battery's dynamic behavior is generated by gathering and analyzing information about the batteries' operations under varying conditions (e.g., under varying battery charge levels and/or loads). As part of doing so, a pulse signal is injected for each range of charge level, and sensors' time response is measured and used for generating a parametric dynamic model of the battery. This process is repeated for each range of charge level, for each of several resistive loads. The range may be determined, for example, by selecting the largest range for each level that is consistent with the sensitivity of the battery to charge and load changes. In addition, the operations of the model realization system may be carried out in some embodiments by real-time software that includes the computation of the estimated battery charge, and generates a linear parametric model of the dynamics of the voltage, current and power of the battery as a function of load and temperature. The generating of the parametric linear model may use dynamic realization and filtering algorithms to estimate the parameters of the model for each range of charge and load, and also include a process for determining the quality of the generated model, and whether the selected charge and load ranges are correct. For the purpose of these examples, a battery cell is considered standard (e.g., acceptable for use) if its' model parameters generate a metric by simulation that is within the acceptable value for the corresponding metric of the base battery cell of its kind.

It is noted that the use of an impulse response method to measure the system transfer function leads to potential safety risks to the battery as low-frequency oscillations may occur inside the battery. The frequency of these oscillations is typically on the order of 1-5 Hz. If not properly controlled, irreversible damages to the battery can quickly occur. To prevent such damages, a PID (proportional-integral-derivative) controller with feedback control may be used (e.g., implemented in the Raspberry Pi architecture). To achieve safety control, a PID controller may be used in such embodiments to drive a power amplifier in order to counter-act the voltage induced on the battery by the low-frequency oscillation. The battery voltage is measured in real-time and is used as the feedback signal to compare with the expected target voltage (e.g., time-average voltage). A digital low-pass filter may further be implemented to avoid interference with high-frequency response of the battery, to improve efficacy of the impulse response measurement.

Turning to information 200A of FIG. 2A, the system diagram results in the following:

$$Y(s)=G(s)u(s)$$

$$u(s)=H(s)e(s)$$

$$e(s)=Y_T(s)-Y(s)$$

where Y is the instantaneous output voltage of the battery, and $Y_T$ is the target voltage for the PID controller, which can be the moving time-averaged value of Y. Therefore, the system transfer function is $$F(s) = \frac{Y(s)}{Y_T(s)} = \frac{G(s)H(s)}{1+G(s)H(s)} = \frac{P(s)^{(k)}}{Q(s)^{(m)}} \quad (A)$$

where $P(s)^{(k)}$ and $Q(s)^{(m)}$ are k-th and m-th order polynomials with k<=m. In this particular example, only proportional and integral controls are used for the PID controller:

$$u(t)=k_p e(t)+k_1 \int e(t)dt$$

$$u(s) = k_p e(s) + k_1 \frac{e(s)}{s} = \left(k_p + \frac{k_1}{s}\right)e(s)$$

i.e., $$H(s) = \frac{u(s)}{e(s)} = \frac{k_p s + k_1}{s} \quad (B)$$

And the transfer function of the battery is known (e.g., is given by the manufacturer), and takes the following general form:

$$G(s) = \frac{1}{s^2}\frac{k_1}{s-\alpha}\frac{s-\beta}{s-\gamma}\frac{k_2}{s^2+2\xi\omega+\omega^2} \quad (C)$$

where the terms $$\frac{k_1}{s-\alpha}, \frac{s-\beta}{s-\gamma}, \text{ and } \frac{k_2}{s^2+2\xi\omega+\omega^2}$$

grossly describe the chemistry, phase, and low-pass filtering characteristics of the battery, respectively. The parameters α, β, γ, ξ, ω, $k_1$, $k_2$ are battery-specific and are known. Note that the double-pole at s=0 ensures sufficient attenuation at DC. By plugging Equations (B) and (C) into (A), the overall system transfer function should take the following form:

$$F(s) = \frac{\beta_3 s^3 + \beta_2 s^2 + \beta_1 s + \beta_0}{s^4 + \alpha_3 s^3 + \alpha_2 s^2 + \alpha_1 s + \alpha_0} \quad (D)$$

where $\alpha_i$ (i=0 . . . 3) and $\beta_j$ (j=0 . . . 3) are given by the parameters α, β, γ, ξ, ω, $k_1$, $k_2$, $k_p$, $k_1$ in Equations (B) and (C). Note that, as shown in Equation (C), G(s) is a function of the voltage signal frequency, which is different from the frequency component of s=σ+jω in Laplace transform. A pole localization strategy given by $$F(s) = k\frac{(s-\delta)^3}{(s-\epsilon)^4} \quad (E)$$

is used, which matches the polynomial orders in Equation (D). The zero- and pole-locations of Equation (E) are chosen in this example as design parameters to satisfy the following design objectives:

Low-frequency band-pass filtering

Zero phase-shift for the overall system

Guaranteed stability within the frequency pass-band.

Finally, by equating the fractional polynomials given in Equations (D) and (E), the governing parameters of the PID controller (i.e., $k_p$ and $k_1$) can be expressed in terms of battery-specific and design parameters α, β, γ, ξ, ω, $k_1$, $k_2$, k, δ, ε, all of which are known. In this example, the term AC is used to refer to voltage (or current) that varies rapidly in time (i.e., high frequency signal, e.g., >100 kHz), and DC is used to refer to voltage (or current) that changes slow in time (i.e., low frequency, e.g., <10 Hz). The intermediate frequencies can take various forms.

Information 202A of FIG. 2A illustrates a logical diagram of the AC and DC circuitry, where D/A is a digital/analog converter implemented in the Raspberry Pi architecture. The actual battery bank may, for example, consist of a 2-D array of identical cells connected in series and in parallel. The overall model of the battery bank is derived in this example from the model of a single cell, by multiplying the voltage response function with the number of serial cell stages, and by multiplying the current response function with the number of parallel stages.

In one example of the systems illustrated in information 202A of FIG. 2A, they may include a programmable signal generator, a storage scope, a micro-processor data acquisition, pulse generation, and an interface to database system. The programmable signal generator may be commanded by the micro-processor to generate the multi-frequency pulses that drive the active sensors exciting the two electrodes of the battery cell. The response of these excitations is collected into the micro-processor and sent to a database (not shown). Time stamped data is used to construct the parametric dynamic model of the battery cell. In addition, the active sensors may include an external thermocouple to determine the dynamical effects of temperature, and the battery may be provided with an impedance low frequency PID (proportional-integral-derivative) controller (e.g., implemented digitally in the micro-processor) to prevent the battery cell from overheating.

Figure 2B:
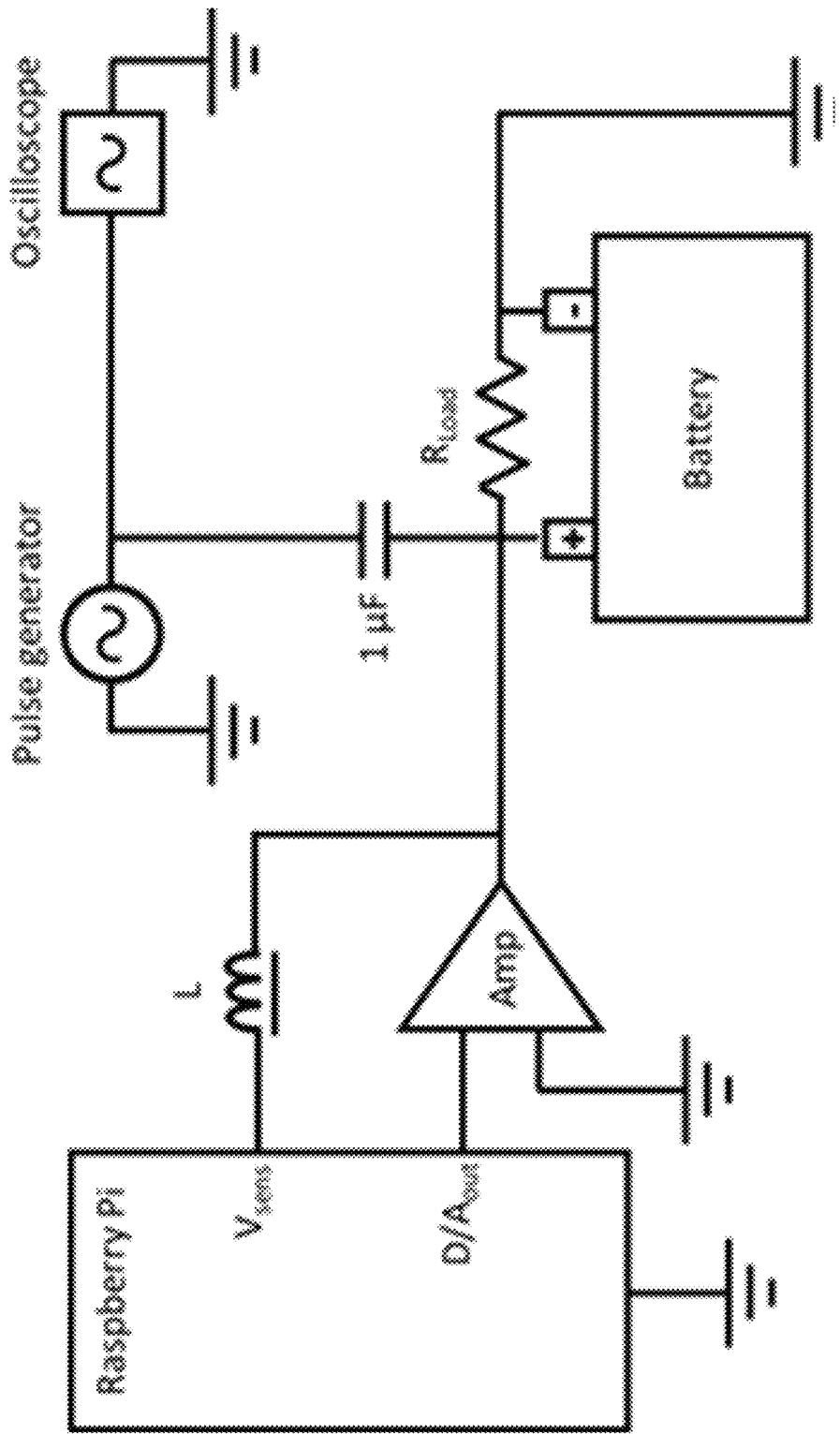

Information 200B of FIG. 2B continues the examples of FIG. 2A, and illustrates an example electronic diagram of AC and DC circuitry that may be used in some embodiments. The time-domain impulse response will be measured and digitized by the oscilloscope, and subsequently exported to a computing system for signal processing.

With respect to the examples of FIGS. 2A-2B, an incremental model may be applied to derive u(t+Δ) in terms of the previous values of u(t) and e(t), such as by using a two-step Adams-Bashforth method. In at least some implementations, only proportional and integral controls (P and I) are used, as differential control is more susceptible to the influence of noise. As a result, control is given in the form of the following:

$$u(t) = k_p e(t) + k_1 \int_0^t e(\mathcal{T}) d\mathcal{T} \tag{F}$$

where e(t) is the time-dependent error function (the input to H in information 200A of FIG. 2A). Its transformation in the Laplace domain is $$u(s) = k_p e(s) + \frac{k_1}{s} e(s)$$

Therefore, the transfer function is given by $$H(s) = \frac{u(s)}{e(s)} = \frac{k_p s + k_1}{s}$$

Using Equation (F), the following can be written:

$$\dot{u}(t) = k_p \dot{e}(t) + k_1 e(t) = k_p \frac{e(t) - e(t - \Delta)}{\Delta} + k_1 e(t)$$

Using the Adams-Bashforth method gives $$u(t + \Delta) = u(t) + \frac{3}{2}\Delta \left[ k_p \frac{e(t) - e(t - \Delta)}{\Delta} + k_1 e(t) \right] -$$

$$1/2\Delta \left[ k_p \frac{e(t - \Delta) - e(t - 2\Delta)}{\Delta} + k_1 e(t - \Delta) \right].$$

After rearranging the terms, the following equation results:

$$u(t + \Delta) = \tag{G}$$

$$u(t) + \frac{3}{2}(k_p + \Delta k_1)e(t) + (-2k_p - 1/2\Delta k_1)e(t - \Delta) + 1/2k_p e(t - 2\Delta)$$

which gives an example formula for implementation of the PID incremental control model.

Figure 2C:
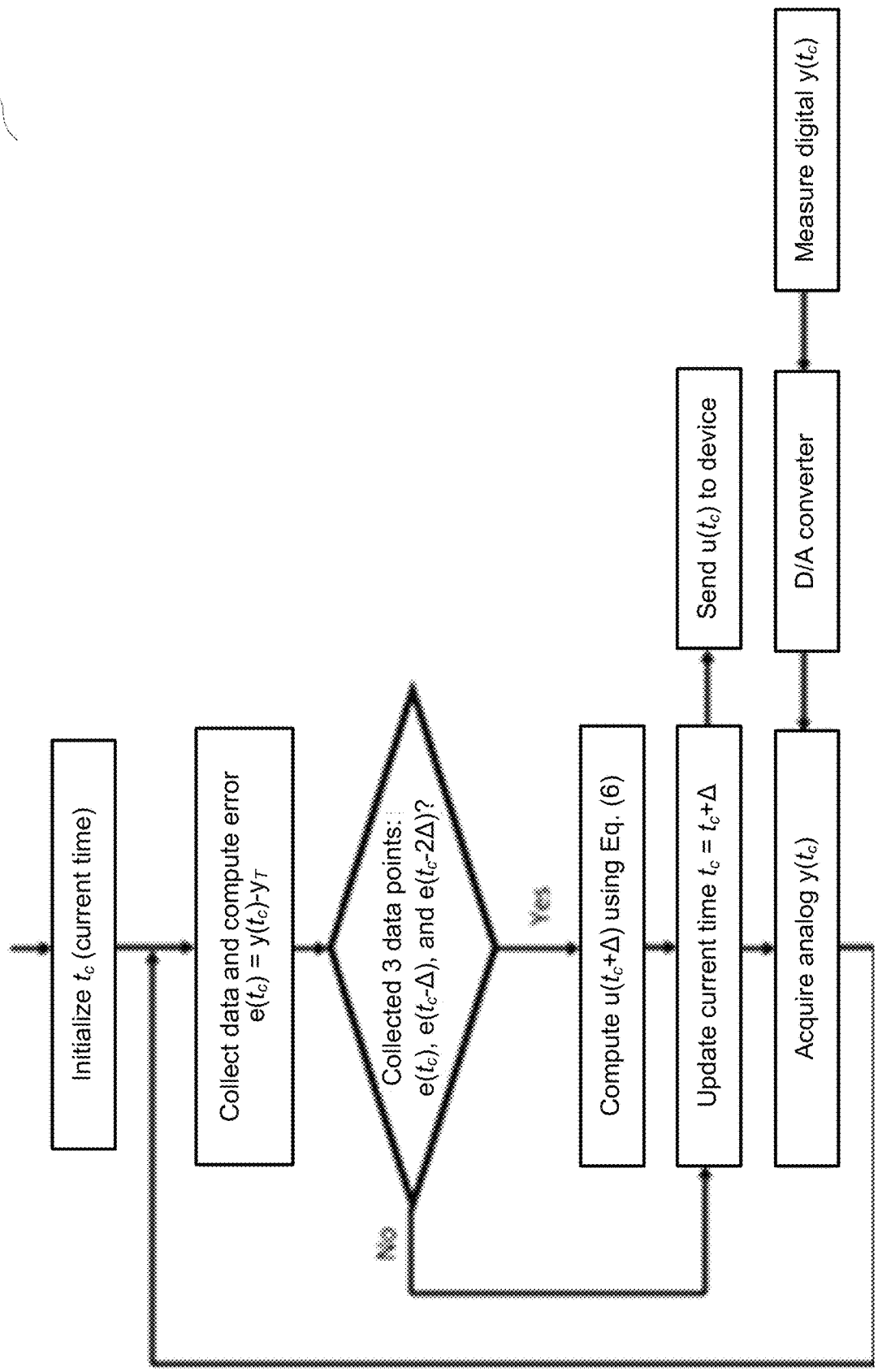

Information 200C of FIG. 2C continues the examples of FIGS. 2A-2B, and illustrates a logic diagram for implementing techniques of these examples.

In at least some situations, an incremental model used to describe system dynamics is considered linear within a specified incremental time interval. With respect to the described techniques for the examples above involving generating a numerical model of a given system via learning, they may use characterization of the system using experimentally obtained data to train a predetermined generalized system model. In the context of modeling an electrical system, carefully designed small "perturbative signals" may be used as the input to the electric circuit without disrupting the existing system states. By doing so, an input-output relation is established for the given system. The output signals in response to the perturbative input signals are subsequently detected as the system response, which fully characterizes a locally linear time-invariant (LTI) system.

As part of studying an electrical system, a fundamental question may include what the output signal would be for any given input signal. As there is an infinite number of possible input signals in the time domain, the input-output relationship may be analyzed in the frequency domain via Fourier transform. For this reason, it is beneficial to probe the system with input at multiple frequencies that cover the spectrum of interest, and detect the output at frequencies of interest. Note that the input and output spectrum are not necessarily the same for any given system. To achieve efficient sampling in the frequency domain, an impulse response method can be used to characterize the system in the frequency domain, which is sufficient to fully characterize any LTI system. For nonlinear systems, such as the battery discussed in these examples, this technique is still valid for incremental models as the changes in system states are small compared to the system nonlinearity.

Mathematically, an impulse can be treated as a Dirac delta function. Using an impulse as the input, the response of the system is termed the impulse response. As an impulse in the time domain translates to a constant value (unity for all frequencies) in the frequency domain, the impulse response gives the full-frequency response of the system. In the time domain, the impulse response is the convolution of the transfer function and the Dirac delta function, which gives the same result:

$$h(t) = \int h(t-T)\delta(T)dT$$

i.e., the impulse response of the system is the system transfer function in time domain. For a given dynamic system defined as $$\delta \dot{x} = A\delta x + B\delta u$$

$$\delta y = C\delta x$$

where δy is an observation of state δy for the input δu. In the incremental model, $$x(t+\Delta) = x(t) + \delta x(t+\Delta)$$

$$u(t+\Delta) = u(t) + \delta u(t+\Delta)$$

The relationship between the impulse response function (i.e. the transfer function) and the parameters of the system dynamics (A, B, and C) can then be determined.

The time domain transfer function of the system dynamics described by the incremental model can be expressed in the following form:

$$h(t) = Ce^{At}B \tag{1}$$

This can be shown as follows below. For the dynamic system described above without the external control u, the homogeneous equation results as follows:

$$\delta \dot{x} = A\delta x$$

The solution of this homogeneous equation is $$\delta x(t) = e^{At}\delta x(0)$$

Including the external control u provides the following:

$$\delta\dot{x} = A\delta x + B\delta u \quad (2)$$

If an intermediate variable z is defined, such that $$\delta x = e^{At}z \quad (3)$$

the time derivative of Equation (3) is $$\delta\dot{x} = Ae^{At}z + e^{At}\dot{z} \quad (4)$$

Plugging Equation (3) into Equation (2) gives $$\delta\dot{x} = Ae^{At}z + Bu \quad (5)$$

Comparing Equations (4) and (5) yields $$e^{At}\dot{z} = Bu \quad (6)$$

From Equation (6), $$\dot{z} = e^{-At}Bu \quad (7)$$

Integrating Equation (7) provides $$z(t) = z(0) + \int_0^t e^{-A\mathcal{T}}Bu(\mathcal{T})d\mathcal{T} \quad (8)$$

Multiplying both sides of Equation (8) by $e^{-At}$ provides $$e^{At}z(t) = e^{At}z(0) + \int_0^t e^{A(t-\mathcal{T})}Bu(\mathcal{T})d\mathcal{T} \quad (9)$$

Plugging Equation (3) into Equation (9) and knowing that $z(0)=\delta x(0)$ by evaluating Equation (3) at t=0 gives $$\delta x(t) = e^{At}\delta x(0) + \int_0^t e^{A(t-\mathcal{T})}Bu(\mathcal{T})d\mathcal{T} \quad (10)$$

Let the initial incremental state be zero $$\delta x(0) = 0$$

Equation (10) becomes $$\delta x(t) = \int_0^t e^{A(t-\mathcal{T})}Bu(\mathcal{T})d\mathcal{T} \quad (11)$$

As the observable is related to the state by $$\delta y(t) = C\delta x(t)$$

Equation (10) can be written as $$\delta y(t) = \int_0^t \left[Ce^{A(t-T)}B\right]u(T)dT \quad (12)$$

According to the impulse response theory, when the input is a delta function, i.e., $$u(t) = \delta(t)$$

the output, i.e., δy(t), in Equation (12) becomes the time domain transfer function of the system: i.e., $$h(t) = Ce^{At}B$$

Note: A, B, and C are parametric matrices whose initial values can be obtained through Kalman minimum-state realization algorithm. C is the same as the observation matrix H used in Kalman Filter Model (not to be confused with Hamiltonian notation discussed elsewhere herein).

With respect to Kalman minimal-state realization, in the Laplace domain, Equation (1) becomes the following:

$$h(s) = C(sI-A)^{-1}B \quad (13)$$

Suppose the system has n states, m inputs/controls, and k outputs/observables: the dimensions of h, A, B, and C are k×m, n×n, n×m, and k×n, respectively.

In general, the transfer function in time domain is $$h(t) = \begin{bmatrix} h_{11}(t) & \cdots & h_{1m}(t) \\ \vdots & \ddots & \vdots \\ h_{k1}(t) & \cdots & h_{km}(t) \end{bmatrix}_{k \times m}$$

For each $h_{ij}$, where i=1, ..., k and j=1, ..., m, its Laplace transform can be written in the form of $$h_{ij}(s) = \frac{p_{ij}(s)}{q_{ij}(s)}$$

where $p_{ij}$ and $q_{ij}$ are polynomials.

Therefore, the complete system transfer function in Laplace domain is $$h(s) = \begin{bmatrix} \frac{p_{11}(s)}{q_{11}(s)} & \cdots & \frac{p_{1m}(s)}{q_{1m}(s)} \\ \vdots & \ddots & \vdots \\ \frac{p_{k1}(s)}{q_{n1}(s)} & \cdots & \frac{p_{nm}(s)}{q_{km}(s)} \end{bmatrix}_{k \times m}$$

which can be rewritten as $$h(s) = \begin{bmatrix} \frac{\tilde{p}_{11}(s)}{\Delta(s)} & \cdots & \frac{\tilde{p}_{1m}(s)}{\Delta(s)} \\ \vdots & \ddots & \vdots \\ \frac{\tilde{p}_{k1}(s)}{\Delta(s)} & \cdots & \frac{\tilde{p}_{nm}(s)}{\Delta(s)} \end{bmatrix}_{k \times m}$$

where Δ(s) is the minimum common multiple of (∀s, i.e., all of the polynomial denominators. Using Cramer's rule gives $$(sI-A)^{-1} = \frac{cof(sI-A)}{\det(sI-A)} \quad (14)$$

where cof(A) is the cofactor matrix of A, and det(A) is its determinant. It is noteworthy that $$\Delta(s) = \det(sI-A).$$

Providing $$\det(sI-A) = s^n + p_{n-1}s^{n-1} + \ldots + p_1 s + p_0 \quad (15)$$

and $$cof(sI-A) = \beta_{n-1}s^{n-1} + \ldots + \beta_1 s + \beta_0 \quad (16)$$

where $p_i$ (i=0, ..., n−1) is scalar and $\beta_j$ (j=0, ..., n−1) is n-by-n matrix.

From Equation (14), $$\det(sI-A)I = (sI-A)\mathrm{cof}(sI-A) \qquad 5$$

Therefore $$(s^n + p_{n-1}s^{n-1} + \ldots + p_1 s + p_0)I = (sI-A)(\beta_{n-1}s^{n-1} + \ldots + \beta_1 s + \beta_0) \qquad (17)$$

Equating same-order terms on both sides of Equation (17) gives $$s^n:\ I = \beta_{n-1} \Rightarrow \beta_{n-1} = I$$

$$s^{n-1}:\ p_{n-1}I = -A\beta_{n-1} + \beta_{n-2} \Rightarrow \beta_{n-2} = A + p_{n-1}I$$

$$\ldots$$

$$s^{n-k+1}:\ \beta_{n-k} = A^{k-1} + p_{n-1}A^{k-2} + \ldots + p_{n-(k-1)}A + p_{n-k}I$$

$$\ldots$$

$$s^1:\ \beta_0 = A^{n-1} + p_{n-1}A^{n-2} + \ldots + p_1 A + p_0 I \qquad (18)$$

From Equations (13-16), $$h(s) = C(sI-A)^{-1}B = C\frac{\mathrm{cof}(sI-A)}{\det(sI-A)}B = \frac{C(\sum \beta_i s^i)B}{\sum p_j s^j} \qquad (19)$$

Note that if h(t) is linear, h(s) is rational. Using polynomial regression (and specifying an appropriate polynomial order), the experimental data (i.e., the time-domain system impulse response) can be described by $$h(s) = \frac{[\sum h_i s^i]_{k \times m}}{\sum \alpha_j s^j} \qquad (20)$$

For each of the m input/control signals, k output/observation signals are acquired. Therefore, $\Sigma \alpha_j s^j$ is a scalar polynomial and $[\Sigma h_i s^i]_{k\times m}$ is a k-by-m matrix of polynomials. Equating Equations (19) and (20) gives $$\Delta(s) = \Sigma \alpha_j s^j = \Sigma p_j s^j \qquad (21)$$

and $$[\Sigma h_i s^i]_{k \times m} = C(\Sigma \beta_i s^i)B \qquad (22)$$

Therefore, polynomial regression of experimental data gives $h_i$ and $\alpha_j$, the latter of which is equal to $p_j$ according to Equation (21). For the chosen controllability form, $p_i$ uniquely determines the A matrix. Plugging A and $p_j$ into Equation (18), $\beta_i$ can be computed, and matrices C and B can be solved for by plugging $\beta_i$ into Equation (22) and equating same-order terms. Note that the solutions of C and B are not unique, but if B is given/chosen, C becomes unique. Suppose the system has a dimension of n with m inputs and k outputs, A would be an n-by-n matrix, B would be n-by-m, C would be k-by-n, and $h_i$ would be n-by-n. For a canonical controllable system with n states, m inputs/controls, and k outputs/observables, $$A = \begin{bmatrix} 0 & 1 & \cdots & & 0 \\ 0 & 0 & 1 & \cdots & 0 \\ \vdots & & & & \vdots \\ 0 & \cdots & & 0 & 1 \\ -p_0 & -p_1 & -p_2 & \cdots & -p_{n-1} \end{bmatrix}_{n \times n}$$

$$B = \begin{bmatrix} 0 & \cdots & 0 \\ 0 & \cdots & 0 \\ \vdots & \cdots & \vdots \\ b_1 & \cdots & b_m \end{bmatrix}_{n \times m}$$

$$C = \begin{bmatrix} c_{11} & \cdots & c_{1n} \\ \vdots & & \vdots \\ c_{k1} & \cdots & c_{kn} \end{bmatrix}_{k \times n}.$$

To construct A, B, and C, solve n+m+k×m unknowns, the number of which is typically smaller than that of knowns obtained from the measurement.

As one specific example, consider a number of dimension/states of a battery system to be 4, namely: voltage, current, power, and temperature. Using the canonical controllable form gives $$A = \begin{bmatrix} 0 & 1 & 0 & 0 \\ 0 & 0 & 1 & 0 \\ 0 & 0 & 0 & 1 \\ -p_0 & -p_1 & -p_2 & -p_3 \end{bmatrix}$$

If 2 controls are used and 3 observables are made, $$B = \begin{bmatrix} 0 & 0 \\ 0 & 0 \\ 0 & 0 \\ b_1 & b_2 \end{bmatrix},$$

$$C = \begin{bmatrix} c_{11} & c_{12} & c_{13} & c_{14} \\ c_{21} & c_{22} & c_{23} & c_{24} \\ c_{31} & c_{32} & c_{33} & c_{34} \end{bmatrix} \text{ and}$$

$$h = \begin{bmatrix} h_{11} & h_{12} \\ h_{21} & h_{22} \\ h_{31} & h_{32} \end{bmatrix}.$$

The general form of the system impulse response is known in the time domain, Equation (1). An alternative to Kalman minimal-state realization method described above is to generate the system model by data regressions on experimental data h(t) directly. If A, B, and C are scalars, taking natural logarithms of both sides of Equation (1) yields $$\ln(h(t)) = \ln C + At + \ln B = At + (\ln C + \ln B) \qquad (23)$$

where h(t) is the time-domain impulse response (experimental data), and A, B, C define the system dynamics, controls, and observations, respectively. Using Equation (23), the system impulse response function (i.e., the system model) becomes linearized with respect to t. Through linear data regressions, the parameters A, B, and C can be determined. However, as A, B, and C are matrices/vectors in general, taking logarithms becomes problematic algebraically. The following method can be used to achieve the same direct data regression. Consider the power expansion of an exponential function $$e^x = 1 + x + \frac{x^2}{2!} + \frac{x^2}{3!} + \ldots = \sum_{k=0}^{\infty} \frac{x^k}{k!}.$$

In matrix algebra, the same relationship holds $$e^{At} = I + At + \frac{A^2 t^2}{2!} + \frac{A^3 t^3}{3!} + \ldots = \sum_{k=0}^{\infty} \frac{A^k t^k}{k!}.$$

where I is the identity matrix, A is an n-by-n system matrix, and t is scalar time variable. Taking only the first 3 low-order terms, for example, gives $$\tilde{h}(t) = C\left[I + At + \frac{A^2 t^2}{2}\right]B.$$

Subsequently, the data regression problem becomes the following nonlinear quadratic minimization problem $$\min([h(t)-\tilde{h}(t)]^T Q[h(t)-\tilde{h}(t)])$$

where Q is the weight matrix for optimization algorithm. Note that, although C and B are mathematically inseparable in general, C can be uniquely determined by specifying/choosing a specific form of B (e.g., canonical controllable form). If desirable, higher-order terms may be included, e.g., $$\tilde{h}(t) = C\left[I + At + \frac{A^2 t^2}{2} + \frac{A^3 t^3}{6}\right]B.$$

As the exact response of a battery is dependent on the charge level, the impulse response of the battery may be measured at different charge levels (e.g., 10%, 25%, 50%, 75%, and 90%). In computational models, the charge level is given by the time integral of current and the initial conditions (i.e., the known charge levels at time-zero).

Additional details regarding an example algorithm for generating the battery model are included in some embodiments in U.S. Patent Application No. 62/796,521, filed Jan. 24, 2019 and entitled "Model Realization Algorithm," which is incorporated herein by reference in its entirety, and other example details are included elsewhere herein, including with respect to the examples of FIGS. 2A-2H. For example, in some embodiments, the following applies.

Impulse response: $h(t)=Ce^{At}B$ (if continuous time) or
$h(N)=CA^{N-1}B$ (if discrete time)

↓

Markov parameter blocks $m \times k$ matrix $[G_0, G_1, G_2, \ldots G_N]$ with $m$ controls and $k$ sensors

↓

Hankel matrix $H = \begin{bmatrix} G_1 & G_2 & \ldots & G_{r2} \\ G_2 & G_3 & & \\ \vdots & & \ddots & \\ G_{r1} & & & G_{r1+r2-1} \end{bmatrix}_{r1 \times r2}$ shifted Hankel matrix $\overline{H} = \begin{bmatrix} G_2 & G_3 & \ldots & G_{r2+1} \\ G_3 & G_4 & & \\ \vdots & & \ddots & \\ G_{r1+1} & & & G_{r1+r2} \end{bmatrix}_{r1 \times r2}$ Find decomposition P and Q, such that $$PHQ = \overline{\begin{bmatrix} I_p & 0 \\ 0 & 0 \end{bmatrix}}$$

where $P$ = rank of $H$.

$A = E_{p,rk}\overline{P}HQE_{p,rm}^T = [\overline{P}HQ]_{p,p}$—(take the first $p \times p$ rows $\times$ columns)

where $E_{p,q} = [I_p, O_{p,q-p}]$ $B = E_{p,rk}PHE_{m,rm}^T = [PH]_{p,m}$ $C = E_{k,rk}HQE_{p,rm}^T = [HQ]_{k,p}$ $D = G_0$ (1) Decomposition:

$SVD \Rightarrow U\Sigma V = H \Rightarrow (U\Sigma^{1/2})(\Sigma^{1/2}V) = H$ $\Rightarrow P \triangleq (U\Sigma^{1/2})^{-1}, Q \triangleq (\Sigma^{1/2}V)^{-1}$, s.t. $PHQ = I$ Decomposition can be implemented in various manners, without restrictions.
=>infinite number of decompositions=>infinite redirections (A,B,C).

(2) Discrete-time and continuous-time system parameters are related by $A_d = e^{A_c \Delta}$ $B_d = e^{A_c \Delta} B_c$ $C_d = C_c$ where d is discrete, c is continuous, and Δ is the sampling interval $\dot{x}(t) = Ax(t) + Bu(t)$ $x(t+\Delta) = e^{A\Delta}x(t) + \int_t^{t+\Delta} e^{A(t+\Delta-T)} B\, u(T-t)\delta T$ $u(T-t) = u_k \delta(T-t)$ $\because \int \delta(t-a)f(t)\delta t = f(a)$ $\therefore x(t+\Delta) = e^{A\Delta}x(t) + e^{A\Delta}Bu_k$ $\because x(N+1) \triangleq \tilde{A}x(N) + \tilde{B}u(N)$ $\therefore \tilde{A} = e^{A\Delta}$ $\tilde{B} = e^{A\Delta}B$ State-Space of Discrete-Time Linear Systems:
Digital $$\begin{array}{|l|} \hline y[n] = \tilde{C}x[n] + \tilde{D}u[n] \\ x[n+1] = \tilde{A}x[n] + \tilde{B}u[n] \\ \hline \end{array}$$

Markov parameter sequence (matrix impulse response)

$h[0] = \tilde{C}x[0] + \tilde{D}\delta[0] = \tilde{D}(x[0]=0, \delta[0]=1)$ $x[1] = \tilde{A}x[0] + \tilde{B}\delta[0] = \tilde{B}$ $h[1] = \tilde{C}x[1] + \tilde{D}\delta[1] = \tilde{C}\tilde{B}(x[1]=\tilde{B}, \delta[1]=1)$ $x[2] = \tilde{A}x[1] + \tilde{B}\delta[1] = \tilde{A}\tilde{B}$ $h[2] = \tilde{C}x[2] + \tilde{D}\delta[2] = \tilde{C}\tilde{A}\tilde{B}(x[2] = \tilde{A}\tilde{B}, \delta[2] = 1)$ $x[3] = \tilde{A}x[2] + \tilde{B}\delta[2] = \tilde{A}^2\tilde{B}$

. . .

$h[n] = \tilde{C}\tilde{A}^{n-1}\tilde{B}, n > 0$ Impulse response

Continuous-Time Systems:
  Analog $$y(t) = Cx(t) + Du(t)$$
$$\dot{x}(t) = Ax(t) + Bu(t)$$

$h(t) = Ce^{At}B \overset{\Delta}{=} Ce^{A(n)\Delta}B$, where $\Delta = t/n$, and where $\Delta$ is the sampling interval $= C(e^{A\Delta})^n B = C(e^{A\Delta})^{n-1}(e^{A\Delta}B)$ $=> \tilde{A} = e^{A\Delta}, \tilde{B} = e^{A\Delta}B, \tilde{C} = C$ Example system $\ddot{x} + w^2 x = u$     (1)

Figure 2D:
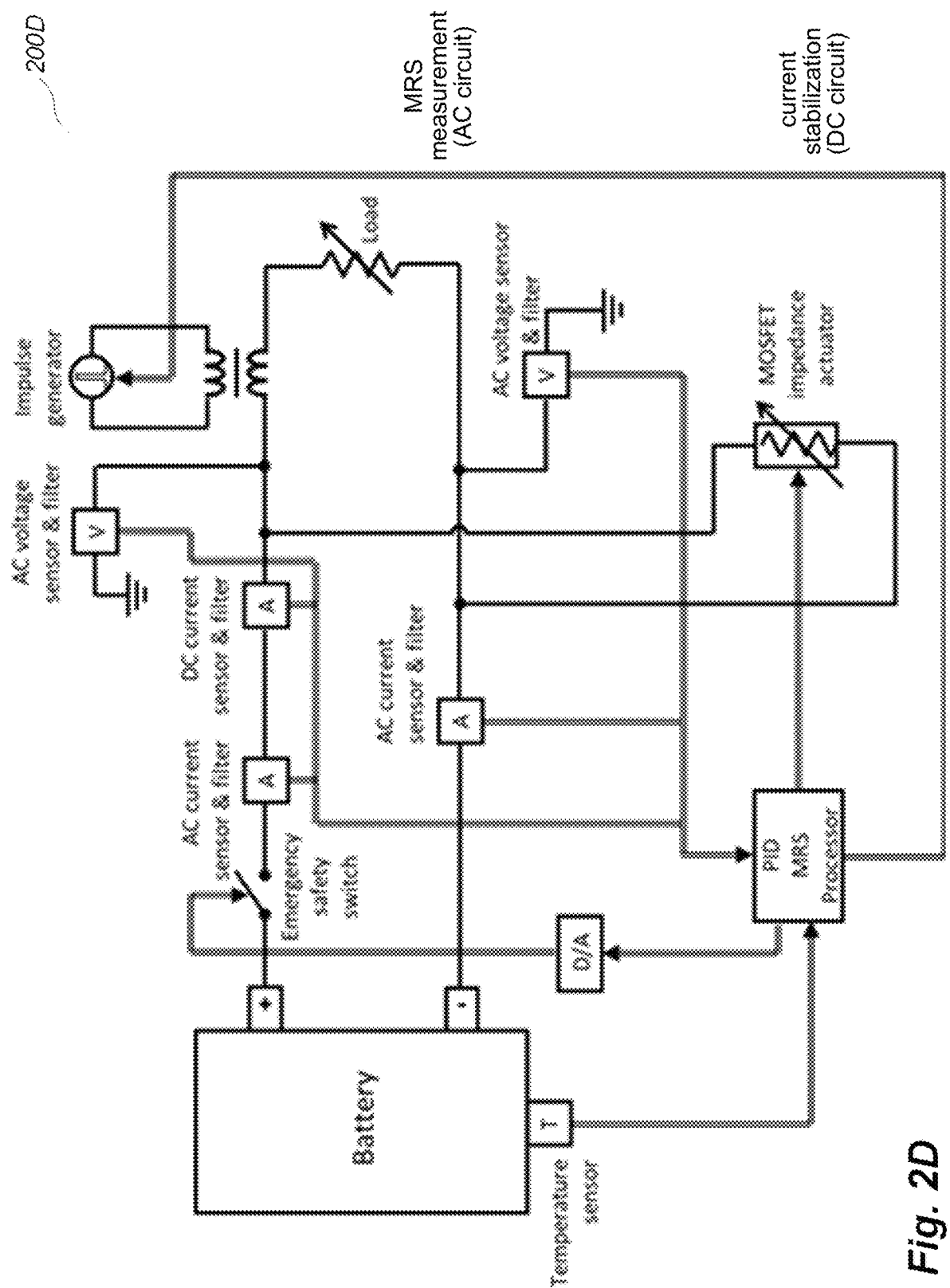
Figure 2E:
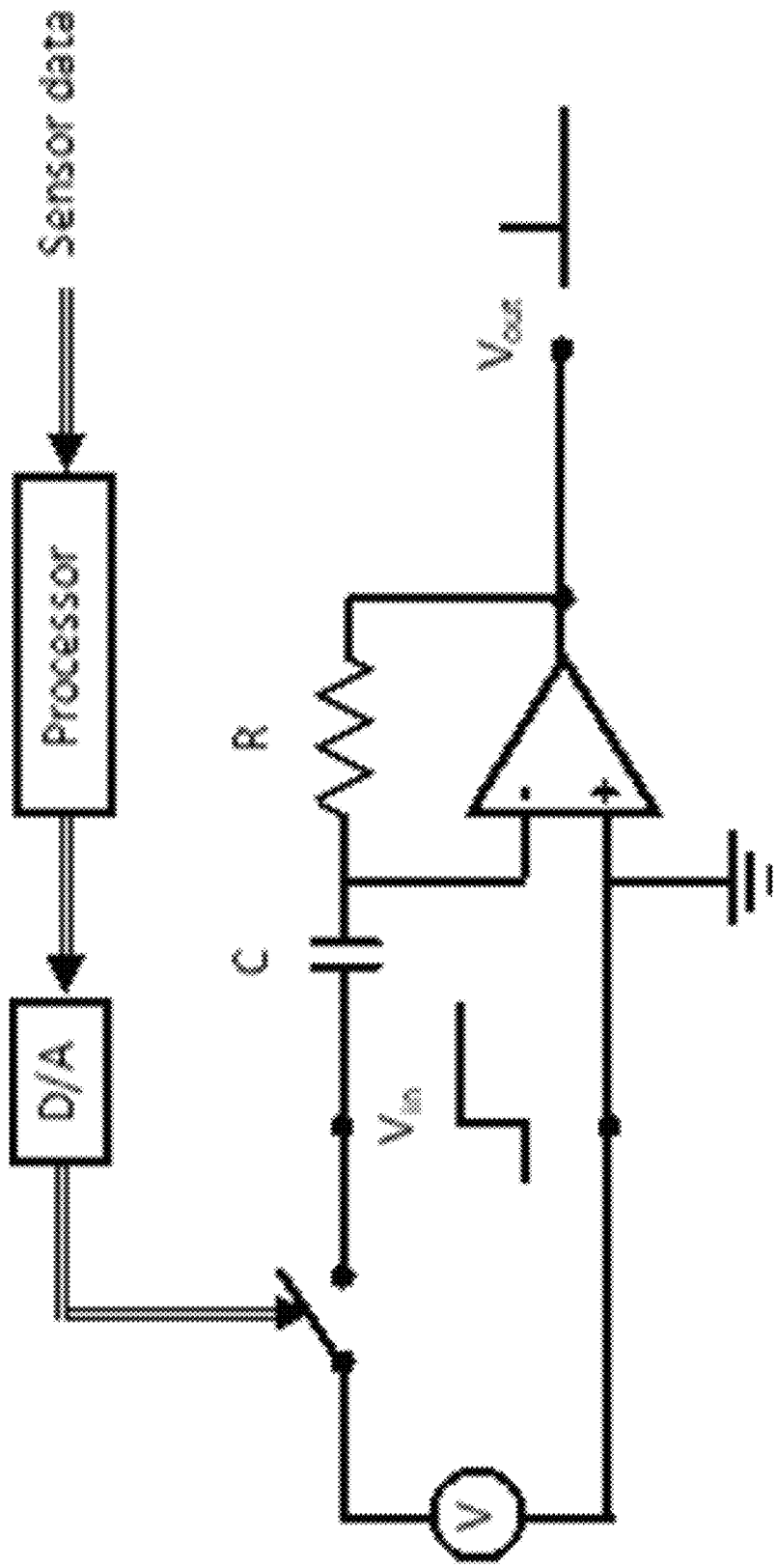
Figure 2F:
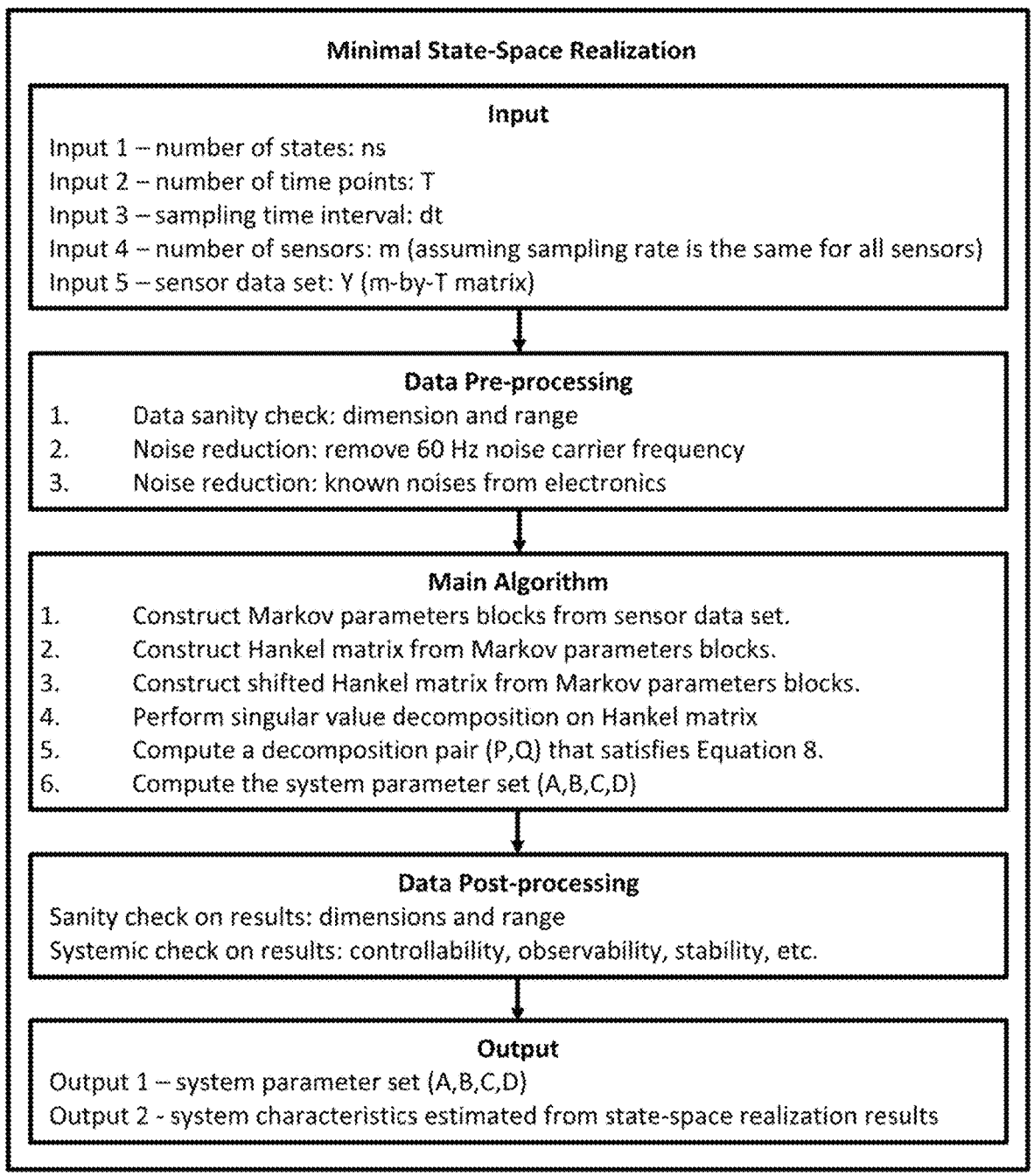
Figure 2G:
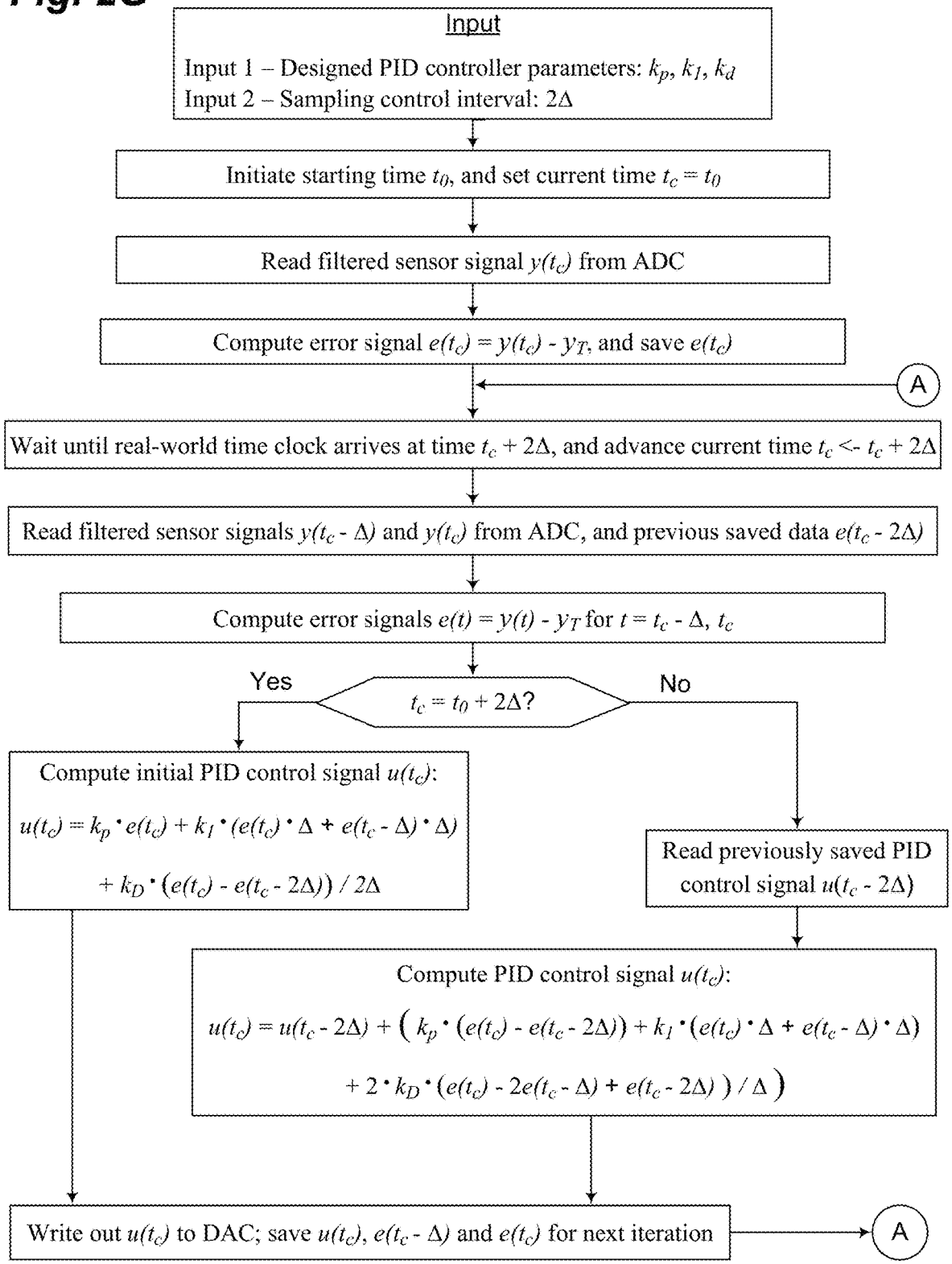
Figure 2H:
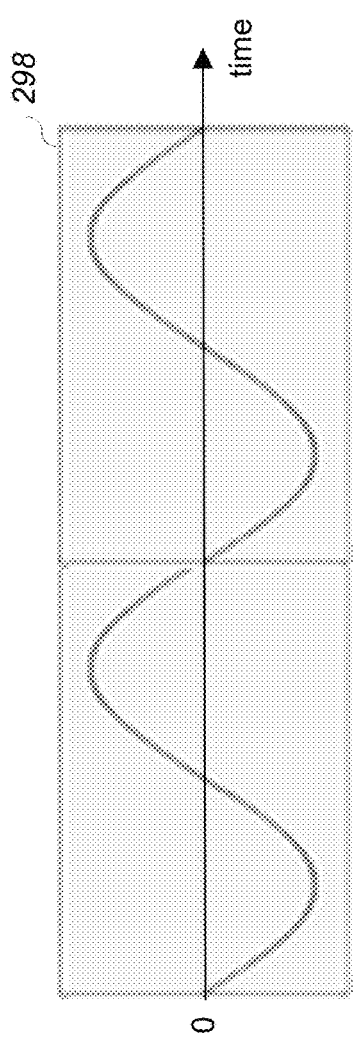
Figure 2H:
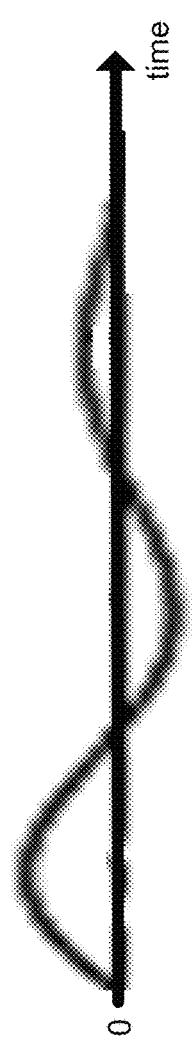

$=> [\dot{x}_1 = x_2$ $[\dot{x}_2 = -w^2 x_1 + u$ i.e. $\dot{x}_1 = 0 + x_2 + 0$     $A = \begin{bmatrix} 0 & 1 \\ -w^2 & 0 \end{bmatrix}$ $\dot{x}_2 = -w^2 x_1 + 0 + u$     $B = \begin{bmatrix} 0 \\ 1 \end{bmatrix}$ $y = x_1$     $=> C = [1 \; 0]$ Impulse response $h(t) = Ce^{At}B$ See example chart 298 of FIG. 2H.

(2) system $\ddot{x} + 2\zeta w \dot{x} + w^2 x = u$ ($2^{nd}$-order filter) $\zeta = 0.707$ $x_1 = x$ $\dot{x}_1 = x_2 = \dot{x}$ $\dot{x}_2 = \ddot{x}_1 = -2\zeta w x_2 - w^2 x_1 + u$ $A = \begin{bmatrix} 0 & -w^2 \end{bmatrix} B = \begin{bmatrix} 0 \end{bmatrix} C = [10] => \lfloor 1 - 2\zeta w \rfloor \lfloor 1 \rfloor$, See example chart 299 of FIG. 2H.

Additional non-exclusive examples of techniques for generating a battery model and implementing a model realization system in at least some embodiments include the following.

In at least some embodiments, a learning approach is used to develop parametric linear models of dynamical systems, such as for systems that each includes one or more batteries and/or for other types of physical systems. The approach selects one or more appropriate states or factors for use as parameters to characterize the model. For example, in a battery system, the one or more selected states/factors may include battery charge (e.g., with the battery charge being discretized into a finite number of levels, such as with the number of levels selected so that the linear approximation between levels is valid) and/or load or other electrical demand (e.g., with the electrical demand being discretized into a finite number of levels, such as with the number of levels selected so that the linear approximation between levels is valid), and a linear model is learned for each level interval of the one or more states/factors. As another example, in a physical system that includes a fuel cell, the one or more selected states/factors may include charge of the fuel cell (e.g., with the fuel cell charge being discretized into a finite number of levels, such as with the number of levels selected so that the linear approximation between levels is valid) and/or load or other electrical demand (e.g., with the electrical demand being discretized into a finite number of levels, such as with the number of levels selected so that the linear approximation between levels is valid), and a linear model is learned for each level interval of the one or more states/factors. As another example, in a physical system that includes an HVAC system, the one or more selected states/factors may include external temperature for air being input into the HVAC system (e.g., with the external temperature being discretized into a finite number of levels, such as with the number of levels selected so that the linear approximation between levels is valid) and/or humidity flow provided by the HVAC system (e.g., with the humidity flow being discretized into a finite number of levels, such as with the number of levels selected so that the linear approximation between levels is valid) and/or heat flow provided by the HVAC system (e.g., with the heat flow being discretized into a finite number of levels, such as with the number of levels selected so that the linear approximation between levels is valid), and a linear model is learned for each level interval of the one or more states/factors. As another example, in a physical system that includes a wind turbine, the one or more selected states/factors may include demand for power, such as with the power demand being discretized into a finite number of levels (e.g., with the number of levels selected so that the linear approximation between levels is valid), and a linear model is learned for each level interval of the one or more states/factors. The linear model between levels is generated by exciting the device with an impulse and reading out the response of the system via sensors, with the response called an impulse response signal. This signal, which is usually a vector signal, is used to algorithmically generate a linear state representation of the input/output dynamics of the system under study. The minimum state realization for each level of the characteristic state of the model (for a battery it is the charge) is a linear dynamic model with constant coefficients.

With respect to this approach in the current example, which may be implemented by an embodiment of a model realization system, a first step is to select the characteristic state to use, such as charge for a battery system. In this approach, the characteristic state is not determined by direct measurements—instead, for a battery, the charge is computed from measurements of current i(t) using the following equation (Ia):

$$q(t + \Delta) = q(t) + \int_{t}^{t+\Delta} i(\tau) d\tau \qquad \text{(Ia)}$$

where $\Delta$ is a small positive quantity, and q(t) is the computed charge at time t. If $q(t+\Delta) \geq q_l$, where $q_l$ is a level of the characteristic state, then an impulse electrical charge signal is injected (generated and fed) to the battery. The corresponding signals of the outputs are measured and recorded over a period of time T, where T is called the relaxation time. This process is repeated a few times to obtain an average response for the level $q_l$. The impulse signals are wide-sense frequency response, but the system is usually a low-pass frequency system. Therefore, the outputs at normal operation are not significantly changed by the impulses.

In a similar manner, for a physical system that includes a fuel cell and with a selected characteristic state that is a charge of the fuel cell, the charge may be computed from measurements of load current l(t) using the following equation (Ib):

$$q(t+\Delta) = q(t) + \int_t^{t+\Delta} l(\tau)d\tau \quad \text{(Ib)}$$

where $\Delta$ is a small positive quantity, and q(t) is the computed charge at time t. If $q(t+\Delta) \geq q_l$, where $q_l$ is a level of the characteristic state, then an impulse electrical charge signal is injected (generated and fed) to the fuel cell. In a manner similar to that described above with respect to modeling a battery, the corresponding signals of the outputs from the fuel cell are measured and recorded over a relaxation period of time T, with the process repeated a few times to obtain an average response for the level $q_l$, and with the injected electrical charge signals being selected at levels to not significantly change the outputs of the fuel cell at normal operation.

In a similar manner, for a physical system that includes an HVAC system and with a selected characteristic state that is an external temperature of air that is input to the HVAC system, the external temperature may be directly measured, and if $q(t+\Delta) \geq q_l$ according to the equation (Ic) below, where $q_l$ is a level of the characteristic state and $\Delta$ is a small positive quantity and j(t) is a vector of heat flow values (e.g., measured in joules per second) and humidity flow values (e.g., measured in gallons per second for a percentage of a saturation level of a building), then an external air temperature change at a specified level is injected (generated and fed) to the intake of the HVAC system, with $q(t+\Delta)$ computed using the following:

$$q(t+\Delta) = q(t) + \int_t^{t+\Delta} j(\tau)d\tau \quad \text{(Ic)}$$

In a manner similar to that described above with respect to modeling a battery, the corresponding outputs from the HVAC system (e.g., air temperatures of the HVAC system outputs) are measured and recorded over a relaxation period of time T, with the process repeated a few times to obtain an average response for the level $q_l$, and with the injected external air temperature changes being selected at levels to not significantly change the outputs of the HVAC system at normal operation.

In a similar manner, for a physical system that includes a wind turbine and with a selected characteristic state that is a demand for power from the wind turbine, the power demand may be directly measured, and if $q(t+\Delta) \geq q_l$ according to the equation (Id) below, where $q_l$ is a level of the characteristic state and $\Delta$ is a small positive quantity and k(t) is the wind field for the wind turbine (e.g., the three-dimensional air velocity field, such as represented with a 3-dimensional vector in meters per second at standard altitude), then an electro-mechanical field change signal is injected (generated and fed) to a generator of the wind turbine, with $q(t+\Delta)$ computed using the following:

$$q(t+\Delta) = q(t) + \int_t^{t+\Delta} k(\tau)d\tau \quad \text{(Id)}$$

In a manner similar to that described above with respect to modeling a battery, the corresponding outputs from the wind turbine (e.g., power generated by the wind turbine) are measured and recorded over a relaxation period of time T, with the process repeated a few times to obtain an average response for the level $q_l$, and with the injected electromechanical field change signals being selected at levels to not significantly change the outputs of the wind turbine at normal operation.

In this example, the model realization system embodiment uses a state-space realization approach to generate the parametric linear dynamics of the system of minimum state dimension, as follows:

$$\dot{x} = A_{q_l}x + B_{q_l}u$$

$$y = C_{q_l}x \quad \text{(II)}$$

where x(t) is the state of the model of the current characteristics interval with initial value of the level $q_l$. In general, $x(t) \in R^n$, where n is finite, and $u(t) \in R^k$ is the signal vector corresponding to the inputs to the parametric mode; $y(t) \in R^m$ is the vector signal of outputs. The n×n matrix $A_{q_l}$ is the infinitesimal transition of the state; $B_{q_l}$ is the gain matrix for the control; $C_{q_l}$ is the transformation matrix from state to observation.

For each characteristic interval, this embodiment of the model realization system uses the impulse response data to construct the matrix parameters of a minimal state-space realization, with the impulse response of the system given in Equation (II) is:

$$h(t) = Ce^{At}B \quad \text{(III)}$$

For simplicity, $q_l$ is suppressed in (III) and following formulas, and h(t) is a vector signal of dimension m that represents the response of the system to an impulse as the input. The algorithm solves equation (III) for the system parameters C, A and B, based on the determination of a series of matrices for the right-hand-side of (III) that are referred to as Markov parameters.

The minimal state-space realization approach discussed above may be implemented using, for example, Kalman's algorithm. If so, and given the Markov parameters block series $[M_0, M_1, M_2, \ldots, M_N]$ (e.g., computed by the Cayley Hamilton theorem), where the number of time points N is greater than or equal to the number of matrices' entries in the minimum realization, the approach first constructs a Hankel matrix as follows:

$$H = \begin{bmatrix} M_1 & \cdots & M_r \\ \vdots & \ddots & \vdots \\ M_r & \cdots & M_{2r-1} \end{bmatrix}_{r \times r} \quad \text{(IV)}$$

and the shifted Hankel matrix $$\overline{H} = \begin{bmatrix} M_2 & \cdots & M_{r+1} \\ \vdots & \ddots & \vdots \\ M_{r+1} & \cdots & M_{2r} \end{bmatrix}_{r \times r} \quad \text{(V)}$$

where r is the rank of the Hankel matrix. When r is sufficiently large, it is the minimum dimension of the state of the system. Once the minimum Hankel matrix is constructed, the next step is to find a (P, Q) decomposition of the Hankel matrix H such that $$PHQ = \begin{bmatrix} I_\rho & 0 \\ 0 & 0 \end{bmatrix} \quad (VI)$$

where $I_\rho$ is an identify matrix of rank $\rho$.

To obtain (P, Q), Singular Value Decomposition (SVD) may, for example, be used to find another Hankel matrix S as well as matrices U and V that satisfy the following:

$$USV = H \quad (VII)$$

It follows that $$P = (US^{1/2})^{-1} \quad (VIII)$$

$$Q = (S^{1/2}V)^{-1} \quad (IX)$$

provide a decomposition (matrices P and Q) that satisfies Equation (VI). This iteration also guarantees to terminate in finite time provided that A, B and C do exist. The system matrices are then given by the following:

$$A = [P\overline{H}Q]_{n \times n} \quad (X)$$

$$B = [PH]_{n \times m} \quad (XI)$$

$$C = [HQ]_{k \times n} \quad (XII)$$

Continuing with the approach for this example embodiment of a model realization system involving a target system that includes a battery, FIG. 2D provides a schematic diagram 200D for use in the determination of a parametric linear model for the dynamics of an example illustrated battery cell (e.g., a lithium-ion battery). In this example, the battery is loaded with a variable resistor, and for each level interval, a fixed value of the load is selected and kept constant during the level interval. The measurement system is composed of two loops in this example, with a DC loop that includes the load, and an AC loop that includes high response voltage and current sensors and implements the impulse response functionality of the model realization system—in this example, each of the current and voltage sensors is equipped with a $4^{th}$-order elliptic filter, which is designed to achieve SNR≥120 dB/decade around the 60 Hz frequency. Those components in this example include two high-speed ammeters, two high-speed voltmeters, an impulse current generator and a processor to capture the impulse response, to compute the current charge of the battery, and to generate the resulting realization model based on an expectation that by feeding an impulse to the battery, the natural frequencies of the free ions are expected to be resonated. The DC circuit controls the operations of the battery at low frequencies to maintain close response to a DC current tracking signal generated by the processor. This tracking signal is specified so that the battery maintains a more or less constant DC current for each tested load. The DC circuit behavior is measured by the DC current meter. The controller of the battery is mediated by a FET-based (Field Effect Transistor) impedance actuator that is controlled by the control signal generated in the processor. The DC controller is described further below.

Measurements for the model realization system embodiment are performed with the AC circuit shown in FIG. 2D, which includes an impulse generator (shown further in information 200E of FIG. 2E) and time-resolved data acquisition via AC sensors. The small current impulses are injected into the battery system via a signal-coupling transformer as shown in FIG. 2D. FIG. 2F further illustrates an example routine 200F that may, in at least some embodiments, be implemented for each charge interval to implement the approach described above, as part of an offline learning algorithm.

While conducting the measurements discussed above, free electrons may be injected into and pulled out of the cathode and anode, respectively, at high intensity within very short periods of time. As a result, oscillatory interactions may occur between the free electrons and the ions inside the Li-ion battery, which may lead to oscillatory current output at frequencies characteristic to the battery. If uncontrolled, the battery may be irreversibly damaged. To control the oscillatory current output (typically 1-5 Hz), an impedance actuator in parallel to the load may be used, such as for an impedance actuator constructed from a high-current rating MOSFET (metal-oxide-semiconductor field-effect transistor) controlled by a real-time PID controller.

With respect to such a PID controller, it may take into account the proportion (P), integral (I), and differential (D) of the error between the output and target signals, in order to achieve the control objectives of a feedback loop. Coefficients $k_P$, $k_I$, and $k_D$ represent such proportional, integral, and differential parameters of the PID controller, respectively, and the relationship between the control u(t) and the error e(t) at time t is given by $$u(t) = k_P e(t) + k_I \int_0^t e(\tau)d\tau + k_D \frac{de(\tau)}{d\tau}\bigg|_{\tau=t} \quad (XXI)$$

where e(t) is the error measurement that satisfies:

$$e(t) = x(t) - y(t)$$

where x(t) is the measured DC current of the battery, and y(t)) is the desired current generated by the processor. At time t+Δ, the control is given by $$u(t+\Delta) = k_P e(t+\Delta) + k_I \int_0^{t+\Delta} e(\tau)d\tau + k_D \frac{de(\tau)}{d\tau}\bigg|_{\tau=t+\Delta} \quad (XXII)$$

Subtracting Equation XXI from Equation XXII gives:

$$u(t+\Delta) = u(t) + k_P[e(t+\Delta) - e(t)] + \\ k_I \int_0^{t+\Delta} e(\tau)d\tau + k_D \left[\frac{de(\tau)}{d\tau}\bigg|_{\tau=t+\Delta} - \frac{de(\tau)}{d\tau}\bigg|_{\tau=t}\right] \quad (XXIII)$$

In Equation XXIII, the integral term and differential term may be estimated by numerical algorithms such as, for example, Adams-Bashforth for the integration, and modified trapezoidal for the derivative, with the numerical algorithms chosen in this example so that the order of the error is $O(\Delta^3)$. For numerical purposes, equation (XXIII) may be implemented with two time scales as follows: 2Δ for control implementation, and Δ for data collection. The parameters of the controller may be computed using, for example, a modified Routh-Hurwicz algorithm in a pole allocation schema. An example embodiment of a routine 200G for implementing operations of a real-time modified PID controller is shown in FIG. 2G.

The example approach described above with respect to FIGS. 2A-2H provides quality control determination of battery cells or other components of distributed energy resource (DER) systems. In addition, a behavioral model for a reference battery (e.g., a battery cell of high quality) may be generated using a sequence of parametric models for a set of charge levels and a set of loads, with such a battery referred to at times as a 'reference standard' battery and/or 'standard cell' (e.g., for a type of battery, such as lithium-ion, nickel-cadmium, nickel-metal-hydride, small sealed lead acid batteries, etc.; for an associated group of batteries, such as to be used together in a common target system and/or for a common purpose; etc.), and with the generated behavioral model for the battery referred to at times as a 'reference standard behavioral model' and stored for use in comparison to other behavioral models of other batteries of that type or for potential inclusion in the associated group. Each battery that is a candidate for an implementation may be evaluated using this approach, and the resulting generated models may be compared against the model for the 'reference standard' (e.g., to provide a standardized or normed comparison against a fixed standard) and/or against each other (e.g., to provide a relative comparison). If the differences between a candidate battery and the standard battery are calculated and are sufficiently low (e.g., below a defined threshold), the candidate battery may be treated as acceptable or good, such as to be used in a particular battery system. If the differences between two or more candidate batteries are calculated, some quantity or group of the candidate batteries (e.g., the top 1, the top X, the top X %, etc., with respect to one or more measures of the generated parametric models) may similarly be treated as acceptable or good, or more generally zero or more of the group of candidate batteries may be treated as acceptable or good if they satisfy one or more satisfied criteria (e.g., with respect to one or more performance criteria, such as with respect to current and/or voltage produced at one or more charge levels and/or resistive loads), such as to be used in one or more particular battery systems. Such a proposed test of a candidate battery may, for example, take only a couple of seconds.

In addition, the generation of the parametric model for the standard battery cell may be repeated for many charge/discharge cycles in at least some embodiments to determine, for the particular standard battery cell and/or the type of battery of the standard battery cell, the marginal degradation of the battery performance. The measured degradation may further be extrapolated to determine an estimated longevity of this particular battery cell and/or type of battery cell, such as for use in establishing rules for future operation of the battery that maximize one or more goals (e.g., battery life, economic value, etc.).

Another possible application of the approach described above in some embodiments is for selecting battery groups whose batteries exhibit nearly uniform behavior, such as for implementing quality operation on industrial batteries.

Another possible application of the approach described above in some embodiments is to generate initial models for a particular battery and/or a particular type of battery that are used in subsequent implementation of battery control (e.g., real-time or near-real-time control), optionally with the initial model(s) updated during ongoing operation of a particular battery to reflect that ongoing operation.

Figure 2I:
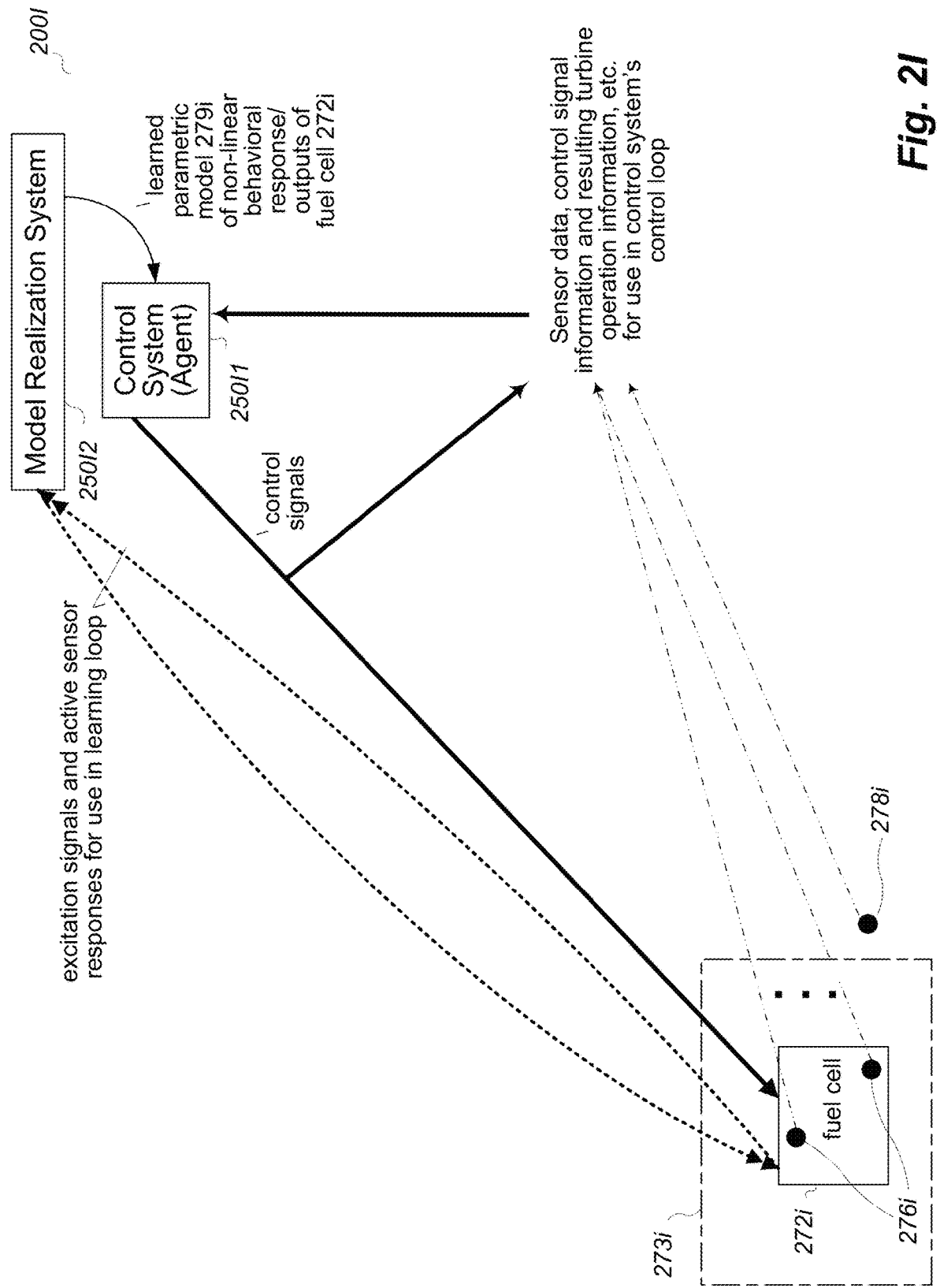
Figure 2J:
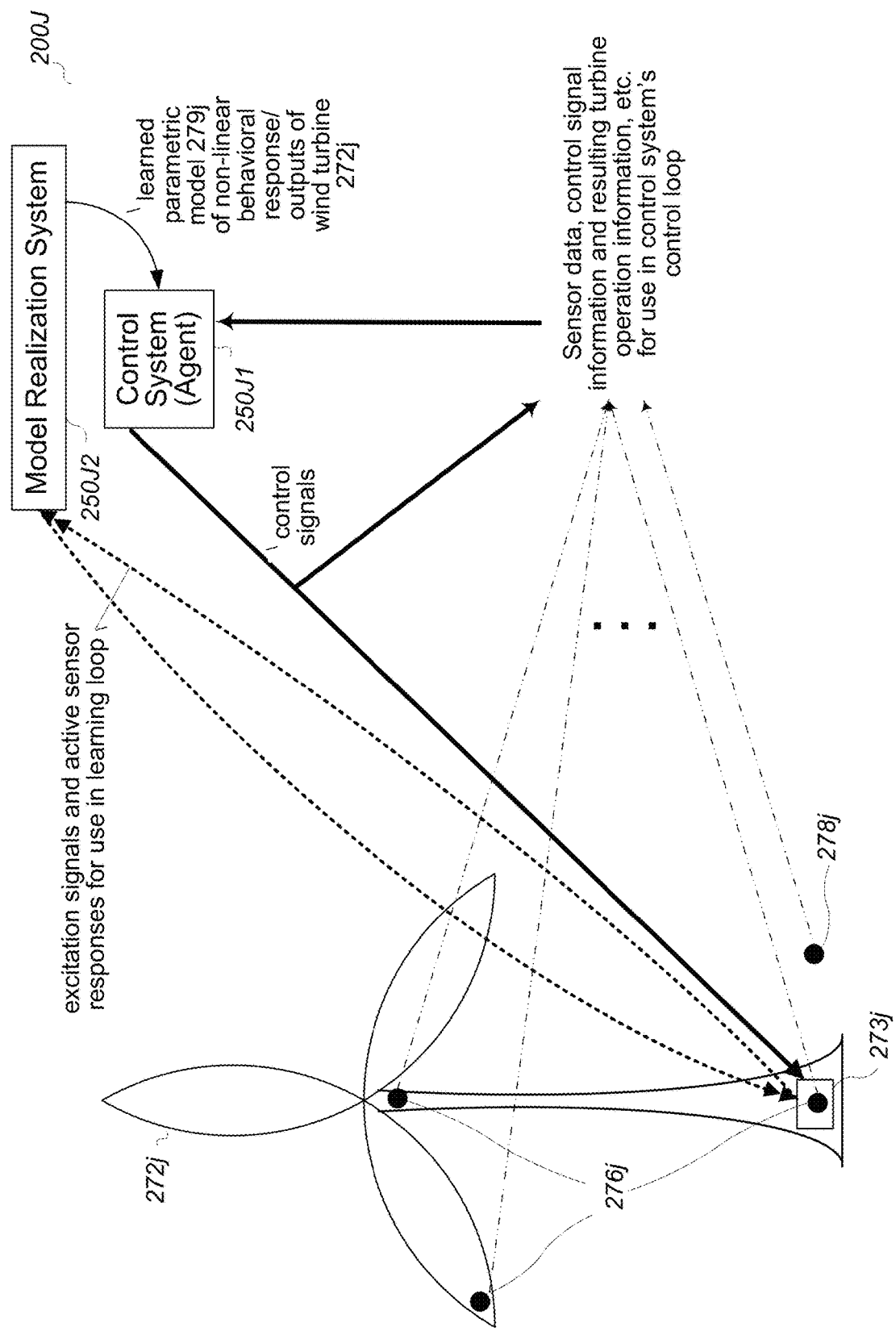
Figure 2K:
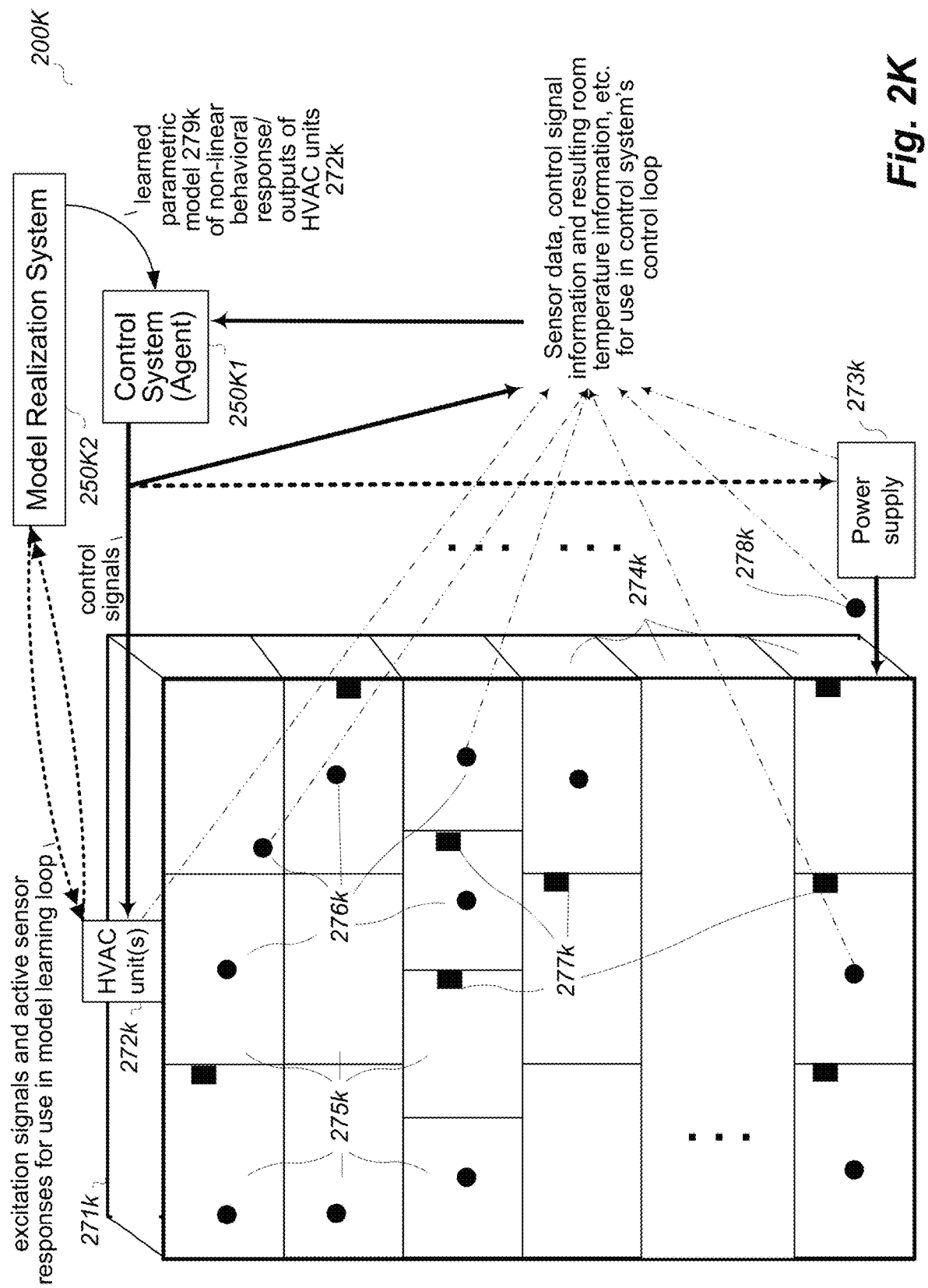

It will be appreciated that the approach described above may be used in other manners in other embodiments, some of which are further described herein, including with respect to FIGS. 2I-2K.

Some further aspects of performing automated operations to control such a target system with one or more batteries and/or other types are target systems are included in U.S. patent application Ser. No. 16/103,788, filed Aug. 14, 2018 and entitled "Using Battery State Excitation To Control Battery Operations;" in U.S. patent application Ser. No. 15/096,091, filed Apr. 11, 2016 and entitled "Using Battery DC Characteristics To Control Power Output;" and in U.S. patent application Ser. No. 15/410,647, filed Jan. 19, 2017 and entitled "Using Sensor Data To Assist In Controlling A Target System By Modeling The Functionality Of The Target System," which claims the priority benefit of U.S. Provisional Patent Application No. 62/336,418, filed May 13, 2016 and entitled "Using Sensor Data To Assist In Controlling A Target System By Modeling The Functionality Of The Target System;" each of which is hereby incorporated by reference in its entirety.

In at least some embodiments, initial modeling of a state of a target system is performed using one or more data Hamiltonian functions, and the described techniques include generate, update and/or improve such data Hamiltonian function(s) (e.g., in order to complete an underlying Hamiltonian-based model) based on analysis of one or more types of sensor data. A CDD system controlling such a target system may, in at least some embodiments and situations, implement multiple CDD decision modules or sub-systems (also referred to at times herein as CDI, or Collaborative Distributed Inferencing, control agents, such that a particular embodiment of the CDD system with one or more such CDI control agents may be referred to as a CDI system) to distribute the control and management through an agent-based network with synchronization via a mean field Hamiltonian approach, such as with each agent characterized by a data Hamiltonian that defines the dynamics and interaction of one or more corresponding components in the target system, and with each such data Hamiltonian of an agent being dynamically computed from sensory data and actions. Such a data Hamiltonian (for a single target system component) and/or mean field Hamiltonian (for multiple coordinated target system components) can be thought of as a mathematical function that helps navigate a query through huge bodies of information by defining a spectrum of possible outcomes, including to model history, current situation and possible options. Non-exclusive example embodiments using such techniques are further described herein, but it will be appreciated that other embodiments may differ in one or more manners from these example embodiments.

As noted above, a data Hamiltonian may be implemented as a function that captures the flow and interdependence of a data domain, and may have three types of variables (e.g., state variables, flow variables, and decision or control variables). A CDI control agent may be implemented as an optimization-based engine operating in a data domain that belongs to a multi-data domain, with agent optimization functionality encoded in the agent's Hamiltonian. The CDD system may be implemented as a formal, distributed rule-based optimization process for resolving time-based queries from a distributed agent-based domain in real-time. A CDI control agent of the CDD system may be implemented using Horn clause rules of three types, as follows: absolute rules that characterize the physics of a physical target system being controlled (or otherwise describe unchangeable rules in other types of target systems), and have truth value equal to true in any Hamiltonian realization (e.g., a value of 0 for false or 1 for true); hard rules that characterize the desired behavior and goals, and have truth value equal to true in any Hamiltonian realization (e.g., a value of 0 for false or 1 for true); and soft rules that characterize the empirical knowledge of the operation, heuristic strategies, economic dispatch, and response to anomalies and learning strategies, and have a variable, probabilistic truth value in [0,1], as well as an associated confidence value for that variable, probabilistic truth value in some embodiments. Meta-rules are special kinds of soft rules used to transform sensory data and desired behavior into constraint data Hamiltonians. Soft rules can be thought of as being used to navigate queries through "gradients" (information that is neither true nor false), as a means of identifying what areas of data are pertinent to any given query. Thus, such rules for a CDI control agent define the constraints for a data Hamiltonian for the agent, and may be converted to a constraint optimization problem that a corresponding CDD system solves. For example, such conversion may include the following: transform truth values {0,1} to a [0,1] interval; transform variables and parameters to continuous variables and parameters; transform absolute rules to equality constraints; transform hard rules to equality constraints; transform soft rules to inequality constraints; transform inclusion sets to functional forms; transform algorithms to differential equations; etc.

Some further aspects of implementing such techniques for modeling target systems and performing automated operations to control such target systems, including in a distributed manner using multiple agents, are included in U.S. patent application Ser. No. 14/746,738, filed Jun. 22, 2015 and entitled "Cooperative Distributed Control Of Target Systems;" in U.S. Patent Application No. 62/182,968, filed Jun. 22, 2015 and entitled "Applications Of Cooperative Distributed Control Of Target Systems;" in U.S. Patent Application No. 62/182,796, filed Jun. 22, 2015 and entitled "Gauge Systems;" and in international PCT Patent Application No. PCT/US2015/037022, filed Jun. 22, 2015 and entitled "Cooperative Distributed Control Of Target Systems," each of which is hereby incorporated by reference in its entirety.

In addition, while the operation of the model realization system may be performed only once in some embodiments and situations, such as to learn a behavior model (e.g., a battery behavioral model) that is subsequently used, in other embodiments the model realization system may be used in a similar manner multiple times (e.g., periodically, continuously or substantially continuously, etc.), such as to continue to improve the control agent over time (e.g., to structurally adapt the control agent to changes that occur to the system over time, such as the addition and/or removal and/or modification of one or more loads, the addition and/or removal and/or modification of one or more sources, changes to the internal state and operational characteristics of the battery, changes to one or more other elements, etc.). Furthermore, while not illustrated in the examples of FIGS. 2A-2H, in some embodiments multiple batteries (e.g., tens, hundreds, thousands, millions, etc.) may each have an associated control agent that controls actions of that battery in a similar manner, and with the various batteries acting together in a coordinated manner to supply aggregate power to the utility or to other entities. In such embodiments, the utility or other external entity may send synchronization and monitoring signals for use by the various systems including the batteries, and the multiple control agents associated with the various batteries may interact to exchange information and maintain at least partial coordination between the operations of the batteries. In such situations, one or more model realization systems may be used to generate models of the batteries.

Turning now to FIGS. 2I-2K, these figures illustrate examples of performing described techniques of the model realization system to model behavior of physical systems/ components via corresponding excitation and analysis activities, including for physical systems with a fuel cell, wind turbine and HVAC system, respectively (e.g., to improve a total system model of the fuel cell, wind turbine or HVAC system, and to use it for performing further automated control of output from the fuel cell, wind turbine or HVAC system, respectively).

With respect to FIG. 2K, it includes a block diagram 200K illustrating example components of an embodiment of a target system with one or more HVAC units $272k$ being automatically controlled by a CDI control agent $250K1$, such as in conjunction with a Model Realization System component $250K2$ that uses active non-destructive excitation of the HVAC unit(s) $272k$ to learn a parametric model that represents non-linear behavior and resulting output of the HVAC unit(s). In this example, the control agent $250K1$ performs automated operations to control heating and/or cooling of a building $271k$ via the one or more HVAC units $272k$, such as to satisfy one or more defined goals in light of defined constraints, rules and other criteria that are represented in the control agent. In some embodiments, the automated activities to control the HVAC unit(s) may be performed in a real-time manner and/or to optimize the costs of the heating and/or cooling activities, while maintaining the heating and/or cooling of some or all rooms of the building according to one or more defined criteria (e.g., within a temperature range, to respond to occupant-supplied dynamic requests to increase or decrease the temperature in particular rooms at particular times, etc.). In the illustrated example of FIG. 2K, the building has multiple floors $274k$, with each floor having one or more rooms $275k$. Some rooms have temperature sensors $276k$ (e.g., passive sensors) to supply temperature for that room, and some rooms (whether the same or different rooms) may have occupant-selectable instruction boxes $277k$ to request heating and/or cooling for one or more rooms associated with those instruction boxes. The control agent $250K1$ receives information from sensors for the target system (e.g., the in-room temperature sensors $276k$; one or more external temperature sensors, such as passive sensor $278k$ and/or other sensors, not shown, such as at or near the location of the air intakes for the HVAC unit(s); other sensors, not shown, associated with operation of the HVAC unit(s) $272k$ and/or a power supply $273k$ for the building, etc.), control signal information previously supplied from the control agent $250K1$ to the HVAC unit(s) $272k$ and/or power supply $273k$ (e.g., a last set of one or more control signals), other information about output or results of the target system operation, etc. The control agent $250K1$ then uses that received information and a model $279k$ of the HVAC system's learned behavior as part of a control loop to generate and provide further control signals to the HVAC unit(s) $272k$ and/or power supply $273k$. While the control agent is illustrated in this example as providing instructions directly to the HVAC unit(s) and/or power supply, in other embodiments the control agent may instead supply control instructions to one or more intermediary systems (e.g., a smart building management system, not shown).

Whether before and/or during the control operations of the control agent $250K1$, the Model Realization System (MRS) embodiment $250K2$ in FIG. 2K performs active non-destructive excitation of the HVAC system $272k$ (one or more HVAC units) to generate and optionally repeatedly improve a parametric model that represents non-linear behavior and resulting output of the HVAC system. In particular, in at least some embodiments, the MRS embodiment $250K2$ injects external temperature changes into the HVAC system air intake for each of multiple levels of external temperatures (e.g., micro-degree changes, milli-degree changes, single degree changes, etc.), such as via injections of heated and/or cooled air into the air intake(s) of the HVAC system via an associated auxiliary heating and/or cooling device (not shown), and using intelligent active sensors (not shown, such as in one or more rooms 275$k$ and optionally at or near locations of passive sensors 276$k$) to collect time changes of the responses to those injections. Information about the inputs and the responses is then analyzed and used to generate (or to update a previous model, if available, to provide) a current model 279$k$ of the HVAC system's behavior, such as an incremental parametric non-linear state model representing the internal dynamics of the HVAC system (e.g., with respect to characteristics about behavior of the HVAC system, such as internal air temperature that is provided and/or internal air humidity that is provided, etc.). This model 279$k$ is then provided to or otherwise made accessible to the control agent 250K1, which further uses the current version of the model 279$k$ to control additional ongoing HVAC system operations (e.g., to determine further control actions to perform for the HVAC system, such as to control whether and how much heating and/or cooling of a specified type is provided from the HVAC system). While the MRS embodiment 250K2 is generating the model 279$k$ and while the control agent 250K1 is performing control of the HVAC system's operations, uncertainty may exist about physical conditions in and/or around at least some of the buildings (e.g., about internal temperature, internal humidity, internal-to-external air exchange rate, etc.), and ongoing changes may be occurring with respect to demand for functionality from the HVAC system, to internal state of the HVAC system, to internal state of the building(s), and/or to external state around the building(s).

In a manner analogous to FIG. 2K, FIG. 2I includes a block diagram 200I illustrating example components of an embodiment of a target system with one or more fuel cell units 272$i$ being automatically controlled by a CDI control agent 250I1, such as in conjunction with a Model Realization System component 250I2 that uses active non-destructive excitation of the fuel cell unit(s) 272$i$ to learn a parametric model that represents non-linear behavior and resulting output of the fuel cell unit(s). In this example, the control agent 250I1 performs automated operations to control electrical power provided by the one or more fuel cell units 272$i$ to support one or more loads or other power demand requests (not shown), such as to satisfy one or more defined goals in light of defined constraints, rules and other criteria that are represented in the control agent. In some embodiments, the automated activities to control the fuel cell unit(s) may be performed in a real-time manner and/or to optimize the longevity of the fuel cell unit(s), while maintaining some or all electrical power demands or requests according to one or more defined criteria (e.g., while maintaining the internal state of the one or more fuel cell units within a specified range, etc.). In the illustrated example of FIG. 2I, one or more sensors 276$i$ (e.g., passive sensors) may be located on or proximate to the fuel cell unit(s) to supply information about the operating characteristics of the fuel cell unit(s), such as voltage, current, and/or electrical power being produced. The control agent 250I1 receives information from sensors for the target system (e.g., the passive sensors 276$i$; one or more other external sensors, such as passive external temperature sensor 278$i$ and/or other sensors, not shown, such as at or near the location of one or more components generating the load for the electrical power; etc.), control signal information previously supplied from the control agent 250I1 to the fuel cell unit(s) 272$i$ (e.g., a last set of one or more control signals), other information about output or results of the target system operation, etc. The control agent 250I1 then uses that information and a model 279$i$ of the fuel cell system's learned behavior as part of a control loop to generate and provide further control signals to the fuel cell system 273$i$ (one or more fuel cell units 272$i$). While the control agent is illustrated in this example as providing instructions directly to the fuel cell unit(s), in other embodiments the control agent may instead supply control instructions to one or more intermediary systems (e.g., a smart power management system that optionally includes other power source components, not shown).

Whether before and/or during the control operations of the control agent 250I1, the Model Realization System (MRS) embodiment 250I2 in FIG. 2I performs active non-destructive excitation of the fuel cell system 273$i$ (one or more fuel cell units 272$i$) to generate and optionally repeatedly improve a parametric model that represents non-linear behavior and resulting output of the fuel cell system. In particular, in at least some embodiments, the MRS embodiment 250I2 injects external electrical pulses into one or more of the fuel cell unit(s) (e.g., separate multi-frequency microvolt or millivolt pulses for each of the fuel cell's anode and cathode) for each of multiple charge levels, such as via injections of electrical charges by another power storage and/or generation device (not shown), and using intelligent active sensors (not shown, such as at or near locations of electrical power output of those fuel cell units) to collect time changes of the responses to those pulse injections. Information about the inputs and the responses is then analyzed and used to generate (or to update a previous model, if available, to provide) a current model 279$i$ of the behavior of the fuel cell unit(s), such as an incremental parametric non-linear state model representing the internal dynamics of the fuel cell unit(s) (e.g., with respect to characteristics about behavior of the fuel cell system, such as voltage and/or current and/or power that is provided, etc.). This model 279$i$ is then provided to or otherwise made accessible to the control agent 250I1, which further uses the current version of the model 279$i$ to control additional ongoing fuel cell system operations (e.g., to determine further control actions to perform for the fuel cell system, such as to control whether and how much electrical power is provided from the fuel cell system). While the MRS embodiment 250I2 is generating the model 279$i$ and while the control agent 250I1 is performing control of the fuel cell system's operations, uncertainty may exist about physical conditions inside and/or around at least some of the fuel cell units (e.g., about internal temperature, internal chemistry, internal fuel levels, etc.), and ongoing changes may be occurring with respect to electrical load or demand requests for electrical power from the fuel cell system, to internal state of one or more of the fuel cell unit(s), and/or to external state around one or more of the fuel cell unit(s).

In a manner analogous to FIGS. 2K and 2I, FIG. 2J includes a block diagram 200J illustrating example components of an embodiment of another target system with one or more wind turbine units 272$j$ being automatically controlled by a CDI control agent 250J1, such as in conjunction with a Model Realization System component 250J2 that uses active non-destructive excitation of the wind turbine unit(s) 272$j$ to learn a parametric model that represents non-linear behavior and resulting output of the wind turbine unit(s). In this example, the control agent 250J1 performs automated operations to control operation of (e.g., electrical power provided by) the one or more wind turbine units 272*j* to support one or more loads or other power demand requests (not shown), such as to satisfy one or more defined goals in light of defined constraints, rules and other criteria that are represented in the control agent. In some embodiments, the automated activities to control the wind turbine unit(s) may be performed in a real-time manner and/or to optimize the longevity of the wind turbine unit(s), while maintaining some or all power demands or requests according to one or more defined criteria (e.g., while maintaining the internal state of the one or more wind turbine units within a specified range, etc.). In the illustrated example of FIG. 2J, one or more sensors 276*j* (e.g., passive sensors) may be located on or proximate to the wind turbine unit(s) to supply information about the operating characteristics of the wind turbine unit(s), such as voltage, current, and/or electrical power being produced, rotation speed of the turbine blades, etc. The control agent 250J1 receives information from sensors for the target system (e.g., the passive sensors 276*j*; one or more other external sensors, such as passive wind speed and/or temperature sensors 278*j* and/or other sensors, not shown, such as at or near the location of one or more components generating the load for the electrical power; other sensors associated with operation of the wind turbine unit(s) 272*j*, such as a passive sensor at a wind turbine control unit 273*j* for one or more wind turbines, or other sensors that are not shown; etc.), control signal information previously supplied from the control agent 250J1 to the wind turbine unit(s) 272*j* (e.g., a last set of one or more control signals), other information about output or results of the target system operation, etc. The control agent 250J1 then uses that information and a model 279*j* of the wind turbine system's learned behavior as part of a control loop to generate and provide further control signals to the wind turbine system 272*j* (one or more wind turbine units). While the control agent is illustrated in this example as providing instructions directly to the wind turbine unit(s), in other embodiments the control agent may instead supply control instructions to one or more intermediary systems (e.g., a wind turbine control unit 273*j*; a smart power management system that optionally includes other power source and/or storage components, not shown; etc.).

Whether before and/or during the control operations of the control agent 250J1, the Model Realization System (MRS) embodiment 250J2 in FIG. 2J performs active non-destructive excitation of the wind turbine system 272*i* (one or more wind turbine units) to generate and optionally repeatedly improve a parametric model that represents non-linear behavior and resulting output of the wind turbine system. In particular, in at least some embodiments, the MRS embodiment 250J2 injects, for each of multiple levels of an electro-mechanical field at a generator of a wind turbine unit, changes to the electro-mechanical field (e.g., micro- or nano- or pico-tesla (T) changes to the magnetic field, micro- or milla-volt-per-meter (V/m) changes to the electric field, etc.), such as via operation of an auxiliary electro-mechanical field generation and/or dampening device (not shown), and using intelligent active sensors (not shown, such as at or near locations of power output of those wind turbine units) to collect time changes of the responses to those injections. Information about the inputs and the responses is then analyzed and used to generate (or to update a previous model, if available, to provide) a current model 279*j* of the behavior of the wind turbine unit(s), such as an incremental parametric non-linear state model representing the internal dynamics of the wind turbine unit(s) (e.g., with respect to characteristics about behavior of the wind turbine system, such as power generation, internal mechanical resistance, etc.). This model 279*j* is then provided to or otherwise made accessible to the control agent 250J1, which further uses the current version of the model 279*j* to control additional ongoing wind turbine system operations (e.g., to determine further control actions to perform for the wind turbine system, such as to control whether and how much power is provided from the wind turbine system). While the MRS embodiment 250J2 is generating the model 279*j* and while the control agent 250J1 is performing control of the wind turbine system's operations, uncertainty may exist about physical conditions inside and/or around at least some of the wind turbine units (e.g., about internal temperature, internal resistance, etc.), and ongoing changes may be occurring with respect to electrical load or demand requests for electrical power from the wind turbine system, to internal state of one or more of the wind turbine unit(s), to wind speed and direction or other external state around one or more of the wind turbine unit(s), etc.

With respect to physical target systems such as those discussed with respect to FIGS. 2I-2K and elsewhere herein (e.g., fuel cells, wind turbines, HVAC units, etc.), and in an analogous manner to that discussed above with respect to physical systems, a model of a physical system's dynamic behavior is generated in at least some embodiments by gathering and analyzing information about the physical systems' operations under varying conditions. As part of doing so, one or more inputs that affect operation of the physical system is injected into the physical system for each of multiple levels of an input type within a determined or otherwise specified range, and sensors' time response is measured and used for generating a parametric dynamic behavioral model of the physical system. This process is repeated for each of multiple levels within the range for each of one or more inputs and/or other factors that affect system operation—by doing so, an input-output relation is established for the given physical system, based on the measured output signals from the physical system's response to the injected active non-destructive input signals, such as to fully characterize a locally linear time-invariant (LTI) system. A range for a type of input or other factor may be determined, for example, by selecting the largest range for each input or other factor that is consistent with the sensitivity of the physical system to such changes. In addition, the operations of an embodiment of the model realization system that is in use for that type of physical system may be carried out in some embodiments by real-time software that includes the computation of the estimated physical system internal state for one or more characteristics, and generates a linear parametric model of the dynamics of one or more characteristics of the physical system as a function of the inputs and/or other factors. The generating of the parametric linear model may use dynamic realization and filtering algorithms to estimate the parameters of the model for each range of input(s) and other factors, and also include a process for determining the quality of the generated model, and whether the selected ranges are correct. For the purpose of these examples, a physical system/component is considered standard (e.g., acceptable for use) if its' model parameters generate a metric by simulation that is within the acceptable value for the corresponding metric of the base physical system of its type or kind. In addition, in at least some situations, an incremental model used to describe system dynamics is considered linear within a specified incremental time interval. With respect to the described techniques for the examples above involving generating a numerical model of a given physical system via learning, they may use characterization of the physical system based on experimentally obtained data to train a predetermined generalized model for that type of physical system.

The example approach described above with respect to FIGS. 2I-2K provides quality control determination of physical systems/components. In addition, a behavioral model for a reference physical system of a particular type (e.g., a physical system of that type of high quality) may be generated using a sequence of parametric models for a set of input and/or other factor levels, with such a physical system referred to at times as a 'reference standard' physical system and/or 'standard physical system' (e.g., for a type of wind turbine and/or type of fuel cell and/or type of HVAC unit, etc.; for an associated group of physical systems of the same type to be used together in a common target system and/or for a common purpose; etc.), and with the generated behavioral model for such a physical system referred to at times as a 'reference standard behavioral model' and stored for use in comparison to other behavioral models of other physical systems of that type or for potential inclusion in the associated group. Each physical system that is a candidate for an implementation may be evaluated using this approach, and the resulting generated models may be compared against the model for the 'reference standard' (e.g., to provide a standardized or normed comparison against a fixed standard) and/or against each other (e.g., to provide a relative comparison). If the differences between a candidate physical system and the standard physical system are calculated and are sufficiently low (e.g., below a defined threshold), the candidate physical system may be treated as acceptable or good, such as to be used in a particular physical system implementation. If the differences between two or more candidate physical systems are calculated, some quantity or group of the candidate physical systems (e.g., with respect to one or more measures of the generated parametric models, the top 1, the top X, the top X %, etc.,) may similarly be treated as acceptable or good, or more generally zero or more of the group of candidate physical systems may be treated as acceptable or good if they satisfy one or more satisfied criteria (e.g., with respect to one or more performance criteria), such as to be used in one or more particular physical system implementations. Such a proposed test of a candidate physical system may, for example, take only a couple of seconds.

In addition, the generation of the parametric model for a standard physical system may be repeated over prolonged use of the physical system in at least some embodiments to determine, for the particular standard physical system and/or the type of the standard physical system, the marginal degradation of the physical system performance. The degradation may further be extrapolated to determine an estimated longevity of this particular physical system and/or type of physical system, such as for use in establishing rules for future operation of the physical system that maximize one or more goals (e.g., physical system life, economic value, etc.). Another possible application of the approach described above in some embodiments is for selecting physical system groups whose physical systems exhibit nearly uniform behavior, such as for implementing quality operation on industrial physical systems. Another possible application of the approach described above in some embodiments is to generate initial models for a particular physical system and/or a particular type of physical system that are used in subsequent implementation of physical system control (e.g., real-time or near-real-time control), optionally with the initial model(s) updated during ongoing operation of a particular physical system to reflect that ongoing operation.

It will be appreciated that the examples of FIGS. 2A-2K are provided for illustrative purposes and are simplified for the sake of brevity, and the inventive techniques may be used in a wide variety of other situations, including in other environments and with other types of automated control action determination techniques, some of which are discussed below.

Figure 3:
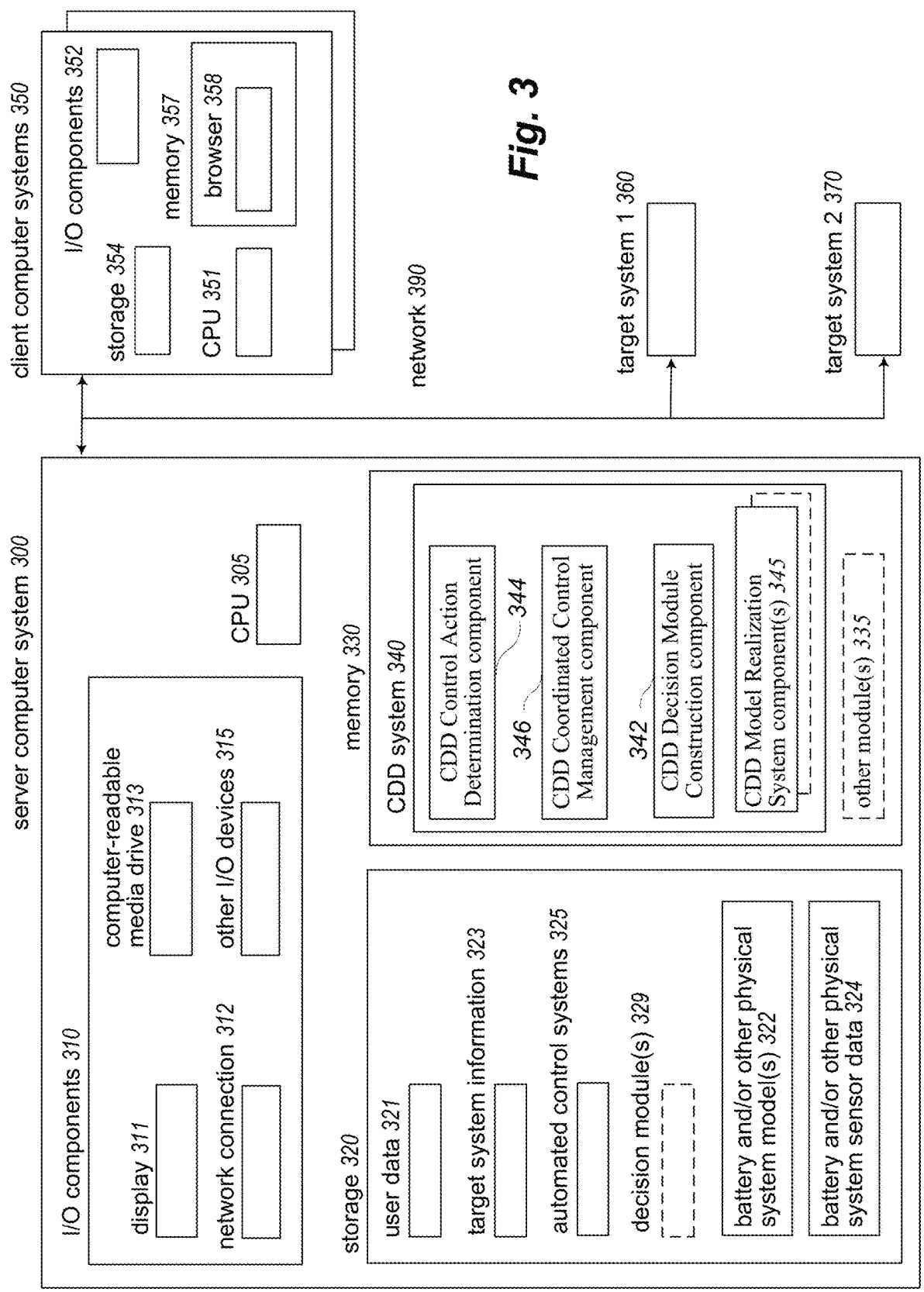
FIG. 3 is a block diagram illustrating example computing systems suitable for executing an embodiment of a system for performing cooperative distributed control of target systems in configured manners.

FIG. 3 is a block diagram illustrating example computing systems suitable for performing techniques for implementing automated control systems to control or otherwise manipulate at least some operations of specified physical systems or other target systems (e.g., physical systems that include one or more batteries and/or other types of physical systems) in configured manners based at least in part on internal state information of the physical systems that is generated using described techniques of an embodiment of a model realization system, as discussed in greater detail elsewhere herein. In particular, FIG. 3 illustrates a server computing system 300 suitable for providing at least some functionality of a CDD system including one or more model realization system components, although in other embodiments multiple computing systems may be used for the execution (e.g., to have distinct computing systems executing the CDD Decision Module Construction component for initial configuration and setup before run-time control occurs, and one or more copies of the CDD Control Action Determination component 344 and/or the CDD Coordinated Control Managements component 346 and/or CDD Model Realization System component 345 for the actual run-time control; to have one or more computing systems executing the model realization system components that are separate from one or more other computing systems executing some or all of a CDD system with which the model realization system components interact; to have different computing systems executing different model realization systems; etc.). FIG. 3 also illustrates various client computer systems 350 that may be used by customers or other users of the CDD system 340, as well as one or more target physical systems to be controlled (in this example, target system 1 360 and target system 2 370, which are accessible to the CDD system 340 and its model realization system components 345 over one or more computer networks 390, although in other embodiments the model realization system components and/or other CDD components may execute local to a target system that they are controlling).

In the illustrated embodiment, the one or more model realization system components 345 are executing in memory 330 as part of the CDD system 340, and in some embodiments the component(s) each includes various software instructions that when executed program one or more of the hardware CPU processors 305 to provide an embodiment of a model realization system as described elsewhere herein. During operation, in at least some embodiments, each model realization system component may obtain various input data 324 (e.g., from one or more active sensors, not shown) and modify one or more physical target system state and behavioral models (e.g., copies of models 322 stored on storage 320), as well as exchange various information with other executing components, as discussed in greater detail elsewhere herein.

The server computing system 300 has components in the illustrated embodiment that include one or more hardware CPU ("central processing unit") computer processors 305, various I/O ("input/output") hardware components 310, storage 320, and memory 330. The illustrated I/O components include a display 311, a network connection 312, a computer-readable media drive 313, and other I/O devices 315 (e.g., a keyboard, a mouse, speakers, etc.). In addition, the illustrated client computer systems 350 may each have components similar to those of server computing system 300, including one or more hardware CPUs 351, I/O components 352, storage 354, and memory 357, although some details are not illustrated for the computing systems 350 for the sake of brevity. The target systems 360 and 370 may also each include one or more computing systems (not shown) having components that are similar to some or all of the components illustrated with respect to server computing system 300, including to optionally locally execute one or more CDD components, but such computing systems and components are not illustrated in this example for the sake of brevity.

The CDD system 340 is executing in memory 330 and includes components 342-346, and in some embodiments the system and/or components each includes various software instructions that when executed program one or more of the CPU processors 305 to provide an embodiment of a CDD system as described elsewhere herein. The CDD system 340 may interact with computing systems 350 over the network 390 (e.g., via the Internet and/or the World Wide Web, via a private cellular network, etc.), as well as the target systems 360 and 370 in this example. In this example embodiment, the CDD system includes functionality related to generating and deploying decision modules in configured manners for customers or other users, as discussed in greater detail elsewhere herein, as well as generating or deploying model realization system components 345 at runtime to improve modeled state information of a corresponding target system. The other computing systems 350 may also be executing various software as part of interactions with the CDD system 340 and/or its components. For example, client computing systems 350 may be executing software in memory 357 to interact with CDD system 340 (e.g., as part of a Web browser, a specialized client-side application program, etc.), such as to interact with one or more interfaces (not shown) of the CDD system 340 to configure and deploy automated control systems (e.g., stored automated control systems 325 that were previously created by the CDD system 340 for use in controlling one or more physical target systems) or other decision modules 329, as well as to perform various other types of actions, as discussed in greater detail elsewhere. Various information related to the functionality of the CDD system 340 may be stored in storage 320, such as information 321 related to users of the CDD system (e.g., account information), and information 323 related to one or more physical target systems (e.g., systems that have batteries to be controlled and/or other types of physical systems).

It will be appreciated that computing systems 300 and 350 and target systems 360 and 370 are merely illustrative and are not intended to limit the scope of the present invention. The computing systems may instead each include multiple interacting computing systems or devices, and the computing systems/nodes may be connected to other devices that are not illustrated, including through one or more networks such as the Internet, via the Web, or via private networks (e.g., mobile communication networks, etc.). More generally, a computing node or other computing system or device may comprise any combination of hardware that may interact and perform the described types of functionality, including without limitation desktop or other computers, database servers, network storage devices and other network devices, PDAs, cell phones, wireless phones, pagers, electronic organizers, Internet appliances, television-based systems (e.g., using set-top boxes and/or personal/digital video recorders), and various other consumer products that include appropriate communication capabilities. In addition, the functionality provided by the illustrated CDD system 340 and its components may in some embodiments be distributed in additional components. Similarly, in some embodiments some of the functionality of the CDD system 340 and/or CDD components 342-346 may not be provided and/or other additional functionality may be available.

As part of implementing an automated control system for a particular target system, an embodiment of a Collaborative Distributed Decision (CDD) system may use the described techniques to perform various automated activities involved in constructing and implementing the automated control system, including generating one or more CDI agents (also referred to as a CDD decision module or system, or a portion of such module or system) for use as some or all of an automated control system in controlling particular target systems.

In particular, the CDD system may in some embodiments implement a Decision Module Construction component that interacts with one or more users to obtain a description of a target system, including restrictions related to the various elements of the target system, and one or more goals to be achieved during control of the target system—the Decision Module Construction component then performs various automated actions to generate, test and deploy one or more executable decision modules (also referred to at times as "decision elements" and/or "agents") to use in performing the control of the target system. When the one or more executable decision modules are deployed and executed, the CDD system may further provide various components within or external to the decision modules being executed to manage their control of the target system, such as a Control Action Determination component of each decision module as part of a control system to optimize or otherwise enhance the control actions that the decision module generates, a model realization system component to determine modeled state and behavioral information for the target system, and/or one or more Coordinated Control Management components to coordinate the control actions of multiple decision modules that are collectively performing the control of the target system.

As noted above, a Collaborative Distributed Decision (CDD) system may in some embodiments use at least some of the described techniques to perform various automated activities involved in constructing and implementing an automated control system for a specified target system, such as to modify or otherwise manipulate inputs or other control elements of the target system that affect its operation (e.g., affect one or more outputs of the target system). An automated control system for such a target system may in some situations have a distributed architecture that provides cooperative distributed control of the target system, such as with multiple decision modules that each control a portion of the target system and that operate in a partially decoupled manner with respect to each other. If so, the various decision modules' operations for the automated control system may be at least partially synchronized, such as by each reaching a consensus with one or more other decision modules at one or more times, even if a fully synchronized convergence of all decision modules at all times is not guaranteed or achieved.

The CDD system may in some embodiments implement a Decision Module Construction component that interacts with one or more users to obtain a description of a target system, including restrictions related to the various elements of the target system, and one or more goals to be achieved during control of the target system—the Decision Module Construction component then performs various automated actions to generate, test and deploy one or more executable decision modules to use in performing the control of the target system. The Decision Module Construction component may thus operate as part of a configuration or setup phase that occurs before a later run-time phase in which the generated decision modules are executed to perform control of the target system, although in some embodiments and situations the Decision Module Construction component may be further used after an initial deployment to improve or extend or otherwise modify an automated control system that has one or more decision modules (e.g., while the automated control system continues to be used to control the target system), such as to add, remove or modify decision modules for the automated control system. [cm 06] In some embodiments, some or all automated control systems that are generated and deployed may further provide various components within them for execution during the runtime operation of the automated control system, such as by including such components within decision modules in some embodiments and situations. Such components may include, for example, a Control Action Determination component of each decision module (or of some decision modules) to optimize or otherwise determine and improve the control actions that the decision module generates, and/or a model realization system component of each decision module (or of some decision modules) to determine modeled state and behavioral information for the target system. For example, such a Control Action Determination component in a decision module may in some embodiments attempt to automatically determine the decision module's control actions for a particular time to reflect a near-optimal solution with respect to or one more goals and in light of a model of the decision module for the target system that has multiple inter-related constraints and based on current state information that is modeled for the target system—if so, such a near-optimal solution may be based at least in part on a partially optimized solution that is within a threshold amount of a fully optimized solution. Such determination of one or more control actions to perform may occur for a particular time and for each of one or more decision modules, as well as be repeated over multiple times for ongoing control by at least some decision modules in some situations. In some embodiments, the model for a decision module is implemented as a Hamiltonian function that reflects a set of coupled differential equations based in part on constraints representing at least part of the target system, such as to allow the model and its Hamiltonian function implementation to be updated over multiple time periods by adding additional expressions within the evolving Hamiltonian function, as discussed in greater detail elsewhere herein.

In some embodiments, the components included within a generated and deployed automated control system for execution during the automated control system's runtime operation may further include one or more Coordinated Control Management components to coordinate the control actions of multiple decision modules that are collectively performing the control of a target system for the automated control system. For example, some or all decision modules may each include such a Coordinated Control Management component in some embodiments to attempt to synchronize that decision module's local solutions and proposed control actions with those of one or more other decision modules in the automated control system, such as by determining a consensus shared model with those other decision modules that simultaneously provides solutions from the decision module's local model and the models of the one or more other decision modules. Such inter-module synchronizations may occur repeatedly to determine one or more control actions for each decision module at a particular time, as well as to be repeated over multiple times for ongoing control. In addition, each decision module's model is implemented in some embodiments as a Hamiltonian function that reflects a set of coupled differential equations based in part on constraints representing at least part of the target system, such as to allow each decision module's model and its Hamiltonian function implementation to be combined with the models of one or more other decision modules by adding additional expressions for those other decision modules' models within the initial Hamiltonian function for the local model of the decision module, as discussed in greater detail elsewhere herein.

It will also be appreciated that, while various items are illustrated as being stored in memory or on storage while being used, these items or portions of them may be transferred between memory and other storage devices for purposes of memory management and data integrity. Alternatively, in other embodiments some or all of the software modules and/or systems may execute in memory on another device and communicate with the illustrated computing systems via inter-computer communication. Thus, in some embodiments, some or all of the described techniques may be performed by hardware means that include one or more processors and/or memory and/or storage when configured by one or more software programs (e.g., by the model realization system components 345 and/or other of the CDD components 342-346, or more generally by the CDD system 340) and/or data structures, such as by execution of software instructions of the one or more software programs and/or by storage of such software instructions and/or data structures. Furthermore, in some embodiments, some or all of the systems and/or components may be implemented or provided in other manners, such as by using means that are implemented at least partially or completely in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the components, systems and data structures may also be stored (e.g., as software instructions or structured data) on a non-transitory computer-readable storage medium, such as a hard disk or flash drive or other non-volatile storage device, volatile or non-volatile memory (e.g., RAM), a network storage device, or a portable media article to be read by an appropriate drive (e.g., a DVD disk, a CD disk, an optical disk, etc.) or via an appropriate connection. The systems, components and data structures may also in some embodiments be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 4:
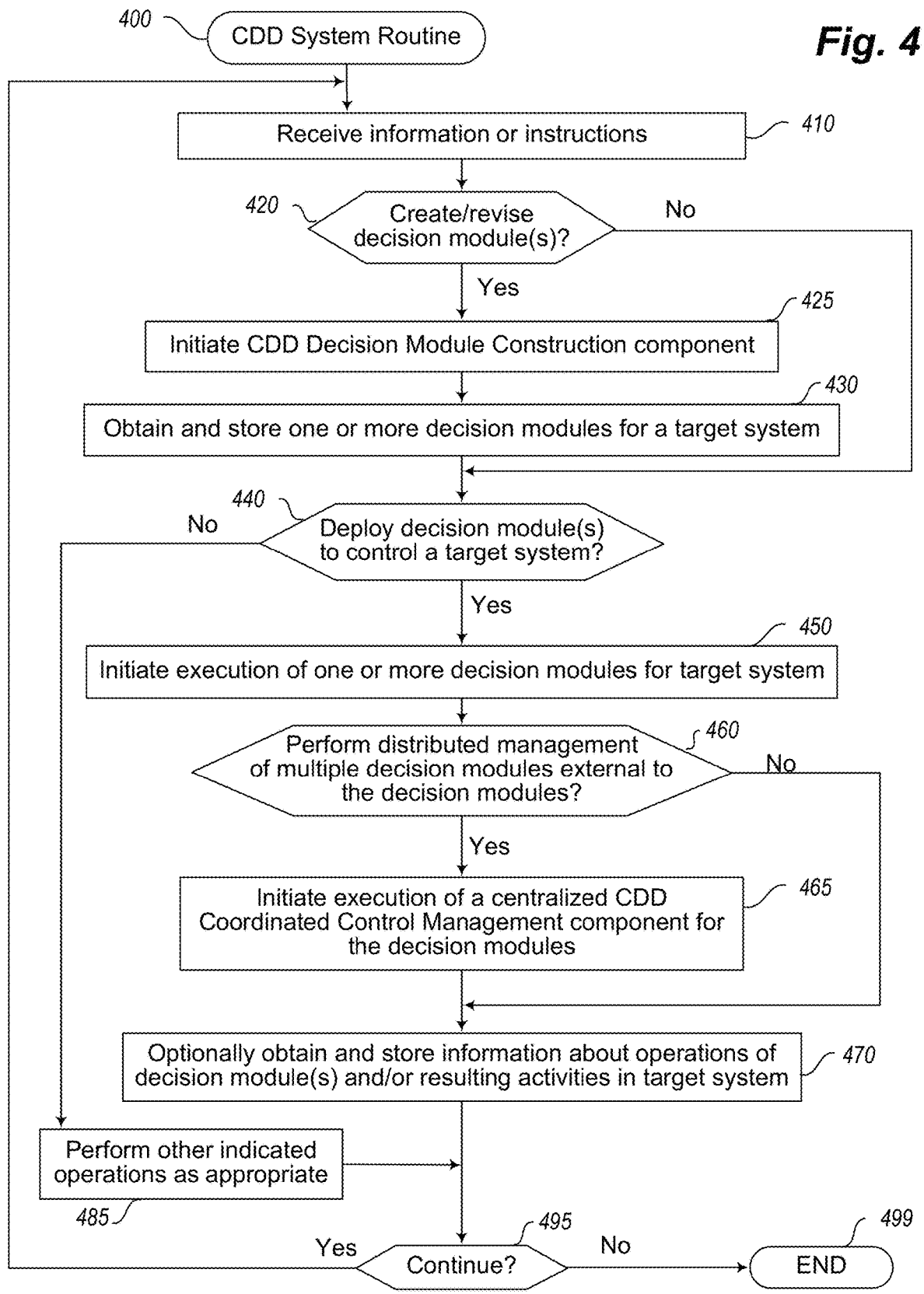
FIG. 4 illustrates a flow diagram of an example embodiment of a Collaborative Distributed Decision (CDD) System routine.

FIG. 4 is a flow diagram of an example embodiment of a Collaborative Distributed Decision (CDD) system routine 400. The routine may, for example, be provided by execution of the CDD system 340 of FIG. 3 and/or the CDD system 140 of FIG. 1B, such as to provide functionality to construct and implement automated control systems for specified physical target systems. In the example following flow charts, a model realization system component is discussed as being included in and deployed with a decision module, such that deployment of a decision module may include deploying its embodiment of the model realization system (e.g., to optionally execute before other components of the decision module), although in other embodiments a model realization system may be deployed separately from any decision modules.

The illustrated embodiment of the routine begins at block 410, where information or instructions are received. If it is determined in block 420 that the information or instructions of block 410 include an indication to create or revise one or more decision modules for use as part of an automated control system for a particular target system, the routine continues to block 425 to initiate execution of a Decision Module Construction component, and in block 430 obtains and stores one or more resulting decision modules for the target system that are created in block 425. One example of a routine for such a Decision Module Construction component is discussed in greater detail with respect to FIGS. 5A-5B.

After block 430, or if it is instead determined in block 420 that the information or instructions received in block 410 are not to create or revise one or more decision modules, the routine continues to block 440 to determine whether the information or instructions received in block 410 indicate to deploy one or more created decision modules to control a specified target system, such as for one or more decision modules that are some or all of an automated control system for that target system. The one or more decision modules to deploy may have been created immediately prior with respect to block 425, such that the deployment occurs in a manner that is substantially simultaneous with the creation, or in other situations may include one or more decision modules that were created at a previous time and stored for later use. If it is determined to deploy one or more such decision modules for such a target system, the routine continues to block 450 to initiate the execution of those one or more decision modules for that target system, such as on one or more computing systems local to an environment of the target system, or instead on one or more remote computing systems that communicate with the target system over one or more intermediary computer networks (e.g., one or more computing systems under control of a provider of the CDD system).

After block 450, the routine continues to block 460 to determine whether to perform distributed management of multiple decision modules being deployed in a manner external to those decision modules, such as via one or more centralized Coordinated Control Management components. If so, the routine continues to block 465 to initiate execution of one or more such centralized CDD Coordinated Control Management components for use with those decision modules. After block 465, or if it is instead determined in block 460 to not perform such distributed management in an external manner (e.g., if only one decision module is executed, if multiple decision modules are executed but coordinate their operations in a distributed peer-to-peer manner via local CDD Coordinated Control Management components, etc.), the routine continues to block 470 to optionally obtain and store information about the operations of the one or more decision modules and/or resulting activities that occur in the target system, such as for later analysis and/or reporting.

If it is instead determined in block 440 that the information or instructions received in block 410 are not to deploy one or more decision modules, the routine continues instead to block 485 to perform one or more other indicated operations if appropriate. For example, such other authorized operations may include obtaining results information about the operation of a target system in other manners (e.g., by monitoring outputs or other state information for the target system), analyzing results of operations of decision modules and/or activities of corresponding target systems, generating reports or otherwise providing information to users regarding such operations and/or activities, etc. In addition, in some embodiments the analysis of activities of a particular target system over time may allow patterns to be identified in operation of the target system, such as to allow a model of that target system to be modified accordingly (whether manually or in an automated learning manner) to reflect those patterns and to respond based on them. In addition, as discussed in greater detail elsewhere, distributed operation of multiple decision modules for an automated control system in a partially decoupled manner allows various changes to be made while the automated control system is in operation, such as to add one or more new decision modules, to remove one or more existing decision modules, to modify the operation of a particular decision module (e.g., by changing rules or other information describing the target system that is part of a model for the decision module), etc. In addition, the partially decoupled nature of multiple such decision modules in an automated control system allows one or more such decision modules to operate individually at times, such as if network communication issues or other problems prevent communication between multiple decision modules that would otherwise allow their individualized control actions to be coordinated—in such situations, some or all such decision modules may continue to operate in an individualized manner, such as to provide useful ongoing control operations for a target system even if optimal or near-optimal solutions cannot be identified from coordination and synchronization between a group of multiple decision modules that collectively provide the automated control system for the target system.

After blocks 470 or 485, the routine continues to block 495 to determine whether to continue, such as until an explicit indication to terminate is received. If it is determined to continue, the routine returns to block 410, and otherwise continues to block 499 and ends.

Figure 5A:
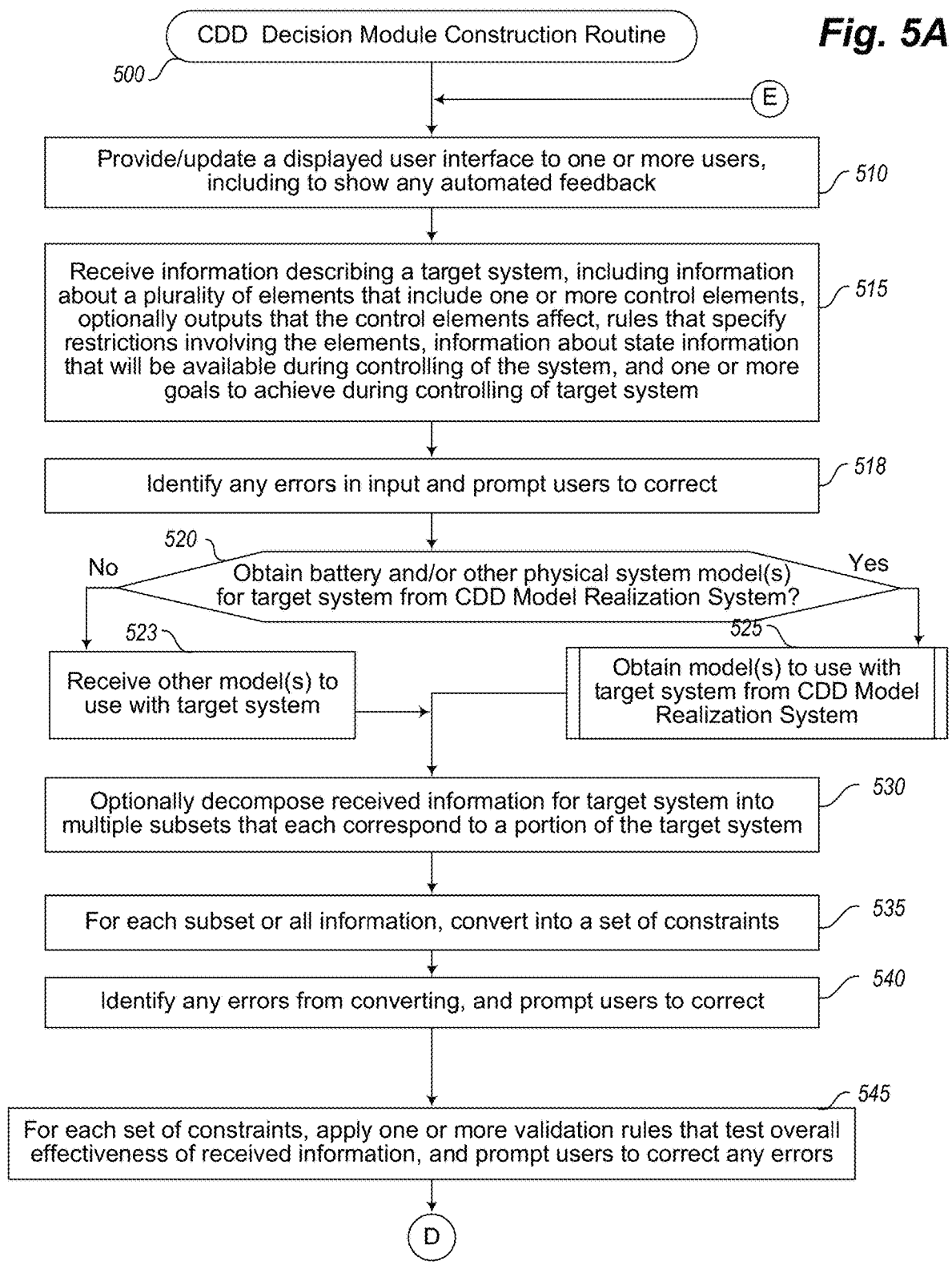
FIGS. 5A-5B illustrate a flow diagram of an example embodiment of a CDD Decision Module Construction routine.
Figure 5B:
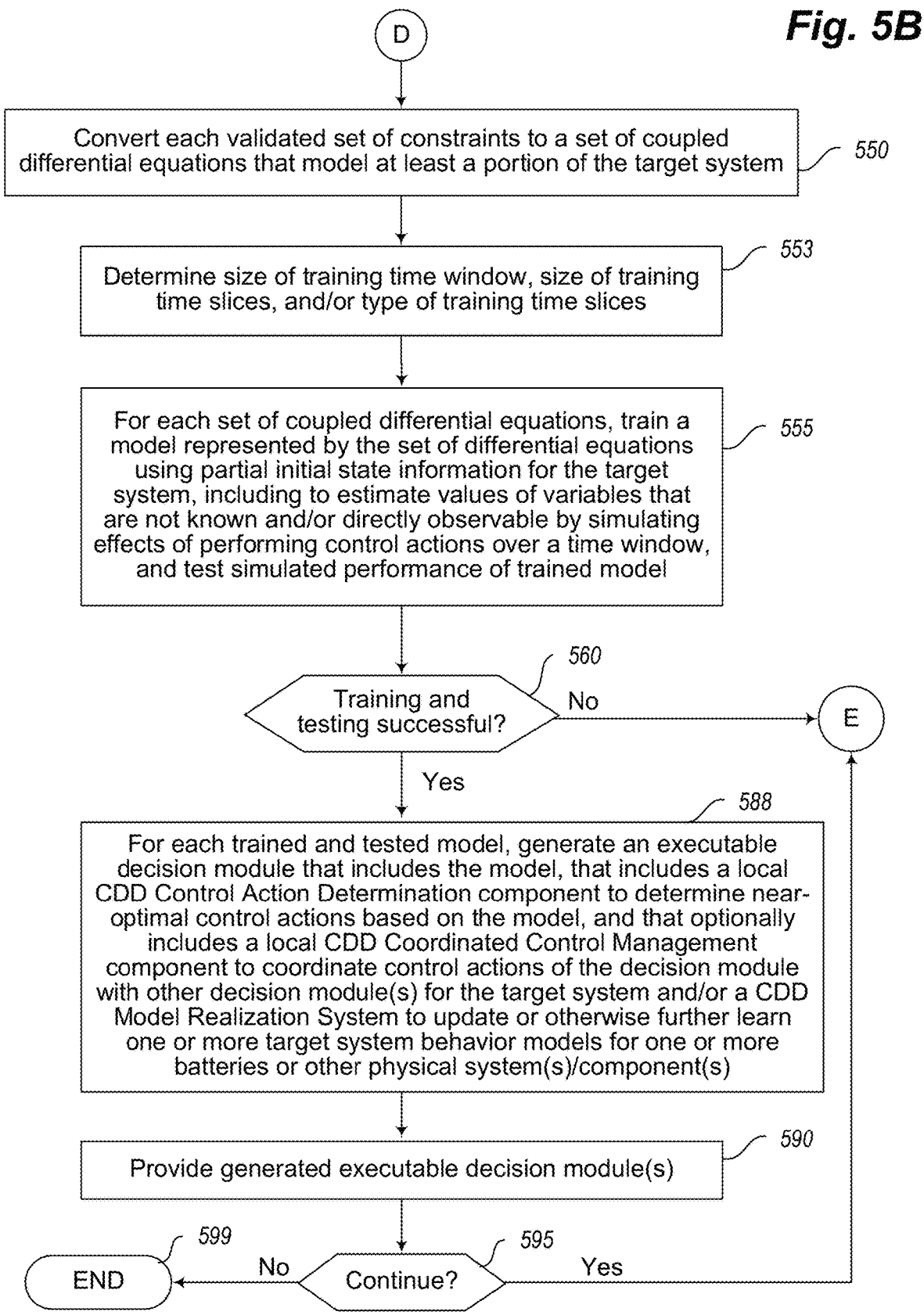

FIGS. 5A-5B illustrate a flow diagram of an example embodiment of a CDD Decision Module Construction routine 500. The routine may, for example, be provided by execution of the component 342 of FIG. 3 and/or the component 142 of FIG. 1B, such as to provide functionality to allow users to provide information describing a physical target system of interest, and to perform corresponding automated operations to construct one or more decision modules to use to control the target system in specified manners. While the illustrated embodiment of the routine interacts with users in particular manners, such as via a displayed GUI (graphical user interface), it will be appreciated that other embodiments of the routine may interact with users in other manners, such as via a defined API (application programming interface) that an executing program invokes on behalf of a user. In some embodiments, the routine may further be implemented as part of an integrated development environment or other software tool that is available for one or more users to use, such as by implementing an online interface that is available to a variety of remote users over a public network such as the Internet, while in other embodiments a copy of the CDD system and/or particular CDD components may be used to support a single organization or other group of one or more users, such as by being executed on computing systems under the control of the organization or group. In addition, the CDD Decision Module Construction component may in some embodiments and situations be separated into multiple sub-components, such as a rules editor component that users interact with to specify rules and other description information for a target system, and a rules compiler engine that processes the user-specified rules and other information to create one or more corresponding decision modules.

The illustrated embodiment of the routine 500 begins at block 510, where the routine provides or updates a displayed user interface to one or more users, such as via a request received at an online version of component that is implementing the routine, or instead based on the routine being executed by one or more such users on computing systems that they control. While various operations are shown in the illustrated embodiment of the routine as occurring in a serial manner for the purpose of illustration, it will be appreciated that user interactions with such a user interface may occur in an iterative manner and/or over multiple periods of time and/or user sessions, including to update a user interface previously displayed to a user in various manners (e.g., to reflect a user action, to reflect user feedback generated by operation of the routine or from another component, etc.), as discussed further below.

After block 510, the routine continues to block 515 to receive information from one or more such users describing a target system to be controlled, including information about a plurality of elements of the target system that include one or more manipulatable control elements and optionally one or more outputs that the control elements affect, information about rules that specify restrictions involving the elements, information about state information that will be available during controlling of the system (e.g., values of particular elements or other state variables, such as from passive sensors), and one or more goals to achieve during the controlling of the target system. It will be appreciated that such information may be obtained over a period of time from one or more users, including in some embodiments for a first group of one or more users to supply some information related to a target system and for one or more other second groups of users to independently provide other information about the target system, such as to reflect different areas of expertise of the different users and/or different parts of the target system. After block 515, the routine continues to block 518 to identify any errors that have been received in the user input, and to prompt the user(s) to correct those errors, such as by updating the display in a corresponding manner as discussed with respect to block 510. While the identification of such errors is illustrated as occurring after the receiving of the information in block 515, it will be appreciated that some or all such errors may instead be identified as the users are inputting information into the user interface, such as to identify syntax errors in rules or other information that the users specify.

After block 518, the routine continues to block 520 to determine whether to obtain one or more state and behavioral models from the CDD Model Realization System for the physical system and/or one or more components of the physical system (e.g., if the physical system/component is of a type that has non-linear behavior in response to linear changes in one or more inputs), and if so continues to block 525 to obtain the model(s). One example embodiment of a routine for implementing operations of the CDD Model Realization System is further illustrated with respect to FIG. 9, and the obtaining of any such state and behavioral models may include retrieving previously determined models (e.g., for a type of physical system/component, for a particular physical system/component, etc.) and/or dynamically generating any such models. If it is instead determined in block 520 to not obtain any such state and behavioral models from the CDD Model Realization System, the routine continues instead to block 523 to, if the target system includes one or more physical systems and/or physical system components to have state and behavioral models, receive one or more corresponding such state and behavioral models from another source, such as via the user interface for one or more previously generated models. After blocks 523 or 525, the illustrated embodiment of the routine continues to block 530 to optionally decompose the information about the target system into multiple subsets that each correspond to a portion of the target system, such as with each subset having one or more different control elements that are manipulatable by the automated control system being created by the routine, and optionally have overlapping or completely distinct goals and/or sets of rules and other information describing the respective portions of the target system. As discussed in greater detail elsewhere, such decomposition, if performed, may in some situations be performed manually by the users indicating different subgroups of information that they enter, and/or in an automated manner by the routine based on an analysis of the information that has been specified (e.g., based on the size of rules and other descriptive information supplied for a target system, based on inter-relationships between different rules or goals or other information, etc.). In other embodiments, no such decomposition may be performed.

After block 530, the routine continues to block 535 to, for each subset of target system description information (or for all the received information if no such subsets are identified), convert that subset (or all the information) into a set of constraints that encapsulate the restrictions, goals, and other specified information for that subset (or for all the information). In block 540, the routine then identifies any errors that occur from the converting process, and if any are identified, may prompt the user to correct those errors, such as in a manner similar to that described with respect to blocks 518 and 510. While not illustrated in this example, the routine may in some situations in blocks 518 and/or 540 return to block 510 when such errors are identified, to display corresponding feedback to the user(s) and to allow the user(s) to make corrections and re-perform following operations such as those of blocks 515-540. The errors identified in the converting process in block 540 may include, for example, errors related to inconsistent restrictions, such as if the restrictions as a group are impossible to satisfy.

After block 540, the routine continues to block 545 to, for each set of constraints (or a single constraint set if no subsets were identified in block 530), apply one or more validation rules to the set of constraints to test overall effectiveness of the corresponding information that the constraints represent, and to prompt the one or more users to correct any errors that are identified in a manner similar to that with respect to blocks 518, 540 and 510. Such validation rules may test one or more of controllability, observability, stability, and goal completeness, as well as any user-added validation rules, as discussed in greater detail elsewhere. In block 550, the routine then converts each validated set of constraints to a set of coupled differential equations that model at least a portion of the target system to which the underlying information corresponds.

After block 550, the routine continues to block 553 to perform activities related to training a model for each set of coupled differential equations, including to determine one or more of a size of a training time window to use, size of multiple training time slices within the time window, and/or a type of training time slice within the time window. In some embodiments and situations, the determination of one or more such sizes or types of information is performed by using default or pre-specified information, while in other embodiments and situations the users may specify such information, or an automated determination of such information may be performed in one or more manners (e.g., by testing different sizes and evaluating results to find sizes with the best performance). Different types of time slices may include, for example, successions of time slices that overlap or do not overlap, such that the training for a second time slice may be dependent only on results of a first time slice (if they do not overlap) or instead may be based at least in part on updating information already determined for at least some of the first time slice (if they do overlap in part or in whole). After block 553, the routine continues to block 555 to, for each set of coupled differential equations representing a model, train the model for that set of coupled differential equations using partial initial state information determined externally for the target system (e.g., from passive sensors), including to estimate values of variable that are not known and/or directly observable for the target system by simulating effects of performing control actions over the time window, such as for successive time slices throughout the time window, and to test the simulated performance of the trained model. Additional details related to training and testing are included elsewhere herein.

After block 555, the routine continues to block 560 to determine whether the training and testing was successful, and if not returns to block 510 to display corresponding feedback information to the users to allow them to correct errors that caused the lack of success. If it is instead determined in block 560 that the testing and training were successful, however, or after block 583 with a model updated with one or more learned soft rules, the routine continues instead to block 588 to generate an executable decision module for each trained and tested model that includes that model, as well as a local CCD Control Action Determination component that the decision module will use when executed to determine optimal or near-optimal control actions to perform for the target system based on the information included in the model and in light of the one or more goals for that decision module, and that includes or uses at least one CCD Model Realization System component generated in block 542. The generated executable decision module may in some embodiments and situations further include a local CCD Coordinated Control Management component to coordinate control actions of multiple decision modules that collectively will provide an automated control system for the target system, such as by synchronizing respective models of the various decision modules over time. In addition, the generated executable decision module may in some embodiments and situations further include a local CCD Model Realization System component to use to generate one or more state and behavioral models during execution of the decision module, such as to update an existing state and behavioral model that was present in the decision module at the time execution began, to create a new state and behavioral model for one or more physical system components (e.g., one or more fuel cells, one or more wind turbines, one or more HVAC units, etc.) added to the physical target system while the decision module is operating (e.g., to replace or supplement one or more other physical system components present when the decision module began operating), etc. After block 588, the routine continues to block 590 to provide the generated executable decision modules for use, including to optionally store them for later execution and/or deployment.

It if was determined in block 505 to use a model realization system, the routine continues to block 565, where the model realization system is used to determine and generate a state and behavioral model for the physical system or for each of one or more physical system components in the physical target system, as discussed in greater detail elsewhere herein. The routine then continues to block 583 to store and/or provide information about the determined battery behavior model(s), such as for use in further decision module construction with respect to blocks 510-560 and 588, before continuing to block 505.

After block 590, the routine continues to block 595 to determine whether to continue, such as until an explicit indication to terminate is received. If it is determined to continue, the routine returns to block 510, and otherwise continues to block 599 and ends.

Figure 6A:
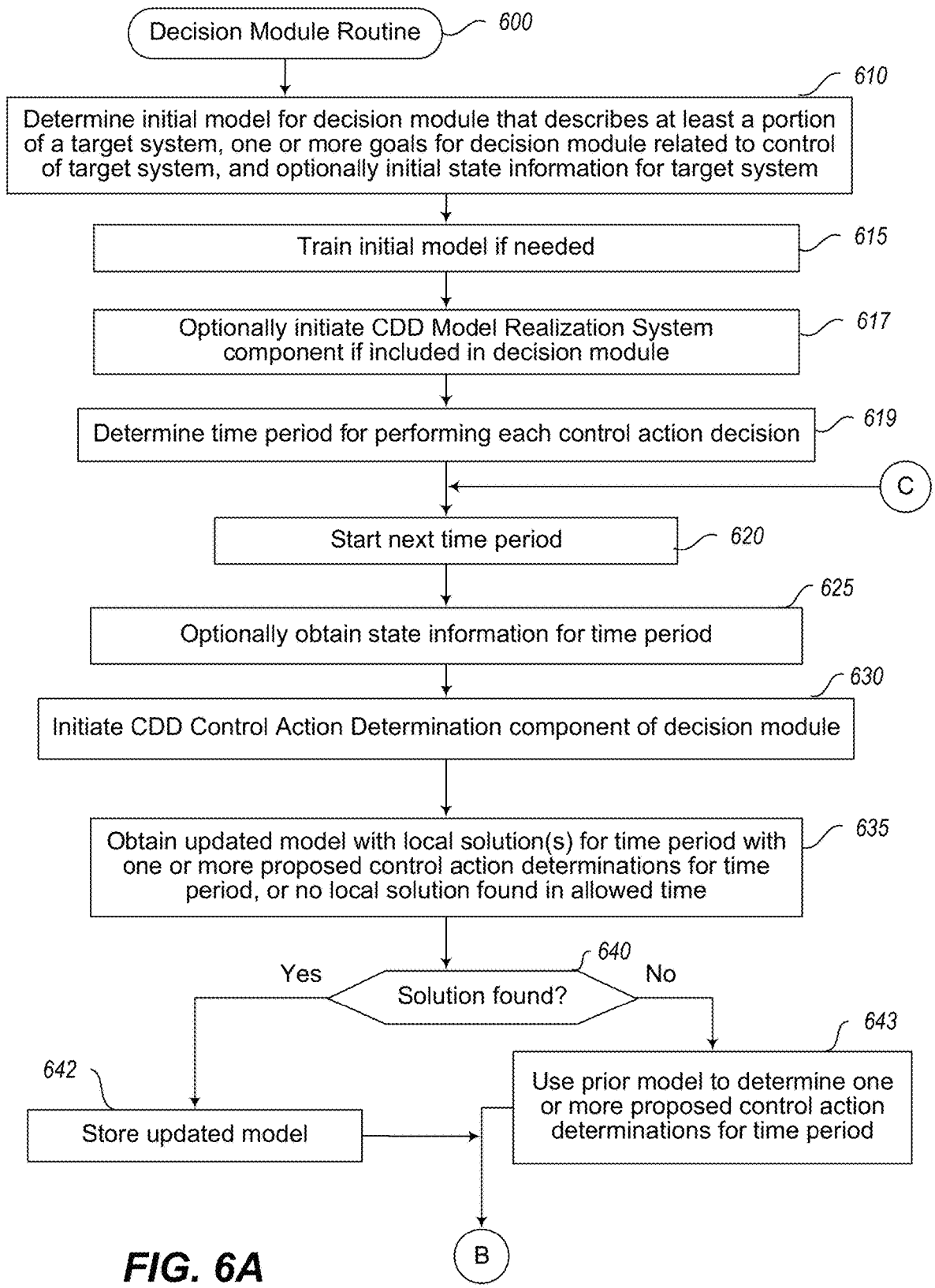
FIGS. 6A-6B illustrate a flow diagram of an example embodiment of a decision module routine.
Figure 6B:
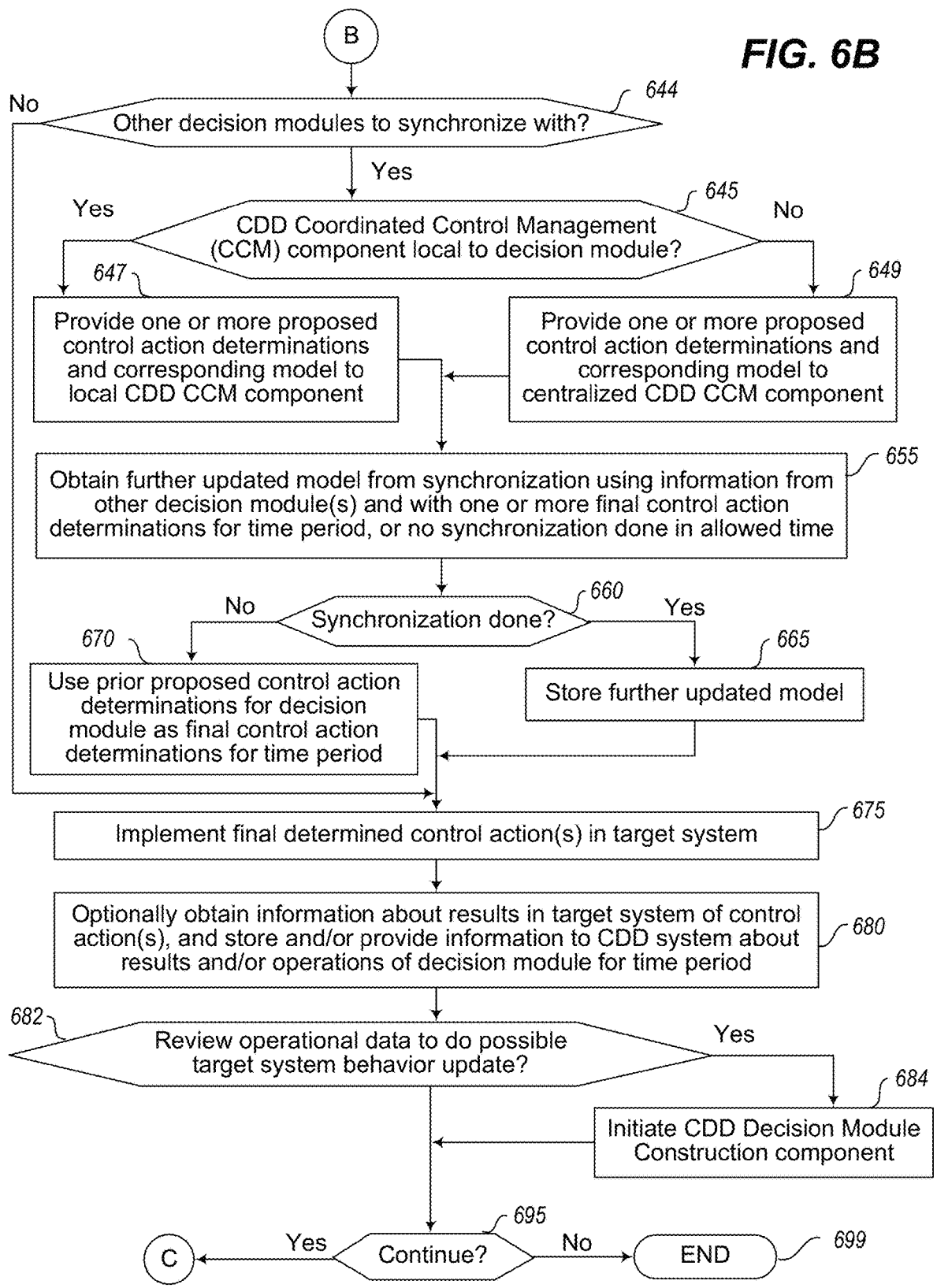

FIGS. 6A-6B illustrate a flow diagram of an example embodiment of a routine 600 corresponding to a generic representation of a decision module that is being executed. The routine may, for example, be provided by execution of a decision module 329 or as part of an automated control system 325 of FIG. 3; the automated control system 195*a* of FIG. 1A or 197*a* of FIG. 1C; the automated control system 205*a* of FIG. 2A; the automated control systems 250I1, 250J1 and 250K1 of FIGS. 2I-2K, respectively; and/or a decision module 124 or 128 of FIG. 1B, such as to provide functionality for controlling at least a portion of a target system in a manner specific to information and a state and behavioral model encoded for the decision module, including to reflect one or more goals to be achieved by the decision module during its controlling activities. As discussed in greater detail elsewhere, in some embodiments and situations, multiple decision modules may collectively and cooperatively act to control a particular target system, such as with each decision module controlling one or more distinct control elements or components for the physical target system or otherwise representing or interacting with a portion of the target system, while in other embodiments and situations a single decision module may act alone to control a physical target system/component. The routine 600 further reflects actions performed by a particular example decision module when it is deployed in controlling a portion of a target system, although execution of at least portions of a decision module may occur at other times, such as initially to train a model for the decision module before the decision module is deployed, as discussed in greater detail with respect to the CDD Decision Module Construction routine 500 of FIGS. 5A-5B. In addition, the illustrated embodiment of the routine assumes that any state and behavioral models were previously created by the CDD Decision Module Construction routine 500 of FIGS. 5A-5B before the decision module begins, although in other embodiments could instead, before performing other indicated operations, execute a model realization system of the decision module to generate and incorporate such state and behavioral models.

The illustrated embodiment of the routine 600 begins at block 610, where an initial model for the decision module is determined that describes at least a portion of a target system to be controlled, one or more goals for the decision module to attempt to achieve related to control of the target system, and optionally initial state information for the target system. The routine continues to block 615 to perform one or more actions to train the initial model if needed, as discussed in greater detail with respect to blocks 553 and 555 of FIGS. 5A-5B—in some embodiments and situations, such training for block 615 is performed only if initial training is not done by the routine 500 of FIGS. 5A-5B, while in other embodiments and situations the training of block 615 is performed to capture information about a current state of the target system at a time that the decision module begins to execute (e.g., if not immediately deployed after initial creation and training) and/or to re-train the model at times as discussed in greater detail with respect to routine 700 of FIGS. 7A-7B as initiated by block 630.

Figure 9:
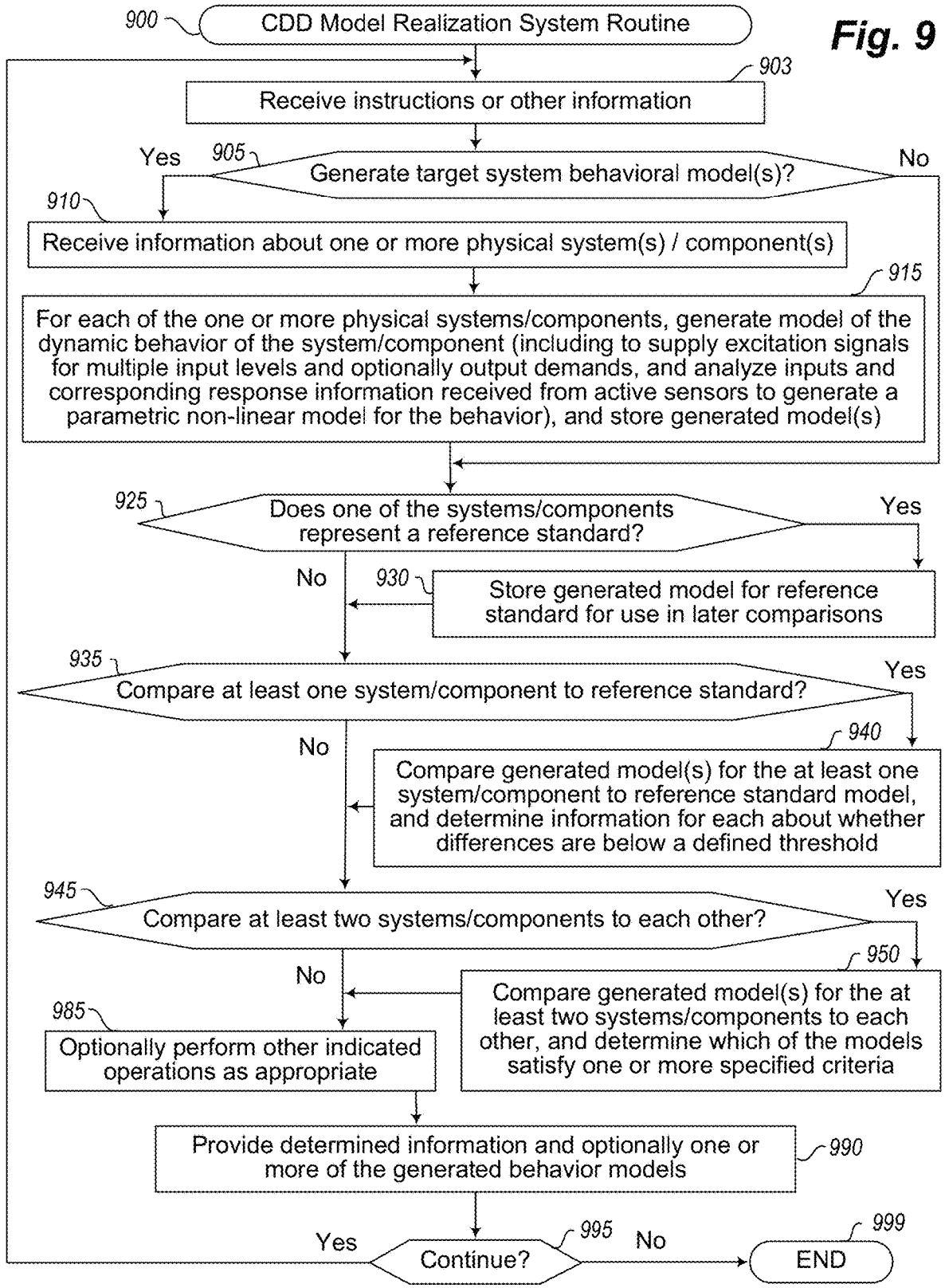
FIG. 9 illustrates a flow diagram of an example embodiment of a CDD Model Realization System routine.

After block 615, the routine continues to block 617 to optionally initiate execution of a CDD Model Realization System component if one is included with the decision module. One example of execution of such a CDD Model Realization System is illustrated in FIG. 9.

After block 617, the routine continues to block 619 to determine a time period to use for performing each control action decision for the decision module, such as to reflect a rate at which control element modifications in the target system are needed and/or to reflect a rate at which new incoming state information is received that may alter future manipulations of the control elements. The routine then continues to block 620 to start the next time period, beginning with a first time period moving forward from the startup of the execution of the decision module. Blocks 620-680 are then performed in a control loop for each such time period going forward until execution of the decision module is suspended or terminated, although in other embodiments a particular decision module may execute for only a single time period each time that it is executed.

In block 625, the routine optionally obtains state information for the time period, such as current state information that has been received from the target system (e.g., via one or more passive sensors) or one or more related external sources since the last time period began, and/or by actively retrieving current values of one or more elements of the target system or corresponding variables as needed. In block 630, the routine then initiates execution of a local CCD Control Action Determination component of the decision module, with one example of such a routine discussed in greater detail with respect to routine 700 of FIGS. 7A-7B. In block 635, the results of the execution of the component in block 630 are received, including to either obtain an updated model for the decision module with a local solution for the current time period and decision module that includes one or more proposed control action determinations that the decision module may perform for the current time period, or to receive an indication that no local solution was found for the decision module in the allowed time for the execution of the component in block 630. It is then determined in block 640 whether a solution was found, and if so continues to block 642 to store the updated model for the decision module, and otherwise continues to block 643 to use the prior model for the decision module to determine one or more control action determinations that are proposed for the current time period based on a previous model (e.g., that does not reflect recent changes in state information and/or recent changes in activities of other decision modules, if any), as discussed in greater detail with respect to routine 700 of FIGS. 7A-7B.

After blocks 642 or 643, the routine continues to block 644 to determine if other decision modules are collectively controlling portions of the current target system, such as part of the same automated control system as the local decision module, and if so continues to block 645. Otherwise, the routine selects the local proposed control actions of the decision module as a final determined control action to perform, and continues to block 675 to implement those control actions for the current time period.

If there are other operating decision modules, the routine in block 645 determines if the local decision module includes a local copy of a CDD Coordinated Control Management (CCM) component for use in synchronizing the proposed control action determinations for the decision module's local solutions with activities of other decision modules that are collectively controlling the same target system. If so, the routine continues to block 647 to provide the one or more proposed control action determinations of the decision module and the corresponding current local model for the decision module to the local CDD CCM component, and otherwise continues to block 649 to provide the one or more proposed control action determinations for the decision module and the corresponding local model of the decision module to one or more centralized CDD CCM components.

After blocks 647 or 649, the routine continues to block 655 to obtain results of the actions of the CDD CCM component(s) in blocks 647 or 649, including to either obtain a further updated model resulting from synchronization of the local model for the current decision module with information from one or more other decision modules, such that the further updated model indicates one or more final control action determinations to perform for the time period for the current decision module, or an indication that no such synchronization was completed in the allowed time. The routine continues to block 660 to determine whether the synchronization was completed, and if so continues to block 665 to store the further updated model from the synchronization, and otherwise continues to block 670 to use the prior proposed control action determinations locally to the decision module as the final control action determinations for the time period.

After blocks 665 or 670, the routine continues to block 675 to implement the one or more final determined control actions for the decision module in the target system, such as by interacting with one or more effectuators in the target system that modify values or otherwise manipulate one or more control elements of the target system, or by otherwise providing input to the target system to cause such modifications or other manipulations to occur. In block 680, the routine optionally obtains information about the results in the target system of the control actions performed, and stores and/or provides information to the CDD system about such obtained results and/or about the activities of the decision module for the current time period. After block 680, the routine continues to block 682 to determine whether to do a possible update of a state and behavioral model by the model realization system, such as periodically or as otherwise determined. If so, the routine continues to block 684 to initiate operations of the CDD Decision Module Construction component with respect to the model realization system component in blocks 565-583, such as to return with an updated version of the model and/or a corresponding decision module.

After block 684, or if it was determined in block 682 to not do a possible structural model adaptation update based on learned soft rules, the routine continues to block 695 to determine whether to continue, such as until an indication to terminate or suspend is received (e.g., to reflect an end to current operation of the target system or an end of use of the decision module to control at least a portion of the target system). If it is determined to continue, the routine returns to block 620 to start the next time period, and otherwise continues to block 699 and ends.

Figure 7A:
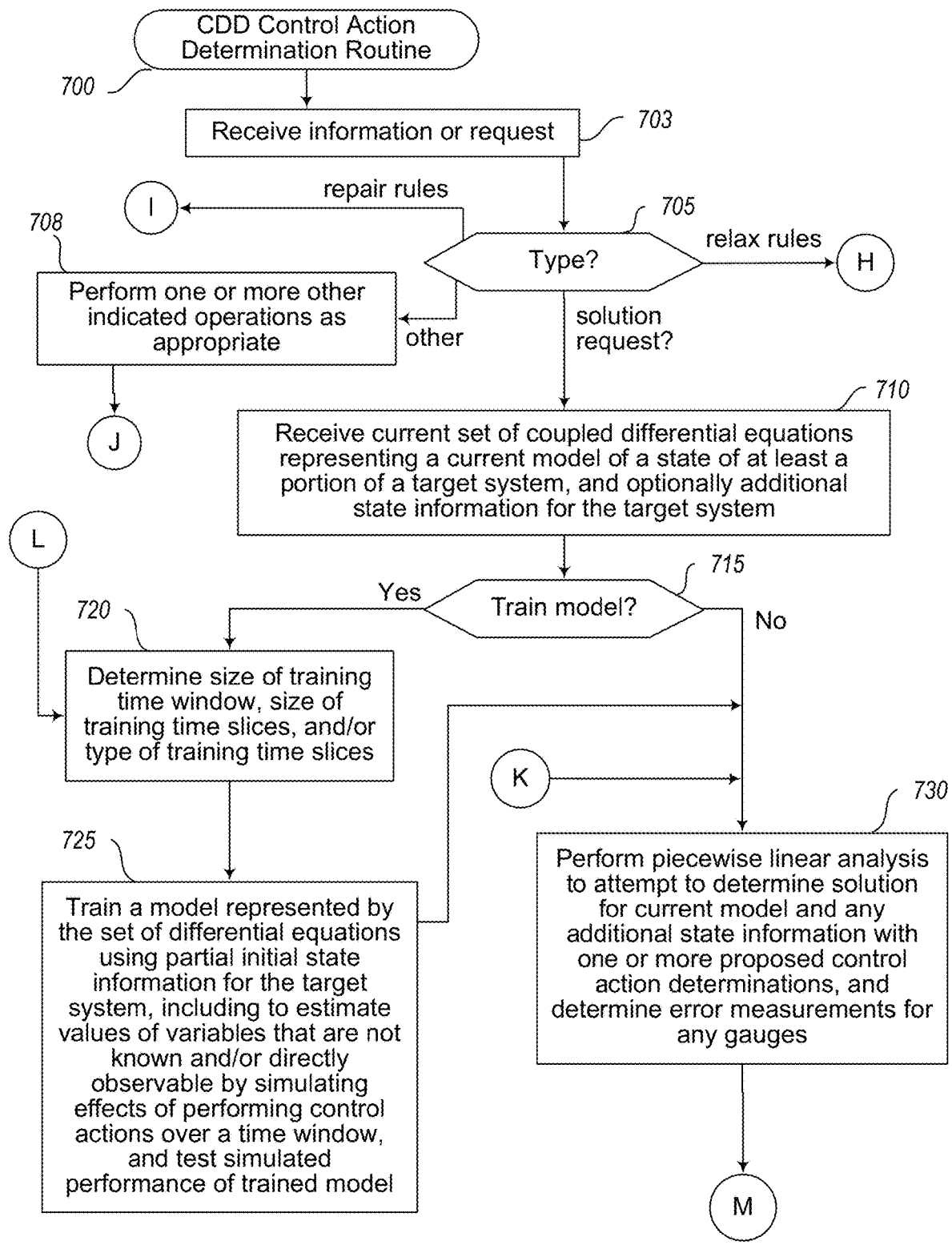
FIGS. 7A-7B illustrate a flow diagram of an example embodiment of a CDD Control Action Determination routine.
Figure 7B:
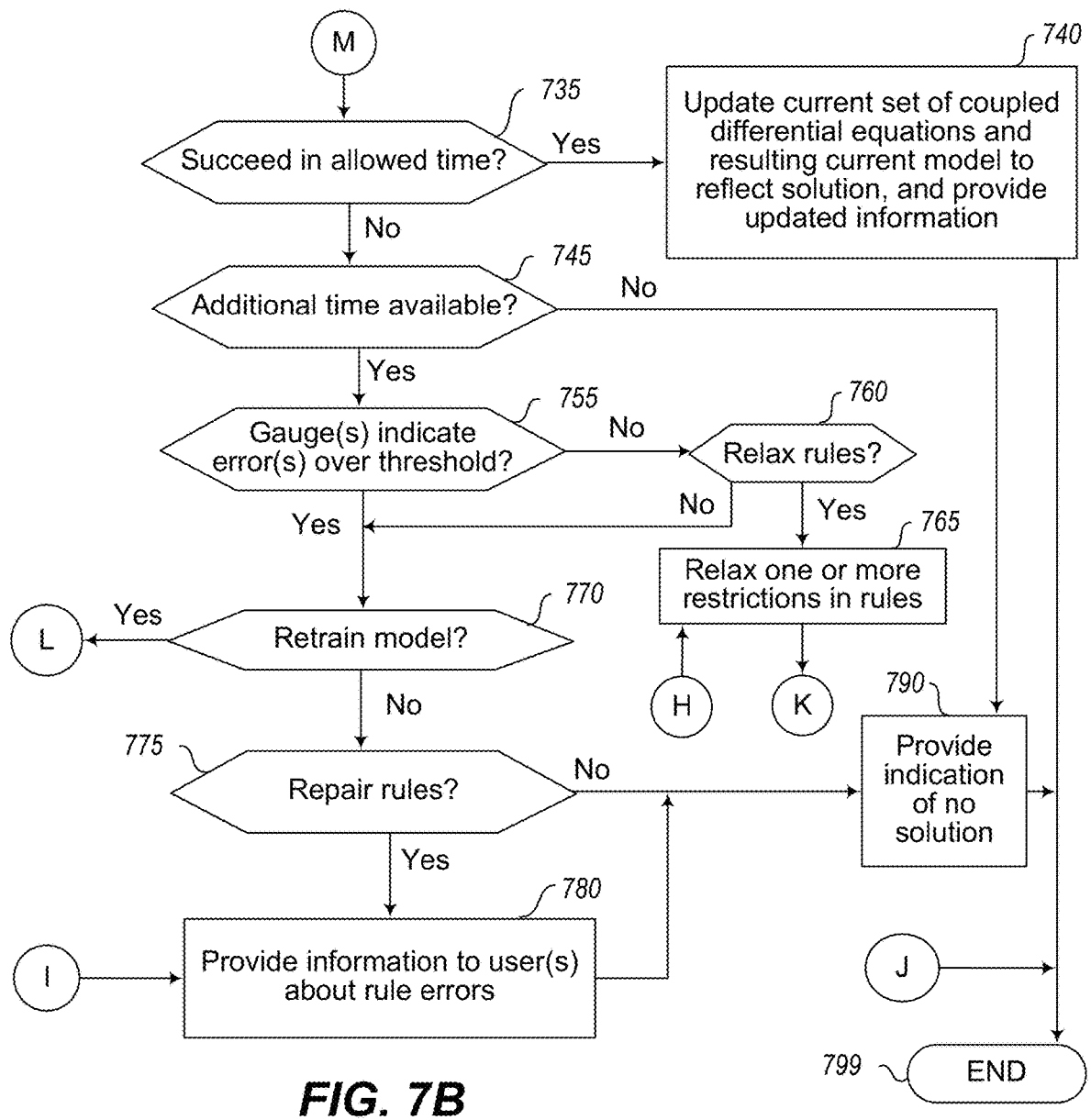

FIGS. 7A-7B are a flow diagram of an example embodiment of a CDD Control Action Determination routine 700. The routine may, for example, be provided by execution of the component 344 of FIG. 3 and/or components 144*a-n* or 184 of FIG. 1C, such as to determine control actions for a decision module to propose and/or implement for a target system during a particular time period, including in some embodiments to perform an optimization to determine near-optimal actions (e.g., within a threshold of an optimal solution) to perform with respect to one or more goals if possible. While the illustrated embodiment of the routine is performed in a manner local to a particular decision module, such that some or all decision modules may each implement a local version of such a routine, in other embodiments the routine may be implemented in a centralized manner by one or more components with which one or more decision modules interact over one or more networks, such as with a particular decision module indicated to be used at a particular time rather than acting on behalf of the local decision module.

The illustrated embodiment of the routine 700 begins at block 703, where information or a request is received. The routine continues to block 705 to determine a type of the information or request, and to proceed accordingly. In particular, if a request is received in block 703 to attempt to determine a solution for a current time period given a current model of the local decision module, the routine continues to block 710 to begin to perform such activities, as discussed in greater detail with respect to block 710-790. If it is instead determined in block 705 that a request to relax one or more rules or other restrictions for the current model of the local decision module is received, such as discussed in greater detail with respect to blocks 760 and 765, the routine continues to block 765. If it is determined in block 705 that a request is received to repair one or more rules or other restrictions for the current model of the local decision module, such as discussed in greater detail with respect to blocks 775 and 780, the routine continues to block 780 to obtain user input to use during the rule repair process (e.g., to interact with a CDD Decision Module Construction component, or to instead interact with one or more users in another manner), such as to allow the current model for the local decision module to later be updated and replaced based on further resulting user actions, or if operation of the target system can be suspended, to optionally wait to further perform the routine 700 until such an updated model is received. If it is instead determined in block 705 that the information or request is of another type, the routine continues instead to block 708 to perform one or more other indicated operations as appropriate, and to then proceed to block 799. Such other indicated operations may include, for example, receiving information about current models and/or control actions proposed or performed by one or more other decision modules that are collectively controlling a target system with the local decision module (such as for use in synchronizing the model of the local decision module with such other decision modules by generating a consensus or converged shared model, as discussed in greater detail with respect to routine 800 of FIGS. 8A-8B), to receive updates to a model or underlying information for the model for use in ongoing operation of the routine 700 (e.g., from a CDD Decision Module Construction component, such as results from interactions performed in block 780; from a CDD Model realization system component, such as discussed in FIG. 9; etc.), to receive current state information for the target system, such as for use as discussed in routine 600 of FIGS. 6A-6B, etc.

If it determined in block 705 that a request for a solution was received in block 703 for a current time period and based on a current model of the local decision module, the routine continues to block 710 to receive a current set of coupled differential equations that represent the current model for the local decision module of at least a portion of the target system, optionally along with additional state information for the target system for the current time. The routine then continues to block 715 to determine whether to train or re-train the model, such as if the routine is called for a first time upon initial execution of a corresponding decision module or if error measurements from ongoing operations indicate a need for re-training, as discussed in greater detail with respect to blocks 755, 770 and 730. If it is determined to train or re-train the model, the routine continues to block 720 to determine one or more of the size of a training time window, size of training time slices within the time window, and/or type of training time slices within the training time window, such as in a manner similar to that previously discussed with respect to block 553 of routine 500 of FIGS. 5A-5B. After block 720, the routine continues to block 725 to use partial initial state information for the target system to train the model, including to estimate values of state variables for the target system that are not known and/or directly observable, by simulating effects of performing control actions over the time window for each of the time slices, as discussed in greater detail with respect to block 555 of routine 500 of FIGS. 5A-5B.

After block 725, or if it is instead determined in block 715 not to train or re-train the model, the routine continues to block 730 to perform a piecewise linear analysis to attempt to determine a solution for the current model and any additional state information that was obtained in block 710, with the solution (if determined) including one or more proposed control action determinations for the local decision module to take for a current time period, as well as in some embodiments to use one or more model error gauges to make one or more error measurements with respect to the current model, as discussed in greater detail elsewhere. The routine then continues to block 735 to determine if the operations in block 730 determined a solution within an amount of time allowed for the operation of block 730 (e.g., a defined subset or fraction of the current time period), and if so continues to block 740 to update the current set of coupled differential equations and the resulting current model for the local decision module to reflect the solution, with the resulting updated information provided as an output of the routine 700.

If it is instead determined in block 735 that the operations in block 730 did not determine a solution, the routine continues to block 745 to determine if additional time is available within the current time period for further attempts to determine a solution, and if not continues to block 790 to provide output of the routine 700 indicating that no solution was determined for the current time period.

If additional time is available within the current time period, however, the routine continues to perform blocks 755-780 to perform one or more further attempts to identify the solution—it will be appreciated that one or more of the operations of blocks 755-780 may be repeatedly performed multiple times for a given time period if sufficient time is available to continue further solution determination attempts. In particular, the routine continues to block 755 if additional time is determined to be available in block 745, where it determines whether the measurements from one or more gauges indicate model error measurements that are over one or more thresholds indicating modifications to the model are needed, such as based on the model error measurements from the gauges discussed with respect to block 730. If not, the routine continues to block 760 to determine whether there are one or more rules or other restrictions in the current model that are available to be relaxed for the current time period (that have not previously attempted to be relaxed during the time period, if this is not the first pass through this portion of the routing for the current time period), and if so continues to block 765 to relax one or more such rules or other restrictions and to return to block 730 to re-attempt the piecewise linear analysis with the revised model based on those relaxed rules or other restrictions.

If it is instead determined in block 755 that the model error measurements from one or more of the gauges are sufficient to satisfy one or more corresponding thresholds, the routine continues instead to block 770 to determine whether to re-train the model based on one or more of the gauges indicating sufficient errors to do so, such as based on accumulated errors over one or more time periods of updates to the model. If so, the routine returns to block 720 to perform such re-training in blocks 720 and 725, and then continues to block 730 to re-attempt the piecewise linear analysis with the resulting re-trained model.

If it is instead determined in block 770 not to re-train the model (or if the model was re-trained already for the current time period and the resulting re-attempt in block 730 again failed to find a solution), the routine continues to block 775 to determine whether the model error measurements from one or more of the gauges indicate a subset of one or more rules or other restrictions in the model that potentially have errors that need to be repaired. If so, the routine continues to block 780 to provide information to one or more users via the CDD Decision Module Construction component, to allow the users to revise the rules or other restrictions as appropriate, although in other embodiments some or all such rule repair activities may instead be attempted or performed in an automated manner. After block 780, or if it is instead determined in block 775 not to repair any rules, the routine continues to block 790 to provide an indication that no solution was determined for the current time period. After blocks 740, 708, or 790, the routine continues to block 799 and ends. It will be appreciated that if the routine 700 was instead implemented as a centralized routine that supports one or more decision modules remote from the executing component for the routine, the routine 700 may instead return to block 703 to await further information or requests.

Figure 8A:
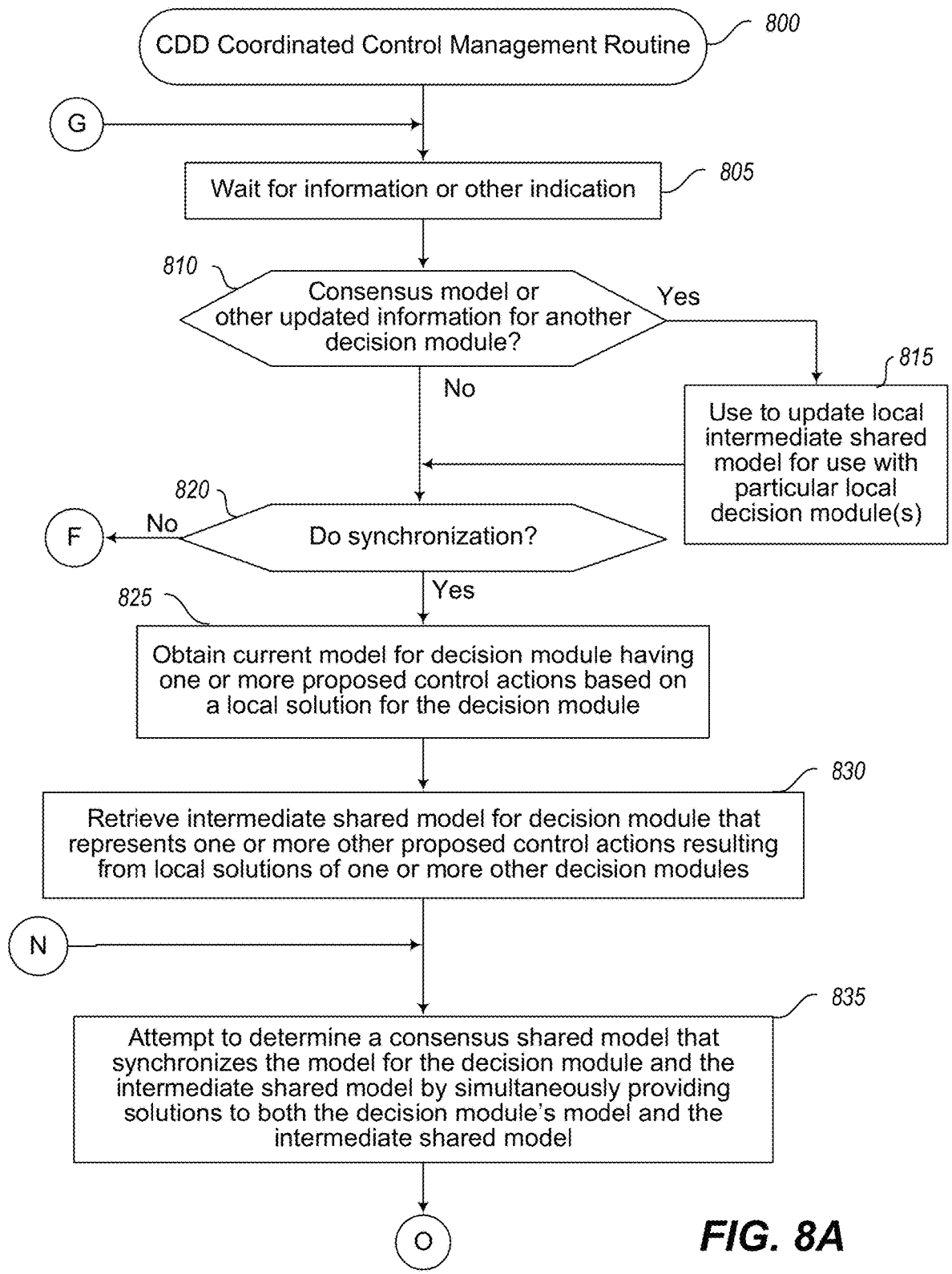
FIGS. 8A-8B illustrate a flow diagram of an example embodiment of a CDD Coordinated Control Management routine.
Figure 8B:
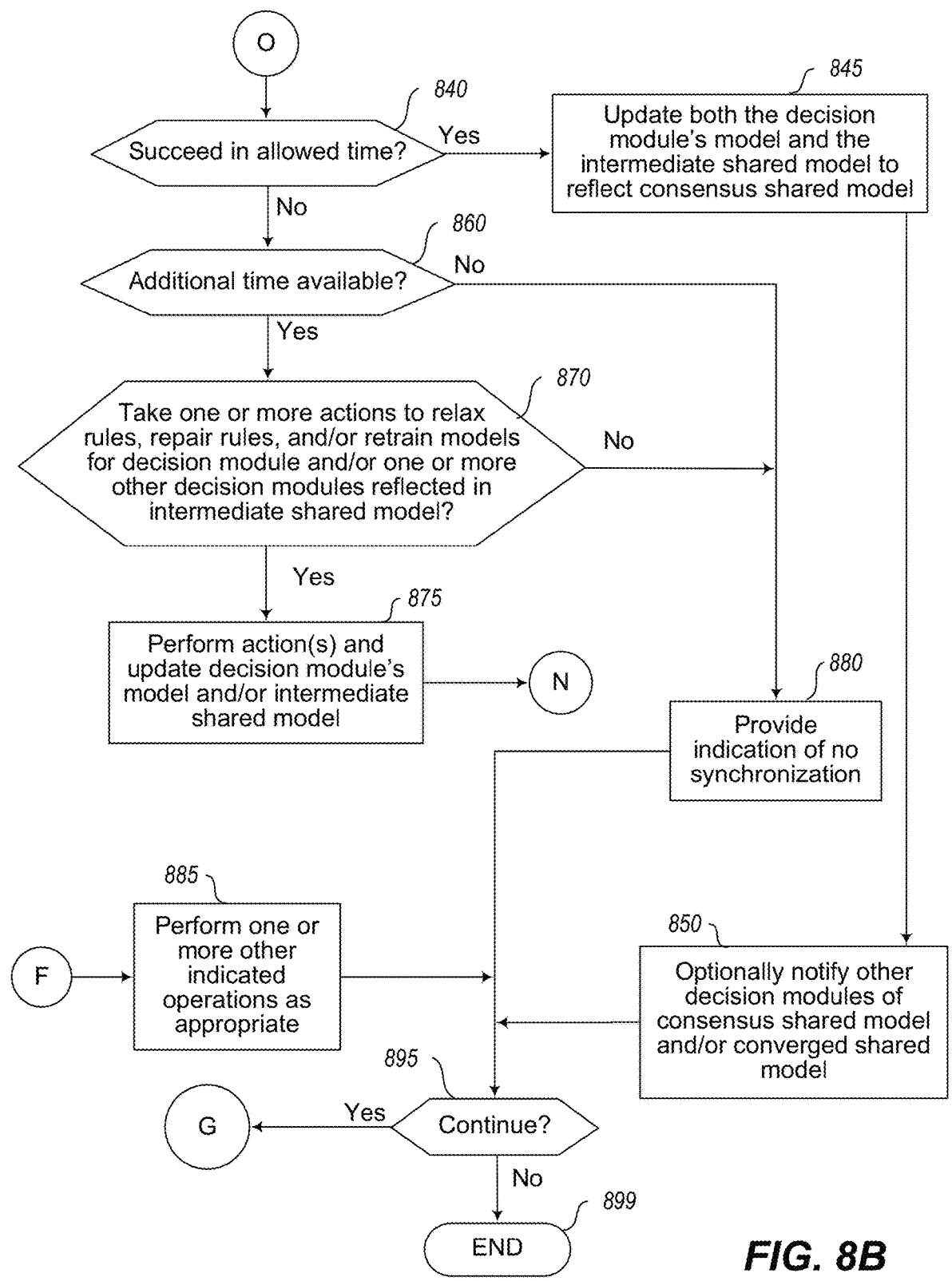

FIGS. 8A-8B are a flow diagram of an example embodiment of a CDD Coordinated Control Management routine 800. The routine may, for example, be provided by execution of the component 346 of FIG. 3 and/or the components 146a-n of FIG. 1C, such as to attempt to synchronize current models and their proposed control actions between multiple decision modules that are collectively controlling a target system. In the illustrated embodiment of the routine, the synchronization is performed in a pairwise manner between a particular local decision module's local current model and an intermediate shared model for that decision module that is based on information about the current state of one or more other decision modules, by using a Pareto game technique to determine a Pareto equilibrium if possible that is represented in a consensus shared model, although in other embodiments other types of synchronization methods may be used. In addition, in the illustrated embodiment, the routine 800 is performed in a local manner for a particular local decision module, such as by being included within that local decision module, although in other embodiments the routine 800 may be implemented in a centralized manner to support one or more decision modules that are remote from a computing system implementing the component for the routine and that communicate with those decision modules over one or more computer networks, such as with a particular decision module indicated to be used at a particular time rather than acting on behalf of the local decision module.

The illustrated embodiment of the routine 800 begins at block 805, where it waits to receive information or another indication. The routine continues to block 810 to determine if a consensus model or other updated information for another decision module has been received, such as from a copy of the routine 800 executing for that other decision module, and if so continues to block 815 to use the received information to update local intermediate shared model information for use with the local decision module on whose behalf the current copy of the routine 800 is executing, as discussed in greater detail with respect to block 830. If it is instead determined in block 810 that the information or request received in block 805 is not information related to one or more other decision modules, or after block 815, the routine continues to block 820 to determine whether to currently perform a synchronization for the current local model of the local decision module by using information about an intermediate shared model of the local decision module that includes information for one or more other decision modules, such as to do such synchronization each time that an update to the local decision module's model is received (e.g., based on operation of the routine 700 for a copy of the CDD Control Action Determination component local to that decision module) in block 805 and/or each time that information to update the local decision module's intermediate shared model is received in block 805 and used in block 815, or instead as explicitly indicated in block 805—if the synchronization is to currently be performed, the routine continues to block 825 and begins to perform blocks 820-880 related to such synchronization activities. Otherwise, the routine continues to block 885 to perform one or more other indicated operations as appropriate, such as to receive requests from the CDD system or other requestor for current information about operation of the routine 800 and/or to provide corresponding information to one or more entities (e.g., to reflect prior requests), etc.

If it is determined in block 820 that synchronization is to be currently performed, such as based on updated model-related information that is received in block 805, the routine continues to block 825 to obtain a current local model for the local decision module to use in the synchronizing, with the model including one or more proposed control actions to perform for a current time period based on a local solution for the local decision module. The routine then continues to block 830 to retrieve information for an intermediate shared model of the local decision module that represents information for one or more other decision modules (e.g., all other decision modules) that are collectively participating in controlling the target system, with that intermediate shared model similarly representing one or more other proposed control actions resulting from local solutions of those one or more other decision modules, optionally after partial or complete synchronization has been performed for those one or more other decision modules between themselves.

The routine then continues to block 835 to attempt to determine a consensus shared model that synchronizes the current model of the local decision module and the intermediate shared model by simultaneously providing solutions to both the local decision module's current model and the intermediate shared model. In some embodiments, the operations of block 835 are performed in a manner similar to that discussed with respect to blocks 710-730 of routine 700 of FIG. 7A-7B, such as if the local model and the intermediate shared model are combined to create a combination model for whom one or more solutions are to be identified. As discussed in greater detail elsewhere, in some embodiments, the local current model and intermediate shared model may each be represented by a Hamiltonian function to enable a straightforward creation of such a combined model in an additive manner for the respective Hamiltonian functions, with the operations of routines 600 and/or 700 of FIGS. 6A-6B and 7A-7B, respectively, similarly representing the models that they update and otherwise manipulate using such Hamiltonian functions.

After block 835, the routine continues to block 840 to determine whether the operations of block 835 succeeded in an allowed amount of time, such as a fraction or other portion of the current time period for which the synchronization is attempted to be performed, and if so the routine continues to block 845 to update both the local model and the intermediate shared model of the local decision module to reflect the consensus shared model. As earlier noted, if sufficient time is allowed for each decision module to repeatedly determine a consensus shared model with changing intermediate shared models representing one or more other decision modules of a collective group, the decision modules of the collective group may eventually converge on a single converged shared model, although in other embodiments and situations there may not be sufficient time for such convergence to occur, or other issues may prevent such convergence. After block 845, the routine continues to block 850 to optionally notify other decision modules of the consensus shared model determined for the local decision module (and/or of a converged shared model, if the operations of 835 were a last step in creating such a converged shared model), such as if each of the notified decision modules is implementing its own local version of the routine 800 and the provided information will be used as part of an intermediate shared model of those other decision modules that includes information from the current local decision module's newly constructed consensus shared model.

If it is instead determined in block 840 that a synchronization did not occur in the allowed time, the routine continues to perform blocks 860-875 to re-attempt the synchronization with one or more modifications, sometimes repeatedly if sufficient time is available, and in a manner similar to that discussed with respect to blocks 745-780 of routine 700 of FIGS. 7A-7B. In the illustrated example, the routine determines in block 860 if additional time is available for one or more such re-attempts at synchronization, and if not the routine continues to block 880 to provide an indication that no synchronization was performed within the allowed time. Otherwise, the routine continues to block 870 to take one or more actions to perform one or more of relaxing rules or other restrictions, repairing rules or other restrictions, and/or re-training a model, with respect to one or both of the current model of the local decision module and/or one or more other decision modules whose information is represented in the intermediate shared model of the local decision module. If it is determined in block 870 to proceed in this manner, the routine continues to block 875 to perform corresponding actions, sometimes one at a time in a manner similar to that discussed with respect to routine 700, including to cause resulting updates to the current model of the local decision module and/or to the local intermediate shared model of the local decision module, after which the routine returns to block 835 to re-attempt to synchronize the local model and the intermediate shared model of the local decision module.

If it is instead determined in block 870 that no further actions are to be performed with respect to relaxation, repair and/or re-training, the routine continues instead to block 880. After blocks 850, 880 or 885, the routine continues to block 895 to determine whether to continue, such as until an explicit indication to terminate or suspend operation of the routine 800 is received, such as to reflect an end to operation of the target system and/or an end to use of the local decision module and/or a collective group of multiple decision modules to control the target system. If it is determined to continue, the routine returns to block 805, and otherwise continues to block 899 and ends.

FIG. 9 is a flow diagram of an example embodiment of a CDD Model Realization System routine 900. The routine may, for example, be provided by execution of the component 195c of FIG. 1A and/or the component 197c of FIG. 1C, the example model realization system embodiment(s) discussed with respect to FIGS. 2A-2K, component 345 of FIG. 3 and/or as otherwise discussed herein. In the illustrated embodiment of the routine, the routine 900 may be performed as a stand-alone and/or centralized system that supports multiple decision modules (e.g., to generate state and behavioral models for one or more physical systems/components before or during construction of the decision modules for their later use), such as for decision modules implemented on systems that are remote from a computing system implementing the component for the routine and that communicate with the computing system over one or more computer networks, although in other embodiments the routine may instead be performed in a local manner for a particular local decision module, such as by being included within that local decision module.

The illustrated embodiment of the routine 900 begins at block 903, where it receives instructions or other information. In block 905, the routine then determines whether instructions received in block 903 are to generate one or more state and behavioral models for one or more indicated physical target systems/components, and if so continues to block 910, where it receives information about one or more physical systems/components. In block 915, the routine then determines and generates a state and behavioral model for each of the one or more indicated physical systems/components, as discussed in greater detail elsewhere herein, and stores those generated models for subsequent use.

After block 915, or if it is instead determined in block 905 that the instructions received in block 903 are not to generate one or more state and behavioral models for indicated physical systems/components, the routine continues to block 925 to determine if the instructions received in block 903 indicate to use a physical systems/components as a reference standard (e.g., for a type of physical system/component, for a particular physical target system/component, etc.) against which to compare other physical systems/components, and if so continues to block 930 to store a model for that physical system/component to be a reference standard model (e.g., for one of the state and behavioral models just generated in block 915, for a previously generated and stored state and behavioral model, for a state and behavioral model received in block 903, etc.).

After block 930, or if it is instead determined in block 925 that the instructions received in block 903 are not to use a physical system/component as a reference standard, the routine continues to block 935 to determine if the instructions received in block 903 indicate to compare at least one physical system/component to a reference standard physical system/component (e.g., with models for the at least one physical system/component and/or the reference standard physical system/component just generated in block 915), and if so continues to block 940. In block 940, the state and behavioral model for each of the indicated physical systems/components is compared to the reference standard model, and a determination is made of whether differences between the two models are sufficiently small (e.g., below a defined threshold), such as to indicate that the physical system/component whose model is being compared to the reference standard is of sufficiently high quality (or otherwise sufficiently similar to the reference standard physical system/component) for subsequent use in a target system.

After block 940, or if it is instead determined in block 935 that the instructions received in block 903 are not to compare at least one physical system/component to a reference standard physical system/component, the routine continues to block 945 to determine if the instructions received in block 903 indicate to compare two or more physical systems/components to each other (e.g., with state and behavioral models for some or all of the two or more physical systems/components just generated in block 915), and if so continues to block 950. In block 950, the model for each of the indicated physical systems/components is compared to each other (e.g., with respect to one or more performance metrics for the physical systems/components, to one or more error measures associated with the model generation for the physical systems/components; etc.), and a determination is made of zero or more of the models that satisfy one or more indicated criteria (e.g., the top 1 or N physical systems/components from the comparison, the top X % of physical systems/components from the comparison, all physical systems/components that satisfy a specified performance metric, etc.), such as to indicate that the corresponding physical systems/components (if any) for the determined one or more state and behavioral models are of sufficiently high quality (or otherwise sufficiently satisfy the indicated criteria) for subsequent use in a target system.

After block 950, or if it is instead determined in block 945 that the instructions received in block 903 are not to compare two or more physical systems/components to each other, the routine continues to block 985 to optionally perform one or more indicated operations if appropriate. Non-exclusive examples of such other operations may include, for example, retrieving a previously generated model for a particular physical system/component or type of physical system/component (e.g., a reference standard model for the physical system/component type) for use in a decision module being constructed or for another purpose, receiving information at other times than initial model generation (e.g., to update an existing state and behavioral model, such as based on additional information obtained during use of the physical target system/component) and storing and/or using that received information (e.g., to perform a corresponding model update), etc. After bock 985, the routine continues to block 990 to provide requested information and/or information determined during the routine execution (e.g., in one or more of blocks 940 and 950) to a requester (e.g., another routine from which the routine 900 was invoked, such as with respect to block 525 of routine 500), and then continues to block 995.

In block 995 the routine determines whether to continue, such as until an explicit indication to terminate is received. If it is determined to continue, the routine returns to block 910, such as to perform further updates to the total system model, and otherwise continues to block 999 and ends.

Figure 10:
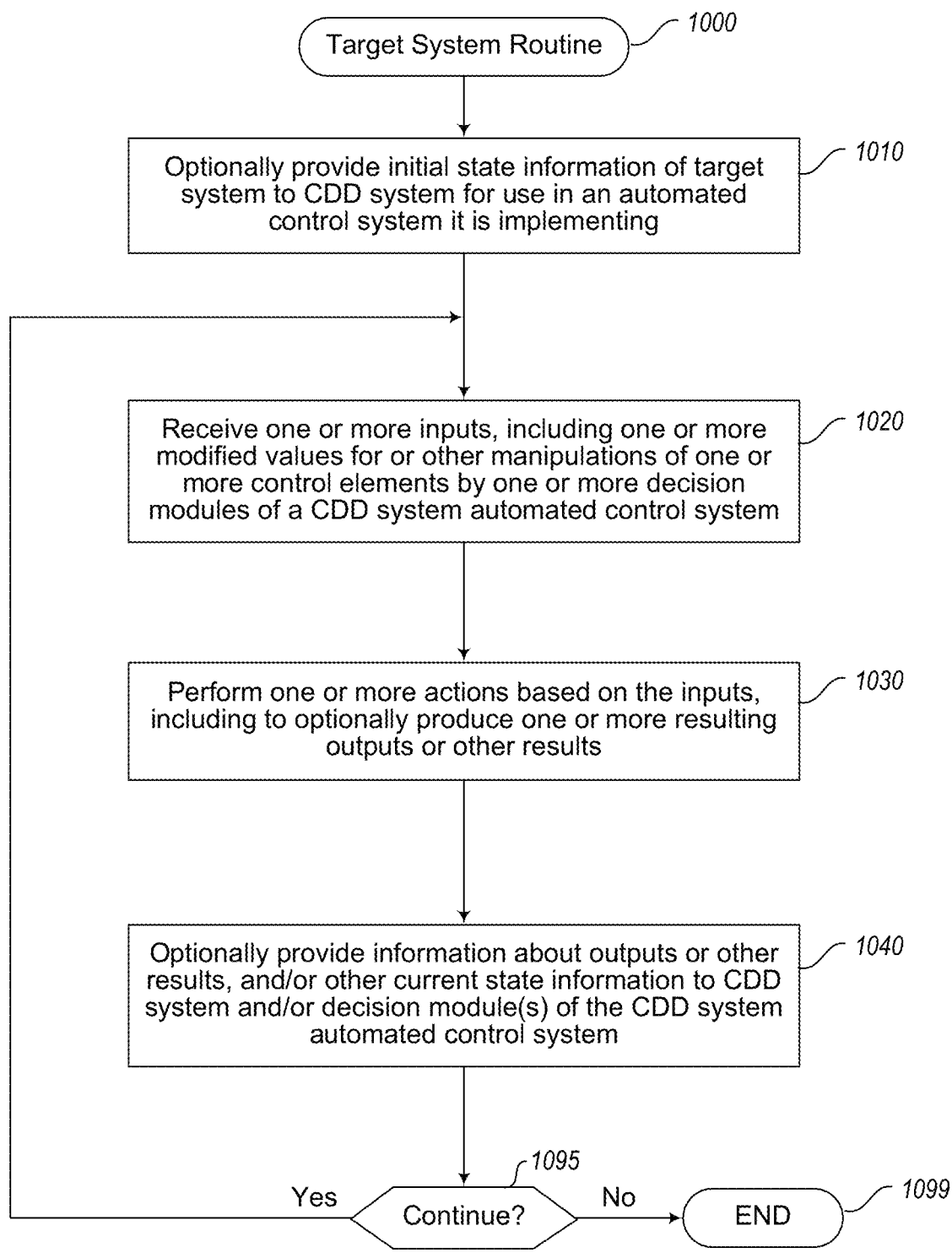
FIG. 10 illustrates a flow diagram of an example embodiment of a routine for a target system being controlled.

FIG. 10 illustrates a flow diagram of an example embodiment of a routine 1000 performed for a representative generic target system, with respect to interactions between the target system and one or more decision modules that are controlling at least a portion of the target system. The routine may, for example, be provided by execution of a target system 360 and/or 370 of FIG. 3, a battery or other electrical device 195*b* of FIG. 1A, an electrical device or other physical system/component 197*b* of FIG. 1C, a battery 205*b* discussed with respect to FIGS. 2A-2H, a physical system/component 272 (e.g., systems/components 272*i*, 272*j* and 272*k*) discussed with respect to FIGS. 2I-2K, and/or a target system 160 and/or 170 of FIG. 1B, such as to implement operations specific to the target system. It will be appreciated that the illustrated embodiment of the routine focuses on interactions of the target system with the one or more decision modules, and that many or all such target systems will perform many other operations in a manner specific to those target systems that are not illustrated here for the purpose of brevity.

The routine begins at block 1010, where it optionally provides initial state information for the target system to a CDD system for use in an automated control system of the CDD system for the target system, such as in response to a request from the CDD system or its automated control system for the target system, or instead based on configuration specific to the target system (e.g., to be performed upon startup of the target system). After block 1010, the routine continues to block 1020 to receive one or more inputs from a collective group of one or more decision modules that implement the automated control system for the target system, including one or more modified values for or other manipulations of one or more control elements of a plurality of elements of the target system that are performed by one or more such decision modules of the automated control system. As discussed in greater detail elsewhere, the blocks 1020, 1030, 1040 may be repeatedly performed for each of multiple time periods, which may vary greatly in time depending on the target system (e.g., a microsecond, a millisecond, a hundredth of a second, a tenth of a second, a second, 2 seconds, 5 seconds, 10 seconds, 15 seconds, 30 seconds, a minute, 5 minutes, 10 minutes, 15 minutes, 30 minutes, an hour, etc.).

After block 1020, the routine continues to block 1030 to perform one or more actions in the target system based on the inputs received, including to optionally produce one or more resulting outputs or other results within the target system based on the manipulations of the control elements. In block 1040, the routine then optionally provides information about the outputs or other results within the target system and/or provides other current state information for the target system to the automated control system of the CDD system and/or to particular decision modules of the automated control system, such as to be obtained and measured or otherwise analyzed via passive sensors and/or active sensors. The routine then continues to block 1095 to determine whether to continue, such as until an explicit indication to terminate or suspend operation of the target system is received. If it is determined to continue, the routine returns to block 1020 to begin a next set of control actions for a next time period, and otherwise continues to block 1099 and ends. As discussed in greater detail elsewhere, state information that is provided to a particular decision module may include requests from external systems to the target system, which the automated control system and its decision modules may determine how to respond to in one or more manners.

It will also be appreciated that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel, synchronously or asynchronously, etc.) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A computer-implemented method comprising:
generating, by one or more first computing systems, a behavioral model for a fuel cell that represents behavior of the fuel cell at multiple charge levels and with multiple resistive loads, by:
supplying a plurality of electrical signals into the fuel cell by, for each of a plurality of combinations each including one of the multiple charge levels and one of the multiple resistive loads, supplying one or more of the electrical signals into the fuel cell while the fuel cell has the one charge level for that combination and the one resistive load for that combination;
measuring changes in responses of the fuel cell to, for each of the plurality of combinations, the supplied one or more electrical signals for that combination; and
combining the measured changes in the responses to produce the generated behavioral model for the fuel cell; and
controlling, by one or more second computing systems and after the generating of the behavioral model, further operations of the fuel cell by using the generated behavioral model and state information for the fuel cell to determine one or more control actions to perform, and performing the one or more control actions to modify the further operations of the fuel cell.

2. The computer-implemented method of claim 1 wherein the generated behavioral model includes at least one incremental parametric non-linear behavioral model for the fuel cell, and wherein the supplying of the plurality of electrical signals into the fuel cell further includes, for each of the plurality of combinations of one of the multiple charge levels and one of the multiple resistive loads:
applying, while a charge level of the fuel cell corresponds to the one charge level for that combination, the one resistive load for that combination to the fuel cell; and
supplying each of multiple multi-frequency microvolt pulses into at least one of an anode of the fuel cell or a cathode of the fuel cell.

3. The computer-implemented method of claim 2 wherein the one or more second computing systems include at least one of the one or more first computing systems, wherein the fuel cell is one of multiple fuel cells of a fuel cell system, wherein the generating of the behavioral model includes generating one or more behavioral models for the multiple fuel cells, and wherein the controlling of the further operations further includes controlling the fuel cell system, by the one or more second computing systems and for each of multiple time periods after the generating of the one or more behavioral models, including:
obtaining, for at least one of that time period or a prior time period, further state information for at least one of the multiple fuel cells from one or more sensors measuring one or more characteristics of the at least one fuel cell;
using the obtained further state information and the generated behavioral model to determine at least one control action to perform for that time period; and
initiating performance of the determined at least one control action for that time period to affect the further operations of the fuel cell system.

4. The computer-implemented method of claim 1 wherein the fuel cell is part of a physical system further having one or more outputs and having one or more controls that are manipulatable to modify at least one output and having sensors to measure the state information for the fuel cell, wherein the controlling of the further operations of the fuel cell further includes using a model with binary rules that use operating principles of the fuel cell and that evaluate state information for the fuel cell to reach true or false values for control actions to perform to manipulate the one or more controls, and wherein the model includes a total Hamiltonian function that is based at least in part on the binary rules and on historical data from previous use of the fuel cell.

5. The computer-implemented method of claim 1 wherein the fuel cell is of an indicated type of fuel cell, and wherein the method further comprises storing the generated behavioral model as a reference standard behavioral model for the indicated type of the fuel cell, and using the stored reference standard behavioral model to evaluate additional generated behavior models for respective additional fuel cells.

6. A computer-implemented method comprising:
generating, by one or more first computing systems, a behavioral model that is for a physical system with a fuel cell and that has non-linear response behavior to linear changes in one or more inputs to the physical system, wherein the behavioral model represents behavior of the physical system at multiple levels for each of at least a first type of factor and a second type of factor that include charge level of the fuel cell and resistive load applied to the fuel cell and that affect the behavior of the physical system, by:

supplying a plurality of input changes to the physical system by, for each of a plurality of input groups that each includes a combination having one of the multiple first levels for the first type of factor and one of multiple second levels for the second type of factor, supplying one or more of the input changes into the physical system using the one first level of the first type of factor for that input group, wherein the plurality of input changes include electrical signals supplied to at least one of a cathode of the fuel cell or an anode of the fuel cell;

measuring changes in responses of the physical system to, for each of the plurality of input groups, the supplied one or more input changes for that input group; and combining the measured changes in the responses to produce the generated behavioral model for the physical system, to cause the generating of the behavioral model to include generating one or more incremental parametric non-linear behavioral models for the fuel cell; and controlling, by one or more second computing systems and after the generating of the behavioral model, further operations of the physical system by using the generated behavioral model and state information for the physical system to determine one or more control actions to perform, and performing the one or more control actions to modify the further operations of the physical system.

7. A non-transitory computer-readable medium having stored contents that cause one or more computing systems to perform automated operations, the automated operations comprising:

generating, by at least one first computing system of the one or more computing systems, a behavioral model for a fuel cell that represents behavior of the fuel cell at multiple charge levels and with multiple resistive loads, by:

supplying a plurality of electrical signals into the fuel cell by, for each of a plurality of combinations each including one of the multiple charge levels and one of the multiple resistive loads, supplying one or more of the electrical signals into the fuel cell while the fuel cell has the one charge level for that combination and the one resistive load for that combination;

measuring changes in responses of the fuel cell to, for each of the plurality of combinations, the supplied one or more electrical signals for that combination; and combining the measured changes in the responses to produce the generated behavioral model for the fuel cell; and controlling, by at least one second computing system of the one or more computing systems and after the generating of the behavioral model, further operations of the fuel cell by using the generated behavioral model and current state information for the fuel cell to determine one or more control actions to perform, and performing the one or more control actions to modify the further operations of the fuel cell.

8. The non-transitory computer-readable medium of claim 7 wherein the generated behavioral model includes at least one incremental parametric non-linear behavioral model for the fuel cell, and wherein the supplying of the plurality of electrical signals into the fuel cell further includes, for each of the plurality of combinations of one of the multiple charge levels and one of the multiple resistive loads:

applying, while a charge level of the fuel cell corresponds to the one charge level for that combination, the one resistive load for that combination to the fuel cell; and supplying each of multiple multi-frequency microvolt pulses into at least one of an anode of the fuel cell or a cathode of the fuel cell.

9. The non-transitory computer-readable medium of claim 8 wherein the fuel cell is one of multiple fuel cells of a fuel cell system, wherein the generating of the behavioral model includes generating one or more behavioral models for the multiple fuel cells, and wherein the controlling of the further operations further includes controlling the fuel cell system, by the at least one second computing system and for each of multiple time periods after the generating of the one or more behavioral models, including:

obtaining, for at least one of that time period or a prior time period, further state information for at least one of the multiple fuel cells from one or more sensors measuring one or more characteristics of the at least one fuel cell;

using the obtained further state information and the generated behavioral model to determine at least one control action to perform for that time period; and initiating performance of the determined at least one control action for that time period to affect the further operations of the fuel cell system.

10. The non-transitory computer-readable medium of claim 7 wherein the fuel cell is part of a physical system further having one or more outputs and having one or more controls that are manipulatable to modify at least one output and having sensors to measure the current state information for the fuel cell, and wherein the controlling of the further operations of the fuel cell further includes determining the one or more control actions to manipulate the one or more controls.

11. The non-transitory computer-readable medium of claim 7 wherein the generating of the behavioral model further includes adding binary rules to the behavioral model that use operating principles of the fuel cell and that evaluate state information for the fuel cell to reach true or false values for use in determining the one or more control actions to perform.

12. The non-transitory computer-readable medium of claim 11 wherein the behavioral model includes a total Hamiltonian function that is generated based at least in part on the binary rules and on historical data from previous use of the fuel cell.

13. The non-transitory computer-readable medium of claim 7 wherein the fuel cell is of an indicated type of fuel cell, and wherein the stored contents include software instructions that, when executed, cause the one or more computing systems to perform further automated operations including storing the generated behavioral model as a reference standard behavioral model for the indicated type of the fuel cell, and using the stored reference standard behavioral model to evaluate additional generated behavior models for respective additional fuel cells of the indicated type.

14. A system comprising:
one or more hardware processors of one or more computing systems; and one or more memories with stored instructions that, when executed by at least one of the one or more hardware processors, cause the system to perform automated operations including at least:

generating a behavioral model for a fuel cell that represents behavior of the fuel cell at multiple charge levels and with multiple resistive loads, by:

supplying a plurality of electrical signals into the fuel cell by, for each of a plurality of combinations each including one of the multiple charge levels and one of the multiple resistive loads, supplying one or more of the electrical signals into the fuel cell while the fuel cell has the one charge level for that combination and the one resistive load for that combination;

measuring changes in responses of the fuel cell to, for each of the plurality of combinations, the supplied one or more electrical signals for that combination; and combining the measured changes in the responses to produce the generated behavioral model for the fuel cell; and controlling, after the generating of the behavioral model, operations of an indicated fuel cell by using the generated behavioral model and state information for the indicated fuel cell to determine one or more control actions to perform, and performing the one or more control actions to modify the operations of the indicated fuel cell.

15. The system of claim 14 wherein the generated behavioral model includes at least one incremental parametric non-linear behavioral model for the fuel cell, and wherein the supplying of the plurality of electrical signals into the fuel cell further includes, for each of the plurality of combinations of one of the multiple charge levels and one of the multiple resistive loads:

applying, while a charge level of the fuel cell corresponds to the one charge level for that combination, the one resistive load for that combination to the fuel cell; and supplying each of multiple multi-frequency microvolt pulses into at least one of an anode of the fuel cell or a cathode of the fuel cell.

16. The system of claim 14 wherein the indicated fuel cell is the fuel cell for which the behavioral model is generated and is one of multiple fuel cells of a fuel cell system, wherein the generating of the behavioral model includes generating one or more behavioral models for the multiple fuel cells, and wherein the controlling of the operations further includes controlling the fuel cell system for each of multiple time periods after the generating of the one or more behavioral models, by:

obtaining, for at least one of that time period or a prior time period, further state information for at least one of the multiple fuel cells from one or more sensors measuring one or more characteristics of the at least one fuel cell;

using the obtained further state information and the generated behavioral model to determine at least one control action to perform for that time period; and initiating performance of the determined at least one control action for that time period to affect the further operations of the fuel cell system.

17. The system of claim 14 wherein the indicated fuel cell is part of a physical system further having one or more outputs and having one or more controls that are manipulatable to modify at least one output and having sensors to measure the current state information for the indicated fuel cell, and wherein the controlling of the operations of the indicated fuel cell further includes determining the one or more control actions to manipulate the one or more controls.

18. The system of claim 14 wherein the generating of the behavioral model further includes adding binary rules to the behavioral model that use operating principles of the fuel cell and that evaluate state information for the fuel cell to reach true or false values for use in determining the one or more control actions to perform.

19. The system of claim 14 wherein the behavioral model includes a total Hamiltonian function that is generated based at least in part on historical data from previous use of the fuel cell.

20. The system of claim 14 wherein the fuel cell and the indicated fuel cell are each of an indicated type of fuel cell, and wherein the stored instructions include software instructions that, when executed, cause the one or more computing systems to perform further automated operations including storing the generated behavioral model as a reference standard behavioral model for the indicated type of the fuel cell, and using the stored reference standard behavioral model to evaluate additional generated behavior models for respective additional fuel cells of the indicated type.

* * * * *

UNITED STATES PATENT AND TRADEMARK OFFICE
CERTIFICATE OF CORRECTION

| | | |
|---|---|---|
| PATENT NO. | : 11,644,806 B1 | Page 1 of 1 |
| APPLICATION NO. | : 17/356965 | |
| DATED | : May 9, 2023 | |
| INVENTOR(S) | : Wolf Kohn et al. | |

It is certified that error appears in the above-identified patent and that said Letters Patent is hereby corrected as shown below:

In the Claims

<u>Column 69, Line 9, Claim 6:</u>
"each includes a combination having one of the" should read --each includes a combination having one of--.

Signed and Sealed this
Twenty-fourth Day of October, 2023

Katherine Kelly Vidal
*Director of the United States Patent and Trademark Office*